US010902371B2

(12) United States Patent
Goldberg et al.

(10) Patent No.: US 10,902,371 B2
(45) Date of Patent: Jan. 26, 2021

(54) VENDING-KIOSK BASED SYSTEMS AND METHODS TO VEND AND/OR PREPARE ITEMS, FOR INSTANCE PREPARED FOODS

(71) Applicant: ZUME, Inc., Mountain View, CA (US)

(72) Inventors: Joshua Gouled Goldberg, Mountain View, CA (US); Christopher J. Satchell, Mountain View, CA (US)

(73) Assignee: ZUME, INC., Camarillo, CA (US)

( * ) Notice: Subject to any disclaimer, the term of this patent is extended or adjusted under 35 U.S.C. 154(b) by 0 days.

(21) Appl. No.: 16/161,650

(22) Filed: Oct. 16, 2018

(65) Prior Publication Data
US 2019/0050799 A1 Feb. 14, 2019

Related U.S. Application Data

(63) Continuation of application No. PCT/US2018/040765, filed on Jul. 3, 2018.
(Continued)

(51) Int. Cl.
*G06Q 10/08* (2012.01)
*G07F 17/00* (2006.01)
(Continued)

(52) U.S. Cl.
CPC ........ *G06Q 10/0832* (2013.01); *B60P 3/0257* (2013.01); *G06Q 10/087* (2013.01);
(Continued)

(58) Field of Classification Search
CPC ........ G06Q 10/0832; G06Q 10/08355; G06Q 10/087; G06Q 20/18; G06Q 50/12;
(Continued)

(56) References Cited

U.S. PATENT DOCUMENTS 3,859,979 A 1/1975 Gilliom
3,928,045 A 12/1975 Tsunoda
(Continued)

FOREIGN PATENT DOCUMENTS

DE 29606255 U1 9/1996
EP 2230184 A1 9/2010
(Continued)

OTHER PUBLICATIONS

PCT/US2018/040730 International Search Report and Written Opinion, dated Nov. 14, 2018, 22 pages.
(Continued)

*Primary Examiner* — Rakesh Kumar

(57) ABSTRACT

Kiosks, components, and methods are disclosed for preparing food to be vended to customers. The kiosk may be part of a multi-modal food distribution system in which the kiosk may operate in one or more various modes, including a kiosk vending mode, a constellation mode, and a cook en route mode to vend hot, prepared food to customers. The kiosks in the system may be configurable to change between each of the different modes depending upon information received by the system. The kiosk may be part of a kiosk-based food preparation system in which the kiosk vends prepared food items to customers. The kiosk may transmit information that may be used to provide replenishment to the kiosk. Such information may include the number of items vended, the number of items and/or supplies remaining, and/or a replenishment signal.

28 Claims, 22 Drawing Sheets

Related U.S. Application Data

(60) Provisional application No. 62/532,885, filed on Jul. 14, 2017, provisional application No. 62/620,931, filed on Jan. 23, 2018, provisional application No. 62/682,038, filed on Jun. 7, 2018, provisional application No. 62/685,067, filed on Jun. 14, 2018.

(51) Int. Cl.

| | | |
|---|---|---|
| *G07F 11/00* | (2006.01) | |
| *B60P 3/025* | (2006.01) | |
| *G07F 9/10* | (2006.01) | |
| *G07F 9/02* | (2006.01) | |
| *G06Q 20/18* | (2012.01) | |
| *G07F 9/00* | (2006.01) | |
| *G07F 11/62* | (2006.01) | |
| *G08G 1/00* | (2006.01) | |

(52) U.S. Cl.
CPC ....... *G06Q 10/08355* (2013.01); *G06Q 20/18* (2013.01); *G07F 9/002* (2020.05); *G07F 9/006* (2013.01); *G07F 9/026* (2013.01); *G07F 9/10* (2013.01); *G07F 9/105* (2013.01); *G07F 11/62* (2013.01); *G07F 17/0071* (2013.01); *G07F 17/0078* (2013.01); *G08G 1/205* (2013.01)

(58) Field of Classification Search
CPC . G07F 9/006; G07F 9/026; G07F 9/10; G07F 11/002; G07F 11/62; G07F 17/0071; G07F 17/0078; G07F 9/105; G08G 1/205; B60P 3/0257; B60Q 10/08355; B60Q 10/087; B60Q 20/18
USPC ........................................................ 700/231
See application file for complete search history.

(56) References Cited

U.S. PATENT DOCUMENTS

| | | | |
|---|---|---|---|
| 3,985,991 A | 10/1976 | Levinson | |
| 4,108,363 A * | 8/1978 | Susumu | G07F 7/00 177/245 |
| 4,373,636 A | 2/1983 | Hoffman | |
| 4,398,651 A | 8/1983 | Kumpfer | |
| 4,495,287 A | 1/1985 | Uhlin | |
| 4,513,879 A | 4/1985 | Reiss | |
| 4,556,046 A | 12/1985 | Riffel et al. | |
| 4,592,485 A | 6/1986 | Anderson | |
| 4,632,836 A | 12/1986 | Abbott et al. | |
| 4,687,119 A | 8/1987 | Juillet | |
| 4,716,819 A | 1/1988 | Beltz | |
| 4,718,769 A | 1/1988 | Conkey | |
| 4,816,646 A | 3/1989 | Solomon et al. | |
| 4,912,338 A | 3/1990 | Bingham | |
| 4,919,477 A | 4/1990 | Bingham et al. | |
| 4,924,763 A | 5/1990 | Bingham | |
| 4,953,643 A | 9/1990 | Ellion | |
| 5,005,657 A | 4/1991 | Ellion | |
| 5,039,535 A | 8/1991 | Lang et al. | |
| 5,048,719 A * | 9/1991 | Empl | G07F 17/0078 221/119 |
| 5,061,022 A | 10/1991 | Meriwether | |
| 5,109,760 A | 5/1992 | Ansari | |
| D326,749 S | 6/1992 | Greve et al. | |
| 5,179,843 A | 1/1993 | Cohausz | |
| 5,209,373 A | 5/1993 | Gondek | |
| 5,243,899 A | 9/1993 | McDonald et al. | |
| 5,244,344 A | 9/1993 | Doeberl et al. | |
| 5,256,432 A | 10/1993 | McDonald et al. | |
| 5,299,557 A | 4/1994 | Braithwaite et al. | |
| 5,385,265 A | 1/1995 | Schlamp | |
| 5,386,462 A | 1/1995 | Schlamp | |
| 5,397,948 A | 3/1995 | Zoerner | |
| 5,423,477 A | 6/1995 | Valdman et al. | |
| 5,435,685 A | 7/1995 | Tsuda | |
| 5,454,295 A | 10/1995 | Cox et al. | |
| 5,516,002 A | 5/1996 | Morillo | |
| 5,522,310 A | 6/1996 | Black, Sr. | |
| 5,566,856 A | 10/1996 | Fallen | |
| 5,579,952 A | 12/1996 | Fiedler | |
| 5,598,947 A | 2/1997 | Smith | |
| 5,615,624 A * | 4/1997 | Terry | E05G 7/008 109/19 |
| 5,728,999 A * | 3/1998 | Teicher | G06Q 20/04 235/381 |
| 5,732,610 A | 3/1998 | Halladay et al. | |
| 5,818,014 A | 10/1998 | Smith | |
| 5,905,653 A * | 5/1999 | Higham | G16H 20/13 700/244 |
| 5,921,163 A | 7/1999 | McInnes et al. | |
| 5,921,170 A * | 7/1999 | Khatchadourian | A21C 9/04 99/349 |
| 5,997,924 A | 12/1999 | Olander, Jr. et al. | |
| D426,646 S | 6/2000 | Monaghan et al. | |
| 6,102,162 A * | 8/2000 | Teicher | G07F 17/0042 186/39 |
| 6,320,165 B1 | 11/2001 | Ovadia | |
| 6,396,031 B1 | 5/2002 | Forrester | |
| 6,513,671 B2 | 2/2003 | Dicello et al. | |
| 6,543,983 B1 | 4/2003 | Felder et al. | |
| 6,568,586 B1 | 5/2003 | Vanesley et al. | |
| 6,616,010 B2 * | 9/2003 | Yuyama | G07F 17/0092 221/197 |
| 6,626,996 B1 | 9/2003 | Amigh et al. | |
| 6,684,126 B2 * | 1/2004 | Omura | G07F 11/04 221/2 |
| 6,685,284 B2 | 2/2004 | Hara | |
| 6,755,122 B2 | 6/2004 | Holmes | |
| 6,785,589 B2 * | 8/2004 | Eggenberger | G07F 11/62 700/231 |
| 6,843,167 B1 | 1/2005 | Kanafani et al. | |
| 6,858,243 B2 | 2/2005 | Blanchet | |
| 7,127,984 B2 | 10/2006 | Holmes | |
| 7,137,529 B2 | 11/2006 | Martinelli | |
| 7,174,830 B1 | 2/2007 | Dong | |
| 7,505,929 B2 | 3/2009 | Angert et al. | |
| 7,537,155 B2 * | 5/2009 | Denenberg | B65G 1/137 235/382 |
| 7,676,404 B2 | 3/2010 | Richard | |
| 7,678,036 B1 | 3/2010 | Malitas et al. | |
| 7,703,835 B2 | 4/2010 | Weeda | |
| 7,984,667 B2 | 7/2011 | Freudinger | |
| 8,061,555 B2 * | 11/2011 | Guglielmi | G07F 11/42 221/13 |
| 8,061,556 B2 * | 11/2011 | Sands | F25D 25/005 221/150 R |
| 8,161,769 B2 * | 4/2012 | Lauchnor | F25D 25/02 62/457.7 |
| 8,430,262 B2 | 4/2013 | Corbett et al. | |
| 8,549,432 B2 | 10/2013 | Warner | |
| 8,561,823 B1 | 10/2013 | Krupa | |
| 8,647,573 B2 * | 2/2014 | Regan | G01N 35/04 422/63 |
| 8,663,419 B2 | 3/2014 | Corbett et al. | |
| 8,807,377 B2 | 8/2014 | Corbett et al. | |
| D720,227 S | 12/2014 | Corbett et al. | |
| 8,948,914 B2 | 2/2015 | Zini et al. | |
| 8,991,635 B2 | 3/2015 | Myerscough | |
| 9,010,621 B2 | 4/2015 | Baker et al. | |
| 9,126,717 B2 | 9/2015 | Myerscough | |
| 9,126,719 B2 | 9/2015 | Corbett et al. | |
| D743,302 S | 11/2015 | Weiner et al. | |
| D743,311 S | 11/2015 | Weiner et al. | |
| 9,292,889 B2 | 3/2016 | Garden | |
| D754,250 S | 4/2016 | Elmer | |
| 9,626,484 B2 * | 4/2017 | Olson | G05B 15/02 |
| 9,663,974 B2 | 5/2017 | Savage | |
| 9,788,157 B2 | 10/2017 | Shaffer et al. | |
| 9,815,191 B2 | 11/2017 | Oleynik | |
| 9,914,223 B2 | 3/2018 | Fritz-Jung et al. | |
| 9,958,877 B2 | 5/2018 | Irwin | |

(56) References Cited

U.S. PATENT DOCUMENTS

| | | |
|---|---|---|
| 10,049,236 B1 | 8/2018 | Alkarni |
| 10,140,587 B2 | 11/2018 | Garden |
| 10,332,065 B2 | 1/2019 | Ferguson |
| 10,206,525 B2* | 2/2019 | Huffar .................... G07F 9/006 |
| 10,216,157 B2* | 2/2019 | Savage .................. G05B 15/02 |
| 10,248,120 B1 | 4/2019 | Siegel |
| 10,308,430 B1 | 6/2019 | Brady |
| 10,310,500 B1 | 6/2019 | Brady |
| 10,317,119 B2 | 6/2019 | Zou |
| 10,532,885 B1 | 1/2020 | Brady |
| 10,535,035 B2 | 1/2020 | O'Brien |
| 10,577,199 B2 | 3/2020 | Lee |
| 10,640,357 B2 | 5/2020 | Burks |
| 10,654,394 B2 | 5/2020 | Goldberg |
| 2001/0002674 A1 | 6/2001 | Gubbini |
| 2001/0042024 A1 | 11/2001 | Rogers |
| 2001/0045449 A1 | 11/2001 | Shannon |
| 2002/0035515 A1 | 3/2002 | Moreno |
| 2002/0048624 A1 | 4/2002 | Blanchet et al. |
| 2002/0148831 A1 | 10/2002 | Dicello et al. |
| 2003/0037681 A1 | 2/2003 | Zhu et al. |
| 2003/0132298 A1 | 7/2003 | Swartz |
| 2003/0136782 A1 | 7/2003 | Dicello et al. |
| 2003/0146235 A1* | 8/2003 | Peeler, Jr. ................ G07F 11/32 221/123 |
| 2003/0209194 A1 | 11/2003 | Amigh et al. |
| 2004/0020375 A1 | 2/2004 | Holmes |
| 2004/0113786 A1* | 6/2004 | Maloney ............... G07G 1/0054 340/568.1 |
| 2004/0194641 A1 | 10/2004 | Holmes |
| 2004/0210621 A1 | 10/2004 | Antonellis |
| 2004/0249497 A1 | 12/2004 | Saigh |
| 2004/0249502 A1 | 12/2004 | Truong |
| 2004/0253348 A1 | 12/2004 | Woodward et al. |
| 2004/0255795 A1 | 12/2004 | Holmes |
| 2005/0049921 A1 | 3/2005 | Tengler |
| 2005/0193901 A1* | 9/2005 | Buehler ................... A47J 44/00 99/468 |
| 2005/0211768 A1 | 9/2005 | Stillman |
| 2006/0010037 A1 | 1/2006 | Angert et al. |
| 2006/0027106 A1 | 2/2006 | Craig et al. |
| 2006/0089844 A1 | 4/2006 | Dickinson |
| 2006/0178943 A1 | 8/2006 | Rollinson |
| 2006/0196883 A1 | 9/2006 | Ward |
| 2006/0226669 A1 | 10/2006 | Tong et al. |
| 2007/0151981 A1* | 7/2007 | Halsey, Sr. ............. G07F 11/52 221/82 |
| 2007/0160715 A1 | 7/2007 | Elnakib et al. |
| 2007/0187183 A1 | 8/2007 | Saigh |
| 2008/0023459 A1 | 1/2008 | Leach |
| 2008/0178749 A1 | 7/2008 | Stutman |
| 2008/0264967 A1* | 10/2008 | Schifman ............ G07F 17/0092 221/133 |
| 2008/0275643 A1 | 11/2008 | Yaqub et al. |
| 2008/0316045 A1 | 12/2008 | Sriharto |
| 2009/0048890 A1 | 2/2009 | Burgh |
| 2009/0057381 A1 | 3/2009 | Gokhale |
| 2009/0120761 A1 | 5/2009 | Bashor |
| 2009/0137047 A1* | 5/2009 | Regan .................... G01N 35/04 436/48 |
| 2009/0140000 A1* | 6/2009 | Davis, Jr. ................ G07F 9/026 221/2 |
| 2010/0025422 A1 | 2/2010 | Bjornvall |
| 2010/0200591 A1 | 8/2010 | Myerscough |
| 2010/0234995 A1 | 9/2010 | Zini et al. |
| 2011/0036846 A1 | 2/2011 | Corbett et al. |
| 2011/0220652 A1 | 9/2011 | Corbett et al. |
| 2011/0235463 A1 | 9/2011 | Justusson et al. |
| 2012/0024859 A1 | 2/2012 | Longoni et al. |
| 2012/0024897 A1 | 2/2012 | Corbett et al. |
| 2012/0104785 A1 | 5/2012 | Hixson |
| 2012/0175367 A1 | 7/2012 | Lopes et al. |
| 2012/0185086 A1 | 7/2012 | Khatchadourian et al. |
| 2012/0200385 A1* | 8/2012 | Savage ................... G07F 11/62 340/5.7 |
| 2012/0203376 A1* | 8/2012 | Savage ............. G06Q 10/0875 700/214 |
| 2013/0052616 A1 | 2/2013 | Silverstein |
| 2013/0101709 A1 | 4/2013 | Rader |
| 2013/0261792 A1 | 10/2013 | Gupta |
| 2013/0262276 A1 | 10/2013 | Wan |
| 2013/0297066 A1 | 11/2013 | Alvern |
| 2013/0297463 A1 | 11/2013 | Garber |
| 2014/0089077 A1 | 3/2014 | Zuckerman et al. |
| 2014/0224826 A1 | 8/2014 | Otzen |
| 2014/0316875 A1 | 10/2014 | Tkachenko |
| 2014/0370167 A1 | 12/2014 | Garden |
| 2015/0006005 A1 | 1/2015 | Yu et al. |
| 2015/0019354 A1 | 1/2015 | Chan et al. |
| 2015/0068945 A1 | 3/2015 | Baker et al. |
| 2015/0068946 A1 | 3/2015 | Baker et al. |
| 2015/0114236 A1 | 4/2015 | Roy |
| 2015/0290795 A1 | 10/2015 | Oleynik |
| 2015/0343933 A1 | 12/2015 | Weiner et al. |
| 2015/0343936 A1 | 12/2015 | Weiner et al. |
| 2015/0366377 A1 | 12/2015 | Savage |
| 2016/0027094 A1 | 1/2016 | Chamyvelumani |
| 2016/0053514 A1 | 2/2016 | Savage et al. |
| 2016/0054163 A1 | 2/2016 | Walton et al. |
| 2016/0063435 A1 | 3/2016 | Shah et al. |
| 2016/0066732 A1 | 3/2016 | Sarvestani |
| 2016/0113422 A1* | 4/2016 | Huffar .................... G06Q 20/18 705/23 |
| 2016/0162833 A1 | 6/2016 | Garden |
| 2016/0208543 A1 | 7/2016 | Savage |
| 2016/0244311 A1 | 8/2016 | Burks |
| 2016/0260161 A1 | 9/2016 | Atchley et al. |
| 2016/0292798 A1 | 10/2016 | Berry et al. |
| 2016/0314431 A1 | 10/2016 | Quezada |
| 2017/0010608 A1 | 1/2017 | High et al. |
| 2017/0024806 A1 | 1/2017 | High et al. |
| 2017/0055752 A1 | 3/2017 | Mueller et al. |
| 2017/0069148 A1* | 3/2017 | Gilbertson ......... G07C 9/00857 |
| 2017/0124670 A1 | 5/2017 | Becker et al. |
| 2017/0148075 A1 | 5/2017 | High et al. |
| 2017/0172348 A1 | 6/2017 | Vu |
| 2017/0178066 A1 | 6/2017 | High et al. |
| 2017/0221296 A1 | 8/2017 | Jain |
| 2017/0262790 A1 | 9/2017 | Khasis |
| 2017/0287258 A1 | 10/2017 | Gerhard |
| 2017/0290345 A1 | 10/2017 | Garden et al. |
| 2017/0323375 A1 | 11/2017 | Slater |
| 2017/0345033 A1 | 11/2017 | Wilkinson et al. |
| 2018/0029809 A1 | 2/2018 | Lee |
| 2018/0053369 A1 | 2/2018 | High et al. |
| 2018/0060943 A1 | 3/2018 | Mattingly et al. |
| 2018/0071939 A1 | 3/2018 | Garden et al. |
| 2018/0105344 A1 | 4/2018 | Chiang et al. |
| 2018/0121037 A1 | 5/2018 | Wajda et al. |
| 2018/0127192 A1 | 5/2018 | Cohen |
| 2018/0194257 A1 | 7/2018 | Eismann |
| 2018/0197163 A1 | 7/2018 | Kelly |
| 2018/0211190 A1 | 7/2018 | Guo |
| 2018/0232839 A1 | 8/2018 | Heinla |
| 2018/0253805 A1 | 9/2018 | Kelly |
| 2018/0268358 A1* | 9/2018 | Alden ................... G06Q 50/12 |
| 2018/0276674 A1 | 9/2018 | Ramatchandirane |
| 2018/0304311 A1* | 10/2018 | Must ....................... G07F 17/12 |
| 2019/0031075 A1 | 1/2019 | Koch |
| 2019/0034967 A1 | 1/2019 | Ferguson et al. |
| 2019/0043001 A1 | 2/2019 | Woulfe |
| 2019/0047460 A1 | 2/2019 | Goldberg et al. |
| 2019/0049988 A1 | 2/2019 | Meij |
| 2019/0050797 A1 | 2/2019 | Joshua et al. |
| 2019/0050798 A1 | 2/2019 | Joshua et al. |
| 2019/0050800 A1 | 2/2019 | Garden |
| 2019/0050801 A1 | 2/2019 | Garden |
| 2019/0050802 A1 | 2/2019 | Garden |
| 2019/0050803 A1 | 2/2019 | Garden |
| 2019/0050804 A1 | 2/2019 | Garden |
| 2019/0050951 A1 | 2/2019 | Goldberg et al. |
| 2019/0050952 A1 | 2/2019 | Goldberg et al. |

(56) References Cited

U.S. PATENT DOCUMENTS

| | | | |
|---|---|---|---|
| 2019/0051083 A1 | 2/2019 | Joshua et al. | |
| 2019/0051086 A1 | 2/2019 | Goldberg et al. | |
| 2019/0051087 A1 | 2/2019 | Goldberg et al. | |
| 2019/0051090 A1 | 2/2019 | Goldberg et al. | |
| 2019/0059133 A1* | 2/2019 | Leindecker | G06N 3/084 |
| 2019/0125126 A1 | 5/2019 | Cohen | |
| 2019/0197451 A1 | 6/2019 | Balasingham | |
| 2019/0270398 A1 | 9/2019 | Goldberg | |
| 2019/0279181 A1 | 9/2019 | Kelly | |
| 2019/0333312 A1 | 10/2019 | Jain | |
| 2020/0017300 A1* | 1/2020 | Durkee | B65G 1/045 |
| 2020/0134952 A1 | 4/2020 | Goldberg | |
| 2020/0151636 A1 | 5/2020 | Elliot | |
| 2020/0223485 A1 | 7/2020 | Wang | |

FOREIGN PATENT DOCUMENTS

| | | |
|---|---|---|
| EP | 1685045 B2 | 12/2014 |
| EP | 2984618 B1 | 9/2018 |
| FR | 3027148 A1 | 4/2016 |
| FR | 3047146 A1 | 8/2017 |
| FR | 3047149 A1 | 8/2017 |
| FR | 3047150 A1 | 8/2017 |
| FR | 3047158 A1 | 8/2017 |
| JP | H09267276 A | 10/1997 |
| JP | 2002347944 A | 12/2002 |
| JP | 2003240405 A | 8/2003 |
| JP | 5244344 B2 | 4/2013 |
| KR | 200360448 Y1 | 8/2004 |
| KR | 20090098949 A | 9/2009 |
| KR | 1020090098949 | 9/2009 |
| KR | 1020150121771 A1 | 10/2015 |
| WO | 9208358 A1 | 5/1992 |
| WO | 0167869 A1 | 9/2001 |
| WO | 2012005683 A1 | 1/2012 |
| WO | 2014205041 A1 | 12/2014 |
| WO | 2015006649 A1 | 1/2015 |
| WO | 2016094765 A1 | 6/2016 |
| WO | 2016169654 A1 | 10/2016 |
| WO | 2017019501 A1 | 2/2017 |
| WO | 2017134147 A1 | 8/2017 |
| WO | 2017134149 A1 | 8/2017 |
| WO | 2017134150 A1 | 8/2017 |
| WO | 2017134153 A1 | 8/2017 |
| WO | 2017134156 A1 | 8/2017 |
| WO | 2017205758 A1 | 11/2017 |
| WO | 2018039549 A1 | 3/2018 |
| WO | 2018052583 A1 | 3/2018 |
| WO | 2019014020 A1 | 1/2019 |
| WO | 2019014027 A1 | 1/2019 |
| WO | 2019014030 A1 | 1/2019 |

OTHER PUBLICATIONS

EP 18192070.3 Extended European Search Report, dated Dec. 13, 2018, 8 pages.
CPG Insights, "Mobile factories and robotic pizza chefs: Rev your engines," email newsletter, mailed May 10, 2018; 13 pages.
Extended European Search Report dated Jun. 22, 2016 for corresponding EP Application No. 14814044.5, 8 pages.
International Search Report and Written Opinion for PCT/US2018/040714 dated Nov. 16, 2018 in 9 pages.
International Search Report and Written Opinion for PCT/US2018/040765 dated Nov. 16, 2018 in 13 pages.
International Search Report and Written Opinion for PCT/US2018/040785 dated Nov. 19, 2018 in 22 pages.
International Search Report and Written Opinion of the International Searching Authority, dated Jan. 31, 2018, for International Application No. PCT/US2017/050950, 20 pages.
International Search Report and Written Opinion of the International Searching Authority, dated Nov. 27, 2017, for International Application No. PCT/US2017/026408, 36 pages.
International Search Report, dated Oct. 22, 2014, for International Application No. PCT/US2014/042879, 3 pages.
International Search Report, dated Sep. 5, 2015, for International Application No. PCT/EP2016/000648, 3 pages. (English translation).
Nourish Technology, "Teaching robots how to cook," downloaded from https://angel.co/nourish-technology on Jul. 12, 2017, 6 pages.
Written Opinion of the International Searching Authority, dated Sep. 5, 2016, for International Application No. PCT/EP2016/000648, 11 pages. (with English translation).
Written Opinion, dated Oct. 22, 2014, for International Application No. PCT/US2014/042879, 8 pages.
"EKIM, "Robots at the service of taste: EKIM launches the restoration of the future with the first robot cook!"", downloaded from https://ekim.fr/ on Jun. 29, 2018, 11 pages.
Becker, et al., "A System and Process for Managing Preparation and Packaging of Food and/or Beverage Products for a Precise Delivery Time," U.S. Appl. No. 15/217,314, filed Jul. 22, 2016, 75 pages.
Garden, "Methods of Preparing Food Products," Response Under 37 CFR 1.116, filed Mar. 23, 2018, for U.S. Appl. No. 15/040,866, 14 pages.
Garden, "System and Methods of Preparing Food Products," Notice of Allowance, dated Jan. 7, 2016, for U.S. Appl. No. 13/920,998, 9 pages.
Garden, "Systems and Methods of Preparing Food Products," Advisory Action dated Aug. 27, 2015 for U.S. Appl. No. 13/920,998, 3 pages.
Garden, "Systems and Methods of Preparing Food Products," Advisory Action dated Jul. 29, 2015 for U.S. Appl. No. 13/920,998, 3 pages.
Garden, "Systems and Methods of Preparing Food Products," Amendment filed Apr. 2, 2015 for U.S. Appl. No. 13/920,998, 23 pages.
Garden, "Systems and Methods of Preparing Food Products," Amendment filed Aug. 10, 2015 for U.S. Appl. No. 13/920,998, 29 pages.
Garden, "Systems and Methods of Preparing Food Products," Amendment filed Jul. 22, 2015 for U.S. Appl. No. 13/920,998, 29 pages.
Garden, "Systems and Methods of Preparing Food Products," Amendment filed Sep. 25, 2015 for U.S. Appl. No. 13/920,998, 29 pages.
Garden, "Systems and Methods of Preparing Food Products," Office Action dated Mar. 16, 2015 for U.S. Appl. No. 13/920,998, 28 pages.
Garden, "Systems and Methods of Preparing Food Products," Office Action dated May 27, 2015 for U.S. Appl. No. 13/920,998, 31 pages.
Garden, "Systems and Methods of Preparing Food Products," Response to Restriction Requirement, filed Oct. 24, 2014, for U.S. Appl. No. 13/920,998, 3 pages.
Garden, "Systems and Methods of Preparing Food Products," Restriction Requirement, dated Sep. 10, 2014, for U.S. Appl. No. 13/920,998, 5 pages.
Joussellin, Sophie, "Pizza: the pizza-machine robots go to the stove", published online Jun. 3, 2018, downloaded from http://www.rtl.fr/actu/futur/pizza-les-robots-pizzaiolos-se-mettent-au-fourneau-7793604225 on Jun. 7, 2018; 8 pages (with machine generated English translation).
Lamb, Catherine, "Scoop: Little Caesars Has a Patent for a Pizza-Making Robot", Mar. 13, 2018, downloaded from https://thespoon.tech/scoop-little-caesars-has-a-patent-for-a-pizza-making-robot/ on Mar. 14, 2018, 3 pages.
Ohr, Thomas, "French food tech startup EKIM raises €2.2 million to start the food "robolution"", published online May 22, 2018, downloaded from http://www.eu-startups.com/2018/05/french-food-tech-startup-ekim-raises-e2-2-million-to-start-the-food-robolution/ on Jun. 7, 2018; 2 pages.
Pershan, Caleb, "Grocery Delivery Startup Tests A.I. to Outsmart Food Waste (and Amazon)", downloaded from https://sf.eater.com/2018/3/19/16427328/farmstead-sf-grocery-delivery-startup-amazon on Mar. 26, 2018, 3 pages.

(56) References Cited

OTHER PUBLICATIONS

Shaw, Keith, "Robot Investments Weekly: Pizza Robots, Picking Platform Get Pieces of Funding Pie", published online May 25, 2018, https://www.roboticsbusinessreview.com/financial/robot-investments-weekly-pizza-robots-earn-slice-of-funding-pic/?utm_source=newsletter&utm_medium=email&utm_campaign=weekly_roundup&eid=399365852&bid=2127951 on Jun. 7, 2018.

Veebie, "Delicious Food. Zero Wait," downloaded from http://www.veebie.me/ on Oct. 20, 2017, 8 pages.

PCT International Preliminary Report on Patentability in Application PCT/US2018/040765, dated Jan. 23, 2020, 11 pages.

U.S. Appl. No. 16/161,621, Office Action dated Apr. 2, 2020, 12 pages.

U.S. Appl. No. 16/161,637, Office Action dated Feb. 13, 2020, 10 pages.

U.S. Appl. No. 16/161,643, Office Action dated Nov. 29, 2019, 11 pages.

U.S. Appl. No. 16/161,643, Amendment and Response filed Feb. 12, 2020, 11 pages.

U.S. Appl. No. 16/161,637, Amendment and Response filed Apr. 27, 2020, 16 pages.

U.S. Appl. No. 16/161,643, Office Action dated May 29, 2020, 16 pages.

Engadget, "Pizza Hut tests Amazon Locker-style 'cubbies' for carryout orders", published Jul. 23, 2019, https://www.engadget.com/2019/07/23/pizza-hut-carryout-cubbies/, 8 pages.

Cartable, Popup Autonomous Retail as a Service homepage, copyright 2020, https://cartable.shop/, 8 pages.

Amazon.com Customer Help page, accessed Feb. 5, 2020, https://www.amazon.com/gp/help/customer/display.html?nodeId=201530900, 2 pages.

Kiwibot homepage, Delivery Service in Days Through a one-stop Solution, accesses Mar. 2020, https://www.kiwibot.com/ Mar. 2017, 6 pages.

PCT International Preliminary Report on Patentability in Application PCT/US2018/040785, dated Jan. 14, 2020, 19 pages.

U.S. Appl. No. 16/094,045, Office Action dated Jul. 23, 2020, 16 pages.

U.S. Appl. No. 16/094,441, Office Action dated Aug. 5, 2020, 19 pages.

U.S. Appl. No. 16/161,637, Notice of Allowance dated Jul. 28, 2020, 11 pages.

U.S. Appl. No. 16/161,637, Notice of Allowance dated Sep. 2, 2020, 11 pages.

\* cited by examiner

VENDING-KIOSK BASED SYSTEMS AND METHODS TO VEND AND/OR PREPARE ITEMS, FOR INSTANCE PREPARED FOODS

CROSS REFERENCE TO RELATED APPLICATIONS

The present application is a continuation PCT/US2018/040765, filed Jul. 3, 2018, which claims the benefit of the U.S. Provisional Patent Application No. 62/685,067, filed Jun. 14, 2018; U.S. Provisional Patent Application No. 62/682,038, filed Jun. 7, 2018; U.S. Provisional Patent Application No. 62/620,931, filed Jan. 23, 2018; and U.S. Provisional Patent Application No. 62/532,885, filed Jul. 14, 2017.

TECHNICAL FIELD

This description generally relates to food cooking, delivery, distribution and/or vending, for instance using a food distribution system employing one or more vending kiosks. In some implementations the vending kiosks can selectively operate in one of two or more modes of operation.

DESCRIPTION OF THE RELATED ART

Historically, consumers have had a choice when hot, prepared, food was desired. Some consumers would travel to a restaurant or other food establishment where such food would be prepared and consumed on the premises. Other consumers would travel to the restaurant or other food establishment, purchase hot, prepared, food and transport the food to an off-premises location, such as a home or picnic location for consumption. Yet other consumers ordered delivery of hot, prepared food, for consumption at home. Over time, the availability of delivery of hot, prepared, foods has increased and now plays a significant role in the marketplace. Delivery of such hot, prepared, foods was once considered the near exclusive purview of Chinese take-out and pizza parlors. However, today even convenience stores and "fast-food" purveyors such as franchised hamburger restaurants have taken to testing the delivery marketplace.

The delivery of prepared foods traditionally occurs in several discrete acts. First, a consumer places an order for a particular food item with a restaurant or similar food establishment. The restaurant or food establishment prepares the food item or food product per the customer order. The prepared food item is packaged and delivered to the consumer's location. The inherent challenges in such a delivery method are numerous. In addition to the inevitable cooling that occurs while the hot food item is transported to the consumer, many foods may experience a commensurate breakdown in taste, texture, or consistency with the passage of time. For example, the French fries at the burger restaurant may be hot and crispy, but the same French fries will be cold, soggy, and limp by the time they make it home. To address such issues, some food suppliers make use of "hot bags," "thermal packaging," or similar insulated packaging, carriers, and/or food containers to retain at least a portion of the existing heat in the prepared food while in transit to the consumer. While such measures may be at least somewhat effective in retaining heat in the food during transit, such measures do little, if anything, to address issues with changes in food taste, texture, or consistency associated with the delay between the time the food item is prepared and the time the food item is actually consumed.

BRIEF SUMMARY

Kiosks may be used to vend hot, prepared food items to customers. In some implementations, kiosks may be used to prepare and vend hot, prepared food items to customers. In some implementations, a kiosk may vend items to multiple customers while remaining stationary in a location when the kiosk is operating in a kiosk vending mode. As such, customers may travel to the location of the kiosk to retrieve food items that the customer has ordered. In some implementations, a kiosk may fulfill orders placed by customers by providing hot-prepared items to delivery vehicles to be delivered to the appropriate customer at a delivery destination. In some implementations, the kiosk may be self-propelled and may autonomously and/or semi-autonomously travel to one or more delivery destinations to deliver hot, prepared food items that have been ordered by customers.

A method of operation of a multi-modal food preparation system may be summarized as including: in a kiosk vending mode: transmitting instructions to at least one kiosk that includes a number of food preparation units, the instructions which cause the at least one kiosk to accept orders for instances of food items and to vend the instances of food items directly to a customer to act as a combined cooking and vending kiosk; and in a constellation mode: transmitting information to the at least one kiosk to act as a hub, including information that specifies a plurality of orders for instances of food items to be prepared; and transmitting information to a number of vehicles to act as delivery vehicles, including routing information that routes the additional vehicles between the at least one kiosk that acts as the hub and a plurality of delivery destinations associated with respective ones of the orders.

The method of operation may further include: transmitting information that causes the at least one kiosk to switch between the kiosk vending mode and the constellation mode. The method of operation may further include: in a cook en route mode: transmitting information to the at least one kiosk which transports a number of food preparation units to act as a combined cooking and delivery kiosk, the information including information that specifies a plurality of orders for instances of food items to be prepared including commands to control respective ones of the food preparation units for each of the instances of food items to be prepared, and the information further including destination information that specifies a destination to deliver the orders.

A method of operation in a kiosk-based food vending system may be summarized as including: for each of a number of vending kiosks in respective locations, each of the vending kiosks having one or more heating elements selectively operable to at least one of warm or cook one or more instances of one or more types of food items: at least one of raising or maintaining a temperature of one or more instances of one or more types of food items; repeatedly vending one or more instances of one or more types of food items; transmitting information representative of at least one of: i) one or more instances of one or more types of food items that have been vended food items or ii) supplies of instances of one or more types of food items available at the respective kiosk, or iii) a need for replenishment; and receiving replenishment from a vehicle based at least on part on the transmitted information.

The method of operation may further include: dispatching the vehicle to replenish the at least one vending kiosk based at least on part on the transmitted information. The method of operation may further include: dispatching the vehicle to replenish the at least one vending kiosk based at least on part on pending orders of food items at the at least one vending kiosk. The method of operation may further include: predicting an expected demand for instances of one or more types of food items; and dispatching the vehicle to replenish the at least one vending kiosk based at least on part on the predicted expected demand for instances of one or more types of food items. Predicting an expected demand for instances of one or more types of food items may include training at least one neural network with at least one set of training data that represents an actual demand for instances of one or more types of food items previously experienced at one or more locations. The at least one set of training data may include training data related to at least one of respective days of the week, special events, time of day, weather, and holidays. The method of operation may further include: determining an estimate time required to replenish at least one of the kiosks; determining an estimate time before the kiosk exhausts a supply of one or more instances of one or more types of food items; determining a time at which to dispatch the vehicle based on the estimate times such that there is sufficient time to replenish the at least one vending kiosk before the supply of one or more instances of one or more types of food items is exhausted; and dispatching the vehicle to replenish the at least one vending kiosk based on the determined time at which to dispatch the vehicle. The method of operation may further include: the one or more vending kiosks receiving from a remote order processing system one or more orders for one or more instances of one or more types of food items. The one or more vending kiosks may each have a respective point-of-sale system, and may further include: receiving one or more orders for one or more instances of one or more types of food items via the respective point-of-sale system of the kiosk. The one or more vending kiosks may each have a respective wireless communications system, and may further include: receiving directly from a customer processor-based communications device one or more orders for one or more instances of one or more types of food items via the respective wireless communication system of the one or more vending kiosks. At least one of raising or maintaining a temperature of one or more instances of one or more types of food items may be based at least on part on one or more of the received orders. The method may further include: determining a replenishment route to each of the number of vending kiosks to replenish food items; and dispatching the vehicle to replenish the at least one vending kiosk based on the determined replenishment route. The number of vending kiosks may include one or more self-propelled vending kiosks, and the method may further include: determining a respective route for each of the one or more self-propelled vending kiosks to travel to the respective destinations; and transmitting instructions to each of the one or more self-propelled vending kiosks to travel to the respective destinations.

A method of operation in a kiosk-based food vending system may be summarized as including: for at least one vending kiosk in a respective location, the at least one vending kiosk having one or more heating elements selectively operable to at least one of warm or cook one or more instances of one or more types of food items: at least one of raising or maintaining a temperature of one or more instances of one or more types of food items; repeatedly dispensing one or more instances of one or more types of food items to one of one or more delivery vehicles; transmitting information representative of at least one of: i) one or more instances of one or more types of food items that have been vended food items or ii) supplies of instances of one or more types of food items available at the respective kiosk, or iii) a need for replenishment; and receiving replenishment from a replenishment vehicle based at least in part on the transmitted information.

The method of operation may further include: dispatching the replenishment vehicle to replenish the at least one vending kiosk based at least on part on the transmitted information. The method of operation may further include: predicting an expected demand for instances of one or more types of food items; and dispatching the replenishment vehicle to replenish the at least one vending kiosk based at least on part on the predicted expected demand for instances of one or more types of food items. Predicting an expected demand for instances of one or more types of food items may include training at least one neural network with at least one set of training data that represents an actual demand for instances of one or more types of food items previously experienced at one or more locations. The at least one set of training data may include training data related to at least one of special events, respective days of the week, time of day, weather, and holidays. The method of operation may further include: determining an estimate time required to replenish at least one of the kiosks; determining an estimate time before the kiosk exhausts a supply of one or more instances of one or more types of food items; determining a time at which to dispatch the replenishment vehicle based on the estimate times such that there is sufficient time to replenish the at least one vending kiosk before the supply of one or more instances of one or more types of food items is exhausted; and dispatching the replenishment vehicle to replenish the at least one vending kiosk based on the determined time at which to dispatch the vehicle. The method of operation may further include: the one or more vending kiosks receiving from a remote order processing system one or more orders for one or more instances of one or more types of food items. The one or more vending kiosks may each have a respective point-of-sale system, and the method may further include: receiving one or more orders for one or more instances of one or more types of food items via the respective point-of-sale system of the kiosk; and dispensing one or more one or more instances of one or more types of food items directly to one or more customers. The one or more vending kiosks may each have a respective wireless communications system, and the method may further include: receiving directly from a customer processor-based communications device one or more orders for one or more instances of one or more types of food items via the respective wireless communication system of the one or more vending kiosks; and dispensing one or more one or more instances of one or more types of food items directly to one or more customers. At least one of raising or maintaining a temperature of one or more instances of one or more types of food items may be based at least on part on one or more of the received orders. The method of operation may further include: dispatching the one of one or more delivery vehicles to the at least one vending kiosk based at least in part on one or more of readiness of an order to be delivered by the delivery vehicle, of an estimated travel time from the at least one vending kiosk to a destination on a single destination delivery route, the destination associated with the order to be delivered, of an estimated travel time from the at least one vending kiosk to a destination on a multiple destination delivery route, the destination associated with the order to be delivered, and of a delivery time period, the delivery time period which provides a threshold time by which delivery of the order is to be completed.

A method of operation of a multi-modal food preparation system in a kiosk mode may be summarized as including: distributing food items at a vending kiosk based upon orders received at the vending kiosk and upon orders received at a remote order processing system removed from the vending kiosk, in which the vending kiosk is positioned at a destination and remains stationary at the destination while distributing the food items; transmitting information to a remote replenishment processing system, the transmitted information including vending information related to the food items distributed by the vending kiosk over a defined period of time, the vending kiosk responsive to distribute the food items based upon orders received at the vending kiosk and upon orders received at a facility removed from the vending kiosk; and receiving additional food items at the vending kiosk, the additional food items to be distributed by the vending kiosk.

The kiosk may be a self-propelled vending kiosk, and the method may further include: receiving instructions regarding a route for the self-propelled vending kiosk to travel to the vending destination; and traversing the route to the vending destination. Receiving the additional food items may include receiving instructions to travel to a replenishment location, the replenishment location different from the vending location.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1A:
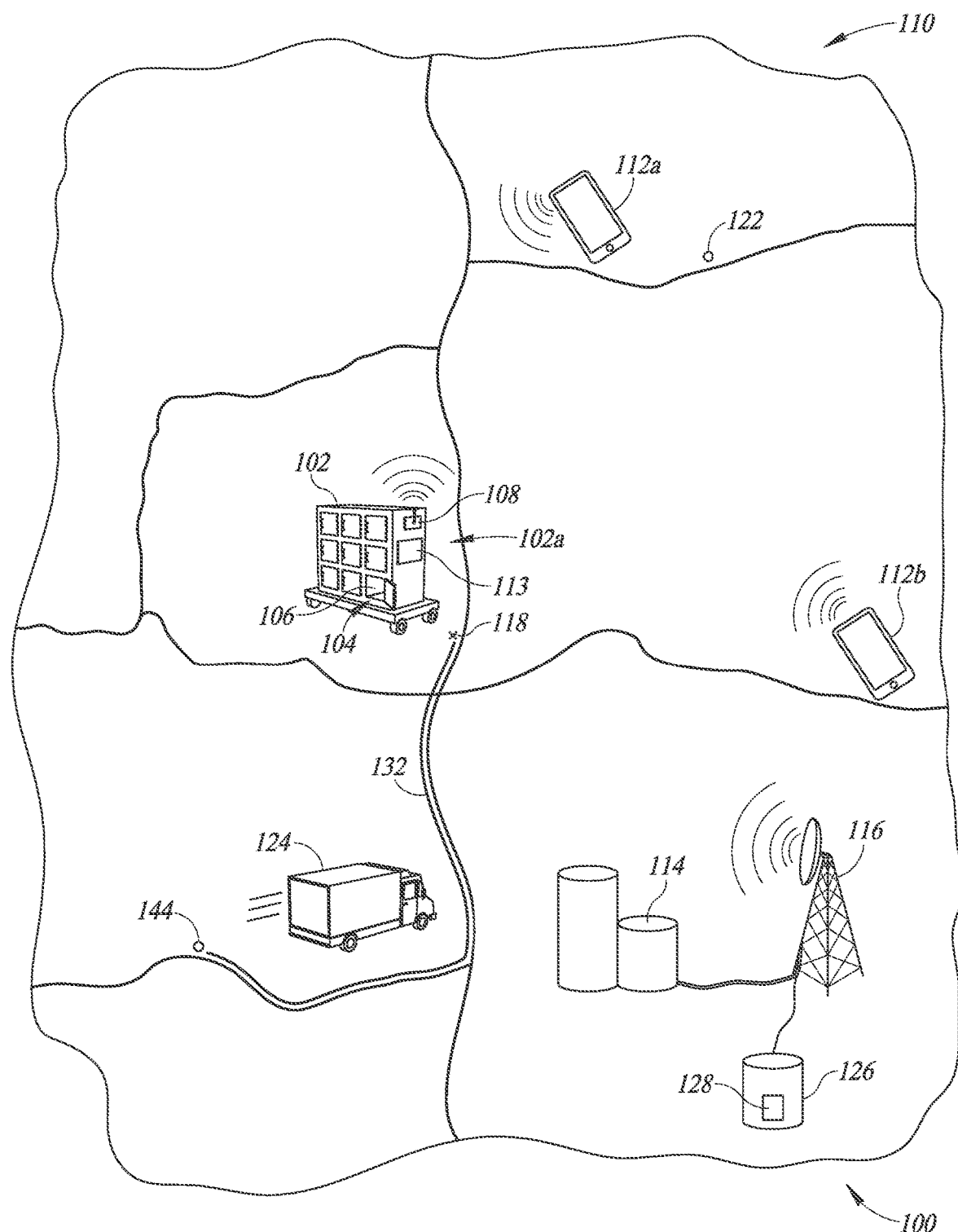
FIG. 1A is a schematic diagram of a multi-modal food preparation system operating in a kiosk vending mode in which a kiosk serves as a cooking and vending kiosk, and provides instances of food items to customers who have submitted orders, according to at least one illustrated implementation.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, certain structures associated with food preparation devices or appliances such as ovens, skillets, stoves with burners, inductive heaters, micro-wave ovens, rice cookers, and, or sous vide cookers, and other similar devices, closed-loop controllers used to control cooking conditions, food preparation techniques, wired and wireless communications protocols, wired and wireless transceivers, radios, communications ports, geolocation, and optimized route mapping algorithms have not been shown or described in detail to avoid unnecessarily obscuring descriptions of the embodiments. In other instances, certain structures associated with conveyors, robots, and/or vehicles have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

As used herein the terms "food item" and "food product" refer to any item or product intended for human consumption. One of ordinary skill in the culinary arts and food preparation will readily appreciate the broad applicability of the systems, methods, and apparatuses described herein across any number of prepared food items or products, including cooked and uncooked food items or products, and ingredients or components of food items and products.

As used herein the terms "robot" or "robotic" refer to any device, system, or combination of systems and devices that includes at least one appendage, typically with an end of arm tool or end effector, where the at least one appendage is selectively moveable to perform work or an operation useful in the preparation a food item or packaging of a food item or food product. The robot may be autonomously controlled, for instance based at least in part on information from one or more sensors (e.g., optical sensors used with machine-vision algorithms, position encoders, temperature sensors, moisture or humidity sensors). Alternatively, one or more robots can be remotely controlled by a human operator. Alternatively, one or more robots can be partially remotely controlled by a human operator and partially autonomously controlled.

As used herein the term "food preparation unit" refers to any device, system, or combination of systems and devices useful in preparing, cooking or heating a food product, such as, for example, cooking units. While such preparation may include the heating of food products during preparation, such preparation may also include the partial or complete cooking of one or more food products. Additionally, while the term "oven" may be used interchangeably with the term "cooking unit" herein, such usage should not limit the applicability of the systems and methods described herein to only foods which can be prepared in an oven. For example, one or more burners, either gas or electric or inductive, a hot skillet surface or griddle, a deep fryer, a microwave oven, rice cooker, sous vide cooker, and/or toaster can be considered a "cooking unit" that is included within the scope of the systems, methods, and apparatuses described herein. Food preparation units may include other types of equipment used to prepare food items, such as equipment related to cooled or chilled foods, such as may be used to prepare smoothies, frozen yogurt, ice cream, and beverages (e.g., fountain beverages). Further, the food preparation unit may be able to control more than temperature. For example, some food preparation units may control pressure and/or humidity. Further, some food preparation units may control airflow therein, thus able to operate in a convective cooking mode if desired, for instance to decrease cooking time.

As used herein the term "kiosk" refers to any standalone structure from which items can be vended. A kiosk may be a manned or attended kiosk, which is attended to, or at least partially operated by a human or human attendant. For instance, one or more humans may accept orders, prepare orders, and, or provide the ordered item to a customer. A kiosk may be an un-manned kiosk, which is operated without the assistance of a human. For instance, the un-manned kiosk may operate autonomously to accept orders, prepare orders, and, or provide (e.g., dispense) the ordered item to a customer. Thus, kiosks may be operable in a fully autonomous mode, a partially autonomous mode, or in a dependent mode. A kiosk can be fixed, substantially permanently located at a given location. A kiosk can be mobile, moving from location to location. A mobile kiosk can take the form of a vehicle, for example with a self-contained motive source (e.g., electric traction motor, internal combustion engine) and wheels or treads. A mobile kiosk can include a set of wheels, and be pushed or pulled by a human, e.g., a human attendant. A mobile kiosk can be driven either autonomously, partially autonomously under guidance of a human, or driven or otherwise moved completely under human control, e.g., via a human attendant. A kiosk can have one or more vending slots or openings from which product is dispensed. The slots or openings may omit any door or barrier. A kiosk take the form of a locker or set of lockers, having one or more compartments with respective openings and with doors or other barriers which selectively provide access to the interior of compartments from an exterior thereof, to allow customers to access ordered and, or purchased items.

As used herein the term "vehicle" refers to any car, truck, van, or other vehicle useful in cooking and heating a food item for distribution to a customer. The size and shape of the vehicle may depend in part on licensing requirements of the locality in which the vehicle is intended to operate. In some instances, the size and shape of the vehicle may depend on the street layout and the surrounding environment of the locality in which the vehicle is intended to operate. For example, small, tight city streets may require a vehicle that is comparatively shorter and/or narrower than a vehicle that can safely and conveniently navigate larger, suburban thoroughfares.

Figure 1B:
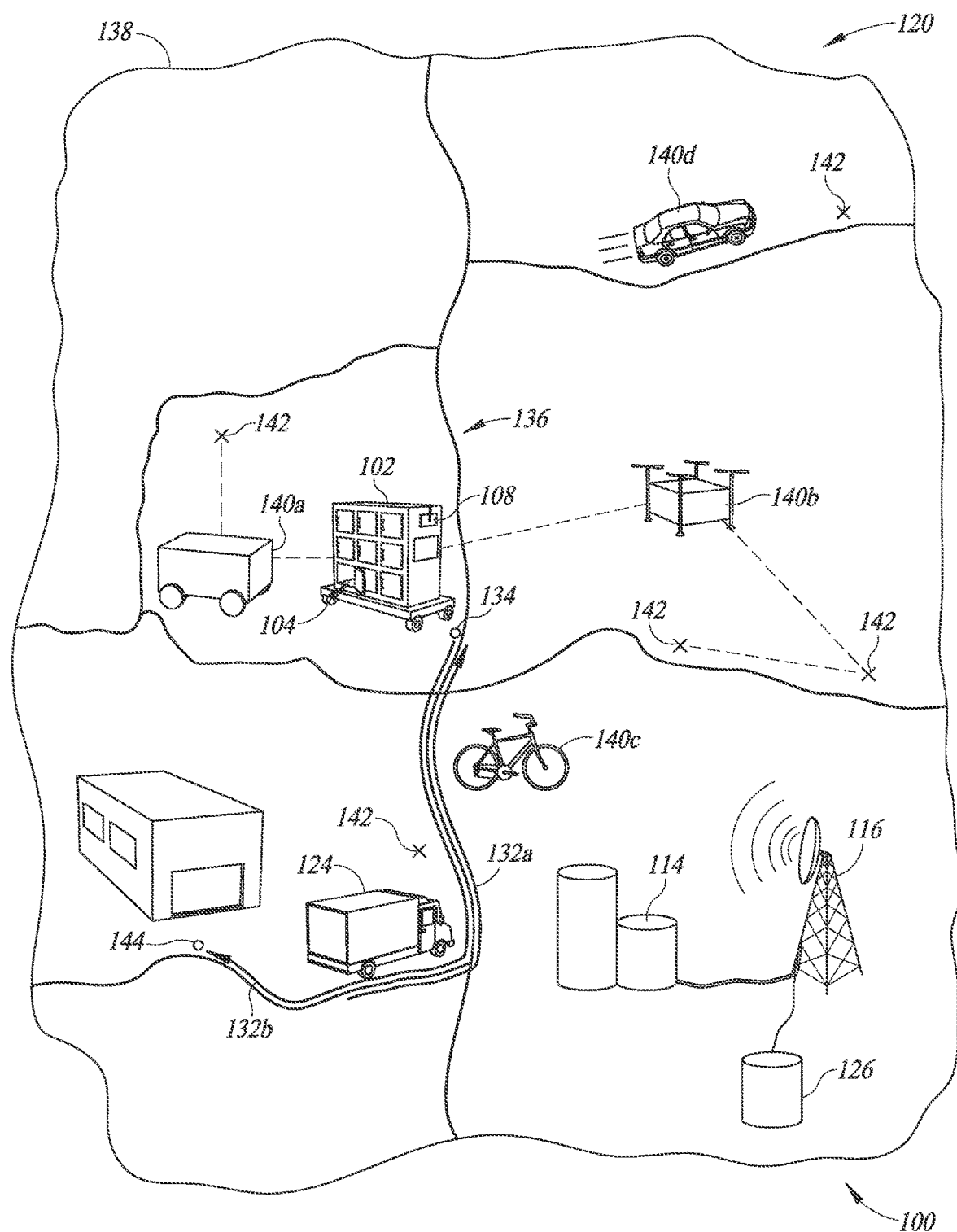
FIG. 1B is a schematic diagram of a multi-modal food preparation system operating in a constellation mode in which the kiosk serves as a hub and provides instances of food items to one or more delivery vehicles for delivery to one or more customers, according to at least one illustrated implementation.
Figure 1C:
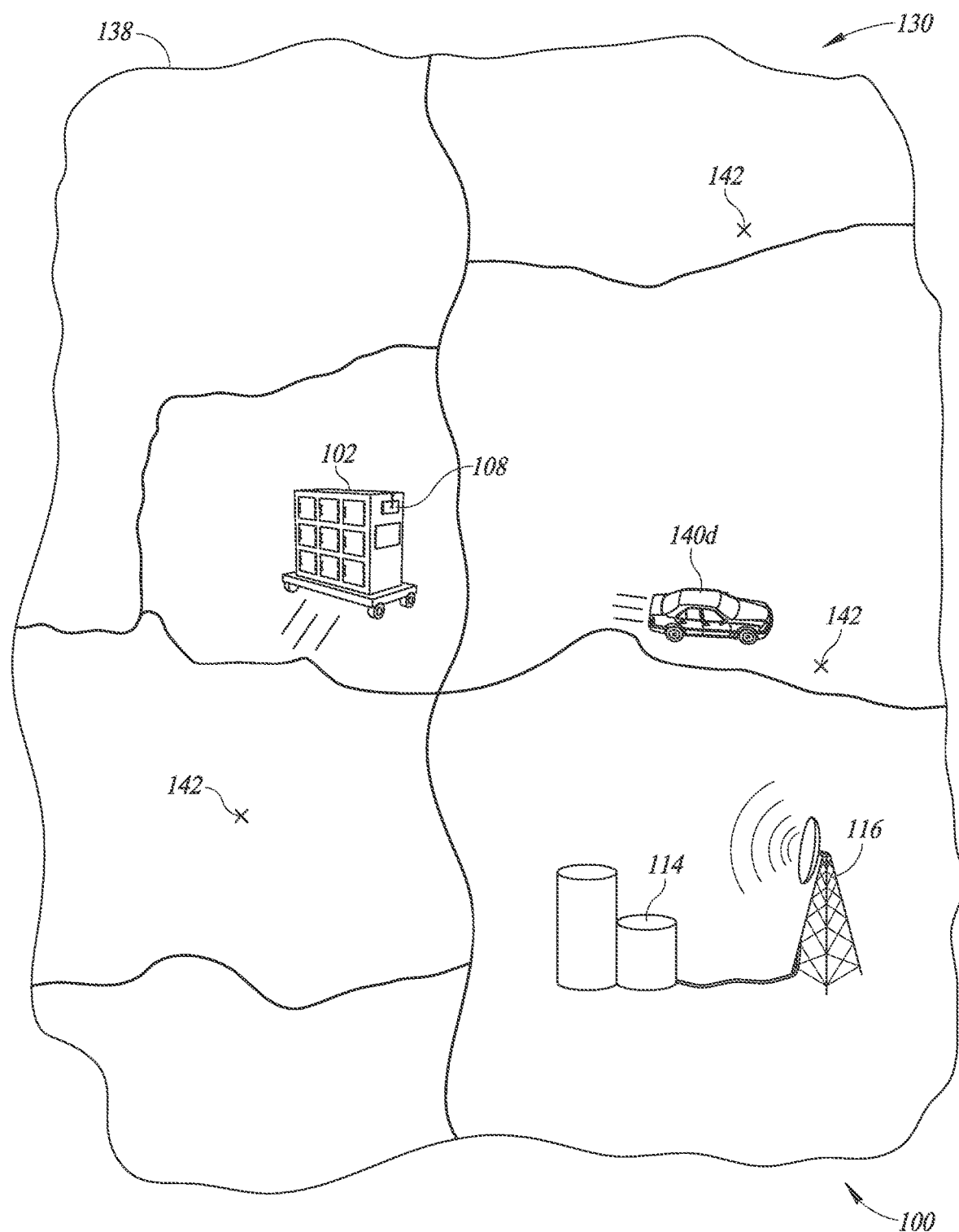
FIG. 1C is a schematic diagram of a multi-modal food preparation system operating in a cook en route mode in which the kiosk cooks and delivers one or more instances of food items to respective customers who have submitted orders, according to at least one illustrated implementation.

FIGS. 1A, 1B, and 1C show various modes of a multimodal food preparation system 100, including a kiosk vending mode 110, a constellation mode 120, and a cook en route mode 130, according to at least one illustrated implementation. In a kiosk vending mode 110 (see FIG. 1A), a kiosk 102 may include one or more food preparation units 104 that may each be used to prepare and/or vend one or more instances of food items 106 as a combined cooking and vending vehicle 102a. In some implementations, the food preparation unit 104 may include one or more heaters that may be used to selectively heat the food preparation unit 104. Such a heater may be used to cook or to maintain the warmth of the food item 106 contained or stored within the food preparation unit 104.

In such a kiosk vending mode 110, the kiosk 102 may receive one or more orders for food items. In some implementations, such orders may be received from a wireless communication network, for example, via a wireless communication system 108. In some implementations, the kiosk 102 may receive orders transmitted from one or more customer processor-based communications devices 112 (e.g., a smart phone 112a or a tablet 112b) directly to the kiosk 102. In some implementations, the kiosk 102 may receive orders entered into a point-of-sale system 113 that may be incorporated into or communicatively coupled to the kiosk 102. In some implementations, a remote order processing unit 114 may receive orders for instances of food items from one or more consumers and transmit such orders via the wireless communications network (e.g., wireless communications network 116) to the kiosk 102 via the wireless communication system 108.

In response to receiving each order, the kiosk 102 may selectively warm or heat one or more of the food preparation units 104 via the associated heaters. The warming of one of the food preparation units 104 may be used to maintain a temperature of an instance of a food item 106 held within the food preparation unit 104. The heating of one of the food preparation units 104 may be used to cook an instance of a food item 106 held within the food preparation unit 104. In such instances, after the instance of the food item 106 is cooked, the associated food preparation unit 104 may change selectively warm the cooked food item 106 to maintain the temperature of the cooked food item 106 unit is retrieved by a consumer.

When operating in the kiosk vending mode 110, the kiosk 102 may remain stationary at a vending location 118 to vend one or more instances of food items to customers. As such, each of the consumers who have placed an order for an instance of a food item 106 may travel to the vending location 118 to retrieve the instance of the food item 106 that the consumer has ordered. In some instances, the consumer may access the appropriate food preparation unit 104 upon arriving at the vending location 118 by, for example, entering an order and/or identification code into a user interface that may be incorporated into the kiosk 102. In some instances, the consumer may access the appropriate food preparation unit 104 upon arriving at the vending location 118, for example, by entering an order and/or identification code into a user interface that may be accessible via the mobile device (e.g., the smartphone 112a) associated with the consumer. In some instances, the kiosk 102 may detect the presence of a device (e.g., the smartphone 112a) associated with the consumer at the vending location 118 and provide access to the appropriate food preparation unit 104 in response.

In some implementations, the consumer may be traveling to the vending location 118 from a remote location, such as remote location 122. In such an implementation, the kiosk 102 may be provided with an estimated travel time from the remote location 122 to the vending location 118. Such an estimated travel time may be determined by the kiosk 102 and/or may be provided by a remote server such as the remote order processing unit 114 or a third-party server. As such, the kiosk 102 may selectively heat the food preparation unit 104 associated with the order from the consumer such that the food item will be fully cooked at or just before the estimated time that the consumer will be arriving to retrieve the order.

In some implementations, the kiosk 102 may be replenished with supplies, such as cooked and/or uncooked food items 106, or supplies for preparing, making, and/or assembling food items 106. In some implementations, a vehicle 124 may hold one or more supplies that may be used to replenish the kiosk 102. In such implementations, the vehicle 124 may receive instructions to travel to the vending location 118 in order to replenish one or more supplies for the kiosk 102. Such instructions may include, for example, the type of supplies to be replenished, the amount of each supply to be replenished, and a route that the vehicle 124 should take. In some implementations, the instructions may be transmitted to the vehicle 124 from one or more sources, such as, for example, a replenishment server 126, or some other remote server, via a wireless communications network 116. The replenishment server 126 may be communicatively coupled to either or both of the vehicle 124 and the kiosk 102. In response to receiving such instructions, the vehicle 124 may proceed along a replenishment route 132 as indicated by the instructions to replenish the kiosk 102 with one or more supplies and/or instances of food items. In some implementations, the replenishment route 132 may be determined by the replenishment server 126 and/or by a third-party server, and transmitted to the vehicle 124.

In some implementations, the kiosk 102 may be a self-propelled kiosk that may travel to a replenishment location 144 to be replenished, or to new locations to vend. The kiosk 102 may move completely autonomously, based on a desired destination and information about the surrounding environment. Alternatively, the kiosk 102 may move semi-autonomously, based on a desired destination and some guidance by a human, either present at the kiosk or located remotely therefrom and monitoring the travels of the kiosk 102. Alternatively, the kiosk 102 may move non-autonomously or dependent on a human, who may push and, or pull the kiosk to the desired destination.

A building (e.g., a warehouse) or a vehicle (e.g., a delivery vehicle) may be at the replenishment location 144 and may hold one or more supplies that may be used to replenish the kiosk 102. In such implementations, the kiosk 102 may receive instructions to travel to the replenishment location 144 in order to have one or more supplies for the kiosk 102 replenished. Such instructions may include, for example, the type of supplies to be replenished, the amount of each supply to be replenished, and a route that the kiosk 102 should take. In some implementations, the instructions may be transmitted to the kiosk 102 from one or more sources, such as, for example, the replenishment server 126, or some other remote server, via a wireless communications network 116. The replenishment server 126 may be communicatively coupled to either or both of the kiosk 102, and the building and/or vehicle at the replenishment location 144. In response to receiving such instructions, the kiosk 102 may be dispatched to traverse the route to the replenishment location 144.

In some implementations, the replenishment server 126 may transmit the instructions to replenish the kiosk 102 based upon one or more factors, such as, for example, the amount of supplies (e.g., instances of food items 106) currently available at the kiosk 102, the number of instances of food items 106 the kiosk has vended, the rate at which the kiosk 102 is using the supplies and/or vending instances of food items 106, the rate at which the kiosk 102 is expected to use the supplies in the future, pending orders to be fulfilled by the kiosk 102, and/or a signal received from the kiosk 102 indicating a need for replenishment of one or more supplies. In some instances, in response to receiving such instructions, the vehicle 124 may be dispatched to the vending location 118 to replenish the kiosk 102. Once the vehicle 124 reaches the vending location 118, the kiosk 102 may receive replenishment from the vehicle 124 based at least in part of the information received by the replenishment server 126. In some instances, in response to receiving such instructions, the kiosk 102 may be dispatched to the replenishment location 144 to receive replenishment at the replenishment location 144.

In some implementations, the replenishment server 126 may include a neural network 128 or other learning machine that may be used to determine when to transmit instructions to replenish the kiosk 102. Such a neural network 128 may receive one or more of the information listed above as inputs to determine a time at which the kiosk 102 may exhaust one or more of the supplies. In some implementations, the neural network 128 may use training data in making such a determination. Such training data may represent actual demand for instances of the food item 106 from the kiosk 102 that may have been experienced at previous times at the same or similar locations. As such, the neural network 128 may be able to take into account information regarding the sales of instances of food items 106 during specific days of the week, at a specific time and/or time range, during a special event, date, or holiday, and/or during one or more types of weather. The neural network 128 may use this training data to predict the demand for the instances of food items 106 in the future. The determined expected demand may be used to determine when to transmit the instructions to the vehicle 124 to replenish the kiosk 102.

In some implementations, the replenishment server 126 may take other considerations into account to determine when to transmit instructions and/or information to the vehicle 124 to replenish the kiosk 102. In some implementations, for example, the replenishment server 126 may determine an estimated time to complete replenishing one or more supplies at the kiosk 102. Such a determination of an estimated time to replenish may be based, at least in part, on the time to transfer the one or supplies and/or the instances of food items 106 from the vehicle 124 to the kiosk 102, and/or on the amount of time for the vehicle 124 to travel to the vending location 118. In some implementations, the replenishment server 126 may determine the amount of time before the kiosk 102 the supplies and/or instances of food items 106. As such, the replenishment server 126 may transmit instructions to the vehicle 124 to replenish the kiosk 102 such that the replenishment is complete before the estimated time by which the kiosk 102 will exhaust one or more of the supplies and/or instances of food items 106.

In some implementations, the replenishment server 126 may determine times at which the kiosk 102 may have slack demand for vending instances of food items 106 to customers. As such, the replenishment server 126 may transmit instructions to the vehicle 124 to replenish the kiosk 102 with one or more supplies and/or instances of food items 106 during a period of slack demand to minimize the inconvenience to consumers.

In the constellation mode 120 (see FIG. 1B), the kiosk 102 may be at a location 134, operating as a hub 136, in which the kiosk 102 prepares one or more food items 106 that are to be delivered to customers in a geographic area 138 surrounding the location 134. Such preparation may include, for example, heating the one or more food items in the respective food preparation unit 104. In some implementations, the food preparation unit 104 may warm the one or food items once the one or more food items are prepared to maintain the temperature of the one or more prepared food items at a desired temperature. As each food item is prepared and each order is complete, separate vehicles serve as delivery vehicles 140 and may be used to deliver the prepared food item to an appropriate delivery destination 142. Optionally, these separate delivery vehicles 140 may cook or complete cooking of food items, while en route to a destination. Such separate delivery vehicles 140 may include, for example, ground or flying drones 140a, 140b or other automated vehicles, a bicycle 140c, or a motorized vehicle 140d. In some implementations, the constellation mode 120 may serve a geographic area 138 that is about 2-3 miles in width or radius.

In some implementations, instructions may be transmitted to the one or more delivery vehicles 140 to retrieve one more food items from the kiosk 102 operating as a hub 115. In some implementations, the delivery vehicle 140 may receive instructions that result in the delivery vehicle 140 being dispatched to the kiosk 102 operating as a hub 115. The delivery vehicle 140 may be dispatched to the kiosk 102 operating as a hub 115 based, for example, at least in part on one or more of readiness of an order to be delivered by the delivery vehicle 140, of an estimated travel time from the kiosk 102 operating as a hub 115 to a delivery destination 142 using a single destination delivery route, of an estimated travel time from the kiosk 102 operating as a hub 115 to a delivery destination 142 located on a multiple destination delivery route, and of a delivery time period for delivering an order to an associated delivery destination 142, in which the delivery time period may provide a threshold time by which delivery of the order is to be completed. In some implementations, the instructions transmitted to the delivery vehicle 140 may include, for example, destination information for the delivery destinations 142 associated with each of the respective orders of food items to be delivered. In some implementations, the instructions transmitted to the delivery vehicle 140 may include route information to the location 134 of the kiosk 102 operating as a hub 115, and/or route information from the kiosk 102 operating as a hub 115 to the delivery destination 142 associated with an order for an instance of a food item.

In some implementations, the orders for one or more food items may be received from a wireless communication network, for example, via the wireless communication system 108. In some implementations, the kiosk 102 operating as the hub 136 may receive orders transmitted from one or more customer processor-based communications devices (not shown) directly to the kiosk 102. In some implementations, the remote order processing unit 114 may receive orders for instances of food items from one or more consumers and transmit such orders via the wireless communications network (e.g., wireless communications network 116) to the kiosk 102 operating as the hub 136 via the wireless communication system 108. In some implementations, the received orders for instances of food items may be transmitted from the remote order processing unit 114 to the kiosk 102 operating as the hub 136. In some implementations, the remote order processing unit 114 may transmit one or more of delivering destinations, associated orders for food items, and/or route information from the location 134 to one or more of the kiosk 102 operating as the hub 136, and/or one or more of the delivery vehicles 140.

In some implementations, the kiosk 102 operating as the hub 136 may be replenished with one more supplies and/or food items when operating in the constellation mode 120, as discussed above in the kiosk vending mode 110. In some implementations, the vehicle 124 may hold one or more supplies that may be used to replenish the kiosk 102 operating as the hub 136. In such implementations, the vehicle 124 may receive instructions to travel to the location 134 in order to replenish one or more supplies for the kiosk 102 operating as the hub 136. In response to receiving such instructions, the vehicle 124 may proceed along a first replenishment route 132a as indicated by the instructions to replenish the kiosk 102 operating as the hub 136 with one or more supplies and/or instances of food items. In some implementations, the replenishment route 132 may be determined by the replenishment server 126 and/or by a third-party server, and transmitted to the vehicle 124.

In some implementations, the kiosk 102 may be a self-propelled kiosk that may travel to a replenishment location 144, either autonomously, semi-autonomously, or non-autonomously as noted above. A building (e.g., a warehouse) or a vehicle (e.g., a delivery vehicle) may be at the replenishment location 144 and may hold one or more supplies that may be used to replenish the kiosk 102. In such implementations, the kiosk 102 may receive instructions to travel to the replenishment location 144 in order to have one or more supplies for the kiosk 102 replenished. Such instructions may include, for example, the type of supplies to be replenished, the amount of each supply to be replenished, and a route that the kiosk 102 should take. In response to receiving such instructions, the kiosk 102 may proceed along a second replenishment route 132b as indicated by the instructions to travel to the replenishment location 144. In some implementations, the second replenishment route 132b may be determined by the replenishment server 126 and/or by a third-party server, and transmitted to the kiosk 102.

In some implementations, the replenishment server 126 may transmit the instructions to the vehicle 124 to replenish the kiosk 102 based upon one or more factors, as discussed above. In some implementations, the replenishment server 126 may include a neural network 128 or other learning machine that may be used to determine when to transmit instructions to replenish the kiosk 102 operating as the hub, as discussed above. In some implementations, the replenishment server 126 may take other considerations into account to determine when to transmit instructions and/or information to the kiosk 102 operating as the hub 136.

In a cook en route mode 130, the kiosk 102 may prepare and cook food items for delivery as the kiosk 102 travels between different delivery destinations 142. In such a mode, the kiosk 102 may serve as a cooking and delivery vehicle. The order of cooking and delivering the food items may be modifiable based on various criteria (e.g., optimizing delivery or wait times, or geographical groupings). In some implementations, the kiosk 102 operating in the cook en route mode 130 may be provided with orders for food items grouped within a geographic area 138 to optimize time and resources for delivery. Such orders may be received directly from a consumer and/or from a remote order processing unit 114 via the wireless communication system 108.

In response to receiving each order, the kiosk 102 may selectively warm or heat one or more of the food preparation units 104 via the associated heaters to warm and/or prepare an instance of a food item ordered by the consumer. The warming of one of the food preparation units 104 may be used to maintain a temperature of an instance of a food item 106 held within the food preparation unit 104. The heating of one of the food preparation units 104 may be used to cook an instance of a food item 106 held within the food preparation unit 104. In such instances, after the instance of the food item 106 is cooked, the associated food preparation unit 104 may change selectively warm the cooked food item 106 to maintain the temperature of the cooked food item 106 unit is retrieved by a consumer. The process for cooking a food item ordered by a consumer may be based, at least in part, on an estimate of travel time for the kiosk 102 to travel to the consumer. For example, in some instances, the kiosk 102 may initiate the cooking of a food item ordered by a consumer such that the food item is fully cooked at or before the estimated time that the kiosk 102 will arrive at the delivery destination 142. In some instances, the estimated travel and/or arrival time may be received from a remote server, such as, for example, the remote order processing unit 114 and/or from a third party server.

In some implementations, the kiosk 102 operating in the cook en route mode 130 may be replenished with one more supplies and/or food items, as discussed above. In some implementations, the vehicle 124 may hold one or more supplies that may be used to replenish the kiosk 102. In such implementations, the vehicle 124 may receive instructions to travel to a location of the kiosk 102. In response to receiving such instructions, the vehicle 124 may proceed along a replenishment route as indicated by the instructions to replenish the kiosk 102 with one or more supplies and/or instances of food items. In some implementations, the replenishment route 132 may be determined by the replenishment server 126 and/or by a third-party server, and transmitted to the vehicle 124. In some locations, the kiosk 102 may travel to a location at which the kiosk 102 will be arriving at some point in the future. In some implementations, for example, the travel instructions provided to the vehicle 124 to travel to the location to replenish the kiosk 102 may be based at least in part on the travel time of the vehicle 124 to the location and on the travel time of the kiosk 102. In some implementations, a location may be determined such that the travel time of the vehicle 124 will be the same as, or substantially equivalent to, the travel time of the kiosk 102.

In some implementations, the kiosk 102 may be a self-propelled kiosk that may travel to a replenishment location 144, either autonomously, semi-autonomously, or non-autonomously as noted above. A building (e.g., a warehouse) or a vehicle (e.g., a delivery vehicle) may be at the replenishment location 144 and may hold one or more supplies that may be used to replenish the kiosk 102. In such implementations, the kiosk 102 may receive instructions to travel to the replenishment location 144 in order to have one or more supplies for the kiosk 102 replenished. Such instructions may include, for example, the type of supplies to be replenished, the amount of each supply to be replenished, and a route that the kiosk 102 should take. In response to receiving such instructions, the kiosk 102 may proceed along a second replenishment route 132b as indicated by the instructions to travel to the replenishment location 144. In some implementations, the second replenishment route 132b may be determined by the replenishment server 126 and/or by a third-party server, and transmitted to the kiosk 102.

In some implementations, the replenishment server 126 may transmit the instructions to the vehicle 124 to replenish the kiosk 102 based upon one or more factors, as discussed above. In some implementations, the replenishment server 126 may include a neural network 128 or other learning machine that may be used to determine when to transmit instructions to replenish the kiosk 102 operating as the hub, as discussed above. In some implementations, the replenishment server 126 may take other considerations into account to determine when to transmit instructions and/or information to the kiosk 102 operating as the hub 136.

In some implementations, the kiosk 102 may simultaneously operate in both the cook en route mode 130 and the constellation mode 120. In such an implementation, the kiosk 102 may be traveling to a delivery destination 142 to deliver a food item while at the same time preparing other food items to be delivered to other delivery destinations 142 by other separate delivery vehicles (e.g., motorized vehicle 140d). As such, the kiosk 102 may transmit one or more meeting locations to these other separate delivery vehicles 140 at which the prepared food items may be transferred to the other separate delivery vehicles 140. The meeting locations may be different from the current location of the kiosk 102. For example, in some implementations, the kiosk 102 may determine the time remaining before a food item to be delivered by one of the other separate delivery vehicles 140 will be prepared. The kiosk 102 may then determine a location or area where the kiosk 102 is likely to be when delivering the food item for the cook en route mode 130. The kiosk 102 may then transmit a meeting spot to the other separate delivery vehicle 140 to meet at the determined location or within the determined area to transfer the food item to be delivered in the constellation mode 120. In some implementations, the kiosk 102 may temporarily remain stationary at the determined location or within the determined area to transfer food items to multiple other delivery vehicles 140 for delivery to multiple other delivery destinations 142 as part of the constellation mode 120. When all of the transfers are complete, the kiosk 102 may then continue to the delivery destination 142 for the food item to be delivered as part of the cook en route mode 130.

Notably, a self-propelled kiosk can operate autonomously, semi-autonomously, or non-autonomously in traveling between locations. A kiosk can prepare (e.g., assemble, heat, cool, cook) items (e.g., prepared food items) autonomously, semi-autonomously, or non-autonomously. Such operation can be independent of whether the kiosk travels between locations either autonomously, semi-autonomously, or non-autonomously. Further, a kiosk can vend or dispense or provide access to items (e.g., prepared food items), autonomously, semi-autonomously, or non-autonomously. Such operation can be independent of whether the kiosk travels between locations either autonomously, semi-autonomously, or non-autonomously. Such operation can be independent of whether the kiosk prepares (e.g., assembles, heats, cools, cooks) items (e.g., prepared food items) autonomously, semi-autonomously, or non-autonomously.

Figure 2:
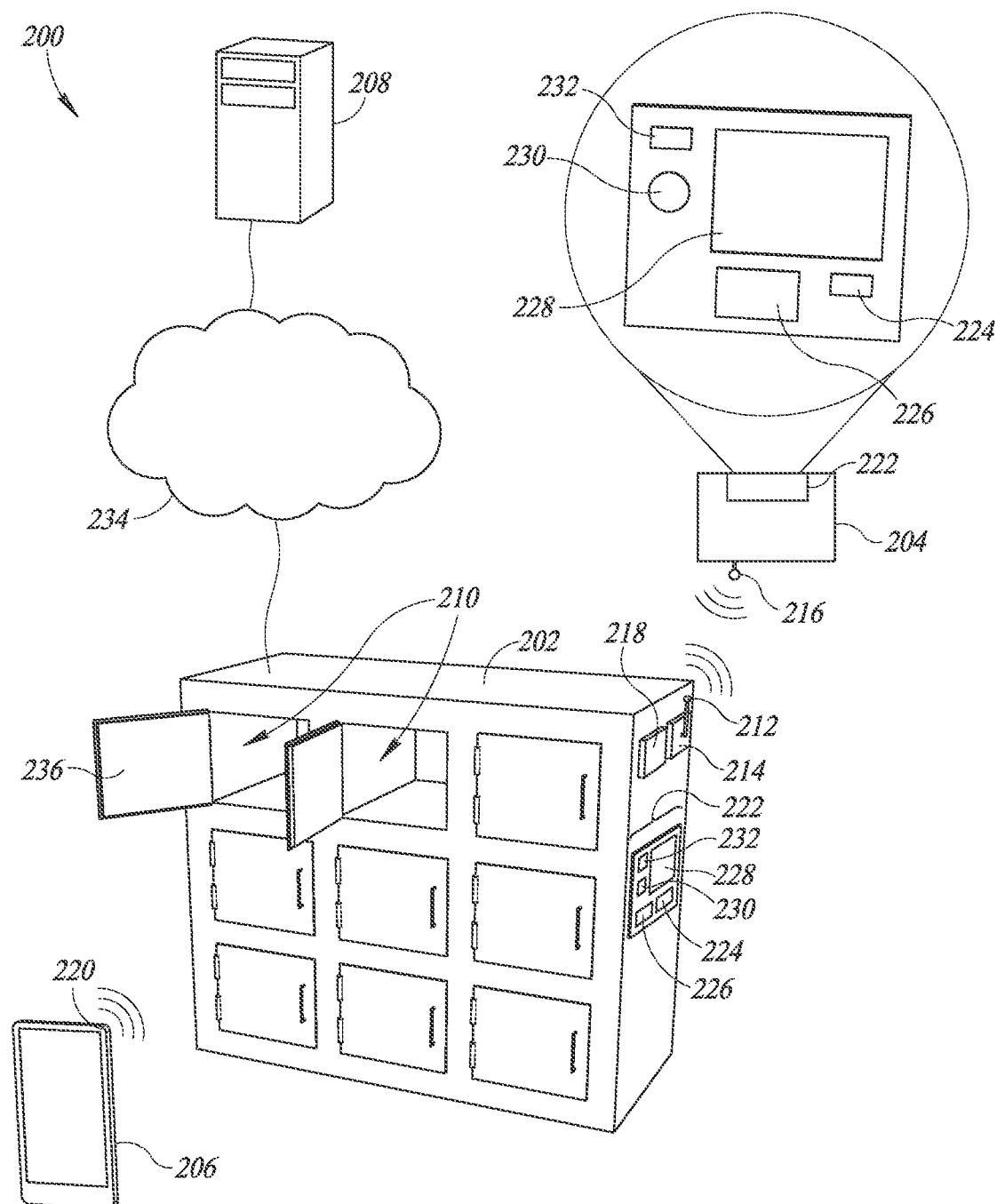
FIG. 2 is schematic diagram of a multi-modal food preparation system that includes a vending kiosk, a purchasing kiosk, and a mobile device, according to one illustrated implementation.

FIG. 2 shows a kiosk-based food vending system 200 that includes a vending kiosk 202, a purchasing kiosk 204, a mobile device 206, and a remote order processing system 208, according to one illustrated implementation. In some implementations, the kiosk-based food vending system 200 may function in one of the kiosk vending mode 110, the constellation mode, and/or the cook en route mode 130. In some implementations, the kiosk-based food vending system 200 may selectively transition between the kiosk vending mode 110, the constellation mode, and/or the cook en route mode 130 as a multi-modal food preparation system.

The vending kiosk 202 may include one or more food preparation units 210 that contain items that may be purchased and subsequently retrieved by consumers. The vending kiosk 202 may be communicatively coupled with the purchasing kiosk 204 and the mobile device 206 via an antenna 212 and radio 214 that are included as part of the vending kiosk 202. The purchasing kiosk 204 may include a purchasing kiosk antenna 216 that the purchasing kiosk 204 may use to wirelessly transmit signals to, and receive wirelessly transmitted signals from, the antenna 212 on the vending kiosk. The mobile device 206 may include one or more mobile device antenna 220 that the mobile device 206 may use to wirelessly transmit signals to, and receive wirelessly transmitted signals from, the antenna 212 on the vending kiosk 202. The purchasing kiosk 204 and/or the mobile device 206 may advantageously be used to receive and/or authorize purchase transactions at locations that are remote from the vending kiosk 202 from which the purchased items are retrieved. Such an arrangement provides consumers with the ability to place and authorize purchase transactions at their convenience, such as, for example, when the consumer is in transit to the vending kiosk 202. Such an arrangement may be used for crowd control and management by separating the purchase transaction activities at the purchasing kiosk 204 from the item retrieval activities at the vending kiosk 202, thereby decreasing the number of consumers who may be congregating around the vending kiosk 202 at any given time.

The vending kiosk 202 may include a control system 218. The control system 218 may take the form of any current or future developed processor-enabled device capable of executing one or more instruction sets. The control system 218 may include one or more processing units to execute one or more processor-readable instructions, instruction sets, or instruction blocks. The control system 218 may include a system memory to store one or more processor-readable instructions, instruction sets, or instruction blocks to be executed by the processor. Such processor-readable instructions, instruction sets, or instruction blocks may be used to generate one or more control signals that may be used to control the various components of the vending kiosk 202. In some implementations, the processor-readable instructions, instruction sets, or instruction blocks may control the operation of various subsystems or components on the vending kiosk 202, such as various components of a user input device 222. In some implementations, the control system 218 may be used to communicate using one or more using wireless communications protocols via the antenna 212 and radio 214. In some implementation, some or all of the processor-readable instructions, instruction sets, or instruction blocks may be executed by an off-board processor-enabled device, such as the remote order processing system 208. In such an implementation, the resulting control signals may be transmitted to the vending kiosk via a communication network.

In some implementations, one or more components in the wireless network may communicate using wireless communications protocols, such as protocols for wireless local area networks (e.g., WIFI®, IEEE 802.11, WiMAX, IEEE 802.116, VoIP, and the like) or protocols for wireless peer-to-peer communications (e.g., Bluetooth®, Bluetooth® Low Energy, and the like). In some implementations, the devices such as the vending kiosk 202, the purchasing kiosk 204, and/or the mobile device 206 may communicate via near field communication (NFC) and/or radio frequency identification (RFID).

In some implementations, the purchasing kiosk 204 and/or the vending kiosk 202 may include a user input device 222 that may include one or more of a magnetic stripe reader 224, a keypad 226, a touchscreen 228, an image capture device 230, and/or a biometric capture device 232. In some implementations, the magnetic stripe reader 224 may be used to read and collect information that has been encoded within a financial transaction card using, for example, a magnetic stripe, a card chip, or some other type of storage medium. The magnetic stripe reader 224 may be communicatively coupled to one or more processors that may authorize a requested purchase transaction based upon information stored within and/or associated with the financial transaction card. Such one or more processors may be located locally at the purchasing kiosk 204 and/or remotely from the purchasing kiosk 204 at one or more processor-enabled devices, such as the remote order processing system 208, that may be communicatively coupled to the purchasing kiosk 204 via a communications network 234.

The keypad 226 and/or touchscreen 228 may be used to enter information related to an item stored within one or more of the food preparation units 210 in the vending kiosk 202. In such an implementation, for example, the keypad 226 and/or touchscreen 228 may be used to enter a key code that may associated with a previous purchase transaction and/or order to be retrieved from one of the food preparation units 210 in the vending kiosk 202. In some implementations, the key code may include an order identifier that may be associated with a previous purchase transaction and may be comprised of a unique code that is associated with an order to be retrieved from the vending kiosk 202. In some implementations, the order identifier may be a randomly generated identifier that is not related to the order identifiers associated with other items being stored within the vending kiosk 202. Such a randomly generated identifier may be used, for example, to prevent orders from being stolen, and to reduce the possibility that an order entry that has been mis-entered will nonetheless open the door 236 to one of the food preparation units 210 associated with another order. In some implementations, the key code may additionally or alternatively include a customer identifier that may be associated with the customer who will be retrieving the order from the vending kiosk 202. In some implementations, the touchscreen 228 may be used to display information identifying the appropriate door 236 from which a consumer can retrieve an order from the vending kiosk 202.

The image capture device 230 may include, for example, a video camera or a still-image camera that may be used to capture images. In some implementations, such images may include, for example, machine-readable symbols that may be displayed within a field-of-vision of the image capture device 230. Such machine-readable symbols may include, for example, bar codes and/or Quick Response codes. In such an implementation, the machine-readable symbols may be affixed to a physical object (e.g., printed on a piece of paper) and/or may be rendered on a changeable display. For example, in some implementations, the machine-readable symbol may be electronically transmitted to a portable device via, for example, an email and/or text to an address associated with the consumer, to be rendered on a display of the portable device within the field-of-vision of the image capture device 230. The image capture device 230 in such an implementation may transmit the captured image of the machine-readable symbol to a processor-enabled device to decode the information contained within the machine-readable symbol. Such a processor enabled device may be local to the purchasing kiosk 204 or located remotely from the purchasing kiosk 204. In response, the processor-enabled device may transmit one or more signals that may result in the appropriate door 236 to one of the food preparation units 210 in the vending kiosk 202 being unlocked for the consumer.

The biometric capture device 232 and associated software may be used to identify consumers based upon one or more physical characteristics. The biometric capture device 232 and associated software may be used to identify consumers based upon, for example, one or more of fingerprints, facial features, eye feature, vocal characteristics, and/or any other unique physical characteristic of the consumer. In some implementations, such software may be implemented by one or more processor-enabled devices, including processor-enabled devices that may be communicatively coupled to the purchasing kiosk 204 via a communications network. Once the biometric capture device 232 and associated software has identified the consumer, the processor-enable device may transmit one or more signals that may result in the appropriate door 236 to one of the food preparation units 210 in the vending kiosk 202 being unlocked for the consumer.

The mobile device 206 may be used to enter purchasing information and to retrieve an item from one of the food preparation units 210 in the vending kiosk 202. Such purchasing and retrieval via the mobile device 206 may be facilitated by a user application, or app, that is implemented on and displayed by the mobile device 206. In some implementations, the consumer may use a software application (app) with an associated user interface presented by the mobile device 206 to authorize a purchase transaction for an item held in one of the food preparation units 210 in the vending kiosk 202. In some implementations, the app may be used to display pictures or other information related to the items stored in the various food preparation units 210 in the vending kiosk 202. In some implementations, the app rendered by the mobile device 206 may be used to display additional information to facilitate a purchase transaction by the consumer. For example, in some implementations, the app may be used to display or otherwise present information, such as location information in the form of a map and/or address list, for multiple vending kiosks 202 located within the vicinity of the consumer. Such information may also include the type of items currently available for purchase from each of the different vending kiosks 202. Such an app may enable the consumer to remotely authorize a purchase transaction for items that may be retrieved from one of the various vending kiosks 202. The consumer may then travel to the appropriate vending kiosk 202 without worrying that the item may have been sold out in during the interim period while the consumer traveled to the vending kiosk 202.

In some implementations, the consumer may use the app rendered by the mobile device 206 to retrieve items from the vending kiosk 202. In some implementations, for example, the app may be used to produce a machine-readable symbol that may be detected by the vending kiosk 202. Such a machine-readable symbol may be in the form of a visual symbol (e.g., a bar code symbol or a Quick Response code symbol) that may be detected by an image capture device 230 at the vending kiosk 202. In some implementations, a machine-readable symbol may be contained within a wireless transmission, such as an NFC signal and/or an RFID signal, that may be received by the antenna 212 and radio 214 at the vending kiosk 202. Upon receiving and confirming the machine-readable symbol, the vending kiosk may open the door 236 to the appropriate food preparation units 210 of the vending kiosk 202 to provide access to the food item to be retrieved from the associated food preparation unit 210. In some implementations, the app may be used to display information identifying the door 236 to the appropriate food preparation unit 210 of the vending kiosk 202 upon confirming the purchase transaction.

The remote order processing system 208 may be communicatively coupled to the vending kiosk 202 via the communications network 234. In some implementations, the remote order processing system 208 may execute one or more instructions from a purchase confirmation application to confirm a purchase transaction for one or more food items being held within one or more of the food preparation units 210 in the vending kiosk 202. Such purchase transactions may be initiated by one or more of the vending kiosk 202, the purchasing kiosk 204, and/or the mobile device 206, for example. The purchase confirmation application can be executed by one or more hardware circuits, for instance one or more processors and stored on one or more associated nontransitory storage media, e.g., memory (e.g., FLASH, RAM, ROM) and/or spinning media (e.g., spinning magnetic media, spinning optical media) that stores at least one of processor-executable instructions or data. The remote order processing system 208 may communicatively couple with the vending kiosk 202 to transmit information to confirm a purchase transaction. Some communications can employ one or more proprietary communications channels, for instance a proprietary network communications channel like a proprietary Local Area Network (LAN) or proprietary Wide Area Network (WAN) such as one or more intranets. Some communications can employ one or more non-proprietary communications channels, for instance one or more non-proprietary network communications channels like a Wide Area Network (WAN) such as the Internet and/or cellular provider communications networks including voice, data and short message service (SMS) networks or channels as part of the communications network 234.

In some implementations, the remote order processing system 208 may execute one or more instructions from an end user authentication application to authenticate the identity of an end user to retrieve one or more food items being held within one or more of the food preparation unit 210 in the vending kiosk 202. Such end user authentication may be initiated by one or more of the vending kiosk 202, the purchasing kiosk 204, and/or the mobile device 206. The end user authentication application can be executed by one or more hardware circuits, for instance one or more processors and stored on one or more associated nontransitory storage media, e.g., memory (e.g., FLASH, RAM, ROM) and/or spinning media (e.g., spinning magnetic media, spinning optical media) that stores at least one of processor-executable instructions or data. The remote order processing system 208 may communicatively couple with the vending kiosk 202 to transmit information to confirm a purchase transaction. Some communications can employ one or more proprietary communications channels, for instance a proprietary network communications channel like a proprietary Local Area Network (LAN) or proprietary Wide Area Network (WAN) such as one or more intranets. Some communications can employ one or more non-proprietary communications channels, for instance one or more non-proprietary network communications channels like a Wide Area Network (WAN) such as the Internet and/or cellular provider communications networks including voice, data and short message service (SMS) networks or channels as part of the communications network 234.

In some implementations, the remote order processing system 208 may transmit routing, cooking (e.g., temperature control schedule), and/or destination instructions to the vending kiosk 202 and/or one or more delivery vehicles (not shown) via the communications network 234. Such routing and/or destination instructions may be used, for example, when the vending kiosk 202 is autonomously movable. The vending kiosk 202 may store the transmitted routing, cooking, and/or destination instructions on one or more nontransitory storage media to be used during routing of the vehicle, cooking of food items, and/or travel to a destination. In some implementations, the remote order processing system 208 may transmit updated routing, cooking, and/or destination instructions to the vending kiosk 202, which may thereby update the previously stored instructions. In some implementations, the vending kiosk 202 may transmit information back to the remote order processing system 208. Such information may include, for example, number and amount of sales of food items, remaining ingredients left in the vending kiosk 202, current location of the vending kiosk 202, and like information. The routing, cooking, and/or destination instructions may be used by the vending kiosk 202 to travel to the distribution location.

Figure 3A:
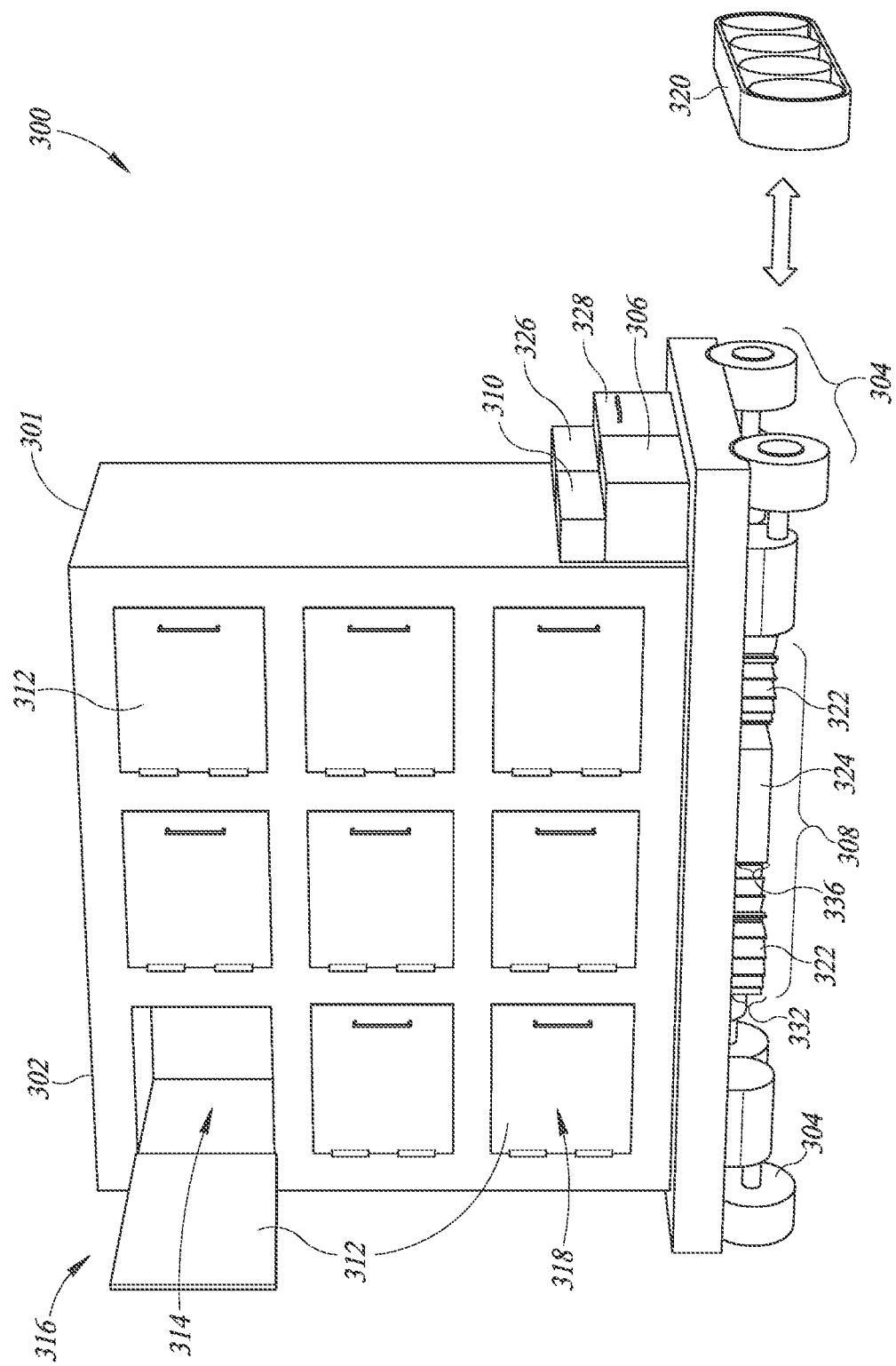
FIG. 3A is front, top, right isometric view of a kiosk that includes wheels or optional treads, and may operate in any of a kiosk vending mode, a constellation mode, and a cook en route mode, according to at least one illustrated implementation.
Figure 3B:
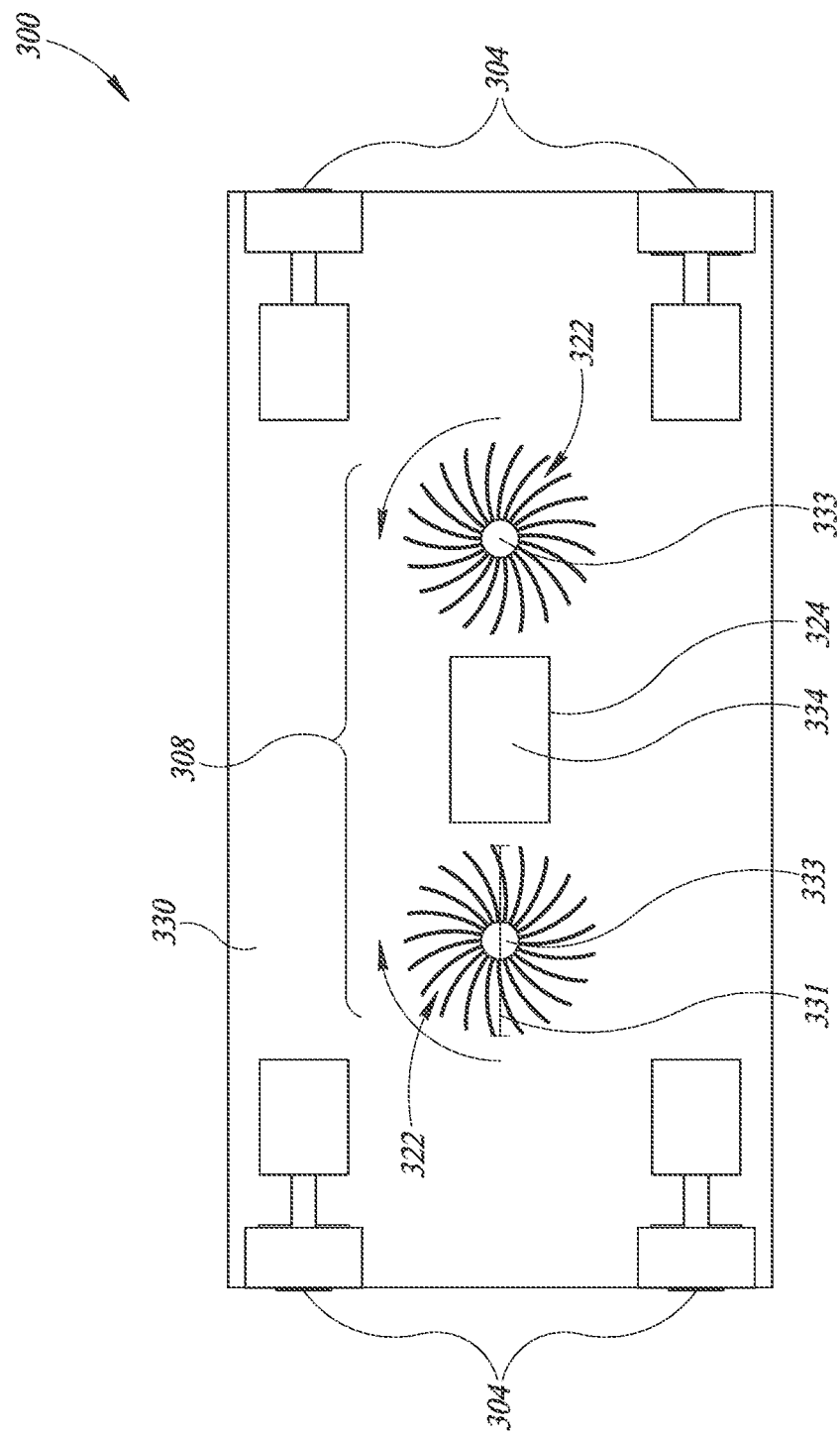
FIG. 3B is a bottom plan view of the kiosk of FIG. 3A, according to at least one illustrated implementation.

FIGS. 3A and 3B show a multi-modal food preparation system 300 that includes a self-propelled kiosk 301 with a vending kiosk 302, a set of wheels 304, a motor 306, an optional cleaning subsystem 308, and an on-board self-propelled vehicle control system 310, according to at least one illustrated implementation. Such a multi-modal food preparation system 300 may selectively transition between the kiosk vending mode 110, the constellation mode, and/or the cook en route mode 130 as a multi-modal food preparation system. Although depicted as including a self-propelled kiosk 301, the multi-modal food preparation system 300 may optionally not have an on-board self-propelled vehicle control system 310, and may optionally remain stationary.

The vending kiosk 302 may include a plurality of doors 312 that may provide access to corresponding food preparation units 314. Items, such as food items, may be retrieved from the food preparation units 314. Each of the doors 312 may be in an open configuration 316 to provide access to the associated food preparation unit 314, or in a closed configuration 318 to prevent access to the associated food preparation unit 314. In some implementations, one or more of the doors 312 may be selectively locked in the closed configuration 318 to protect the item being stored in the corresponding food preparation unit 314 until the item can be retrieved by the consumer who has purchased the item.

The set of wheels 304 may be used by the self-propelled kiosk 300 to travel across a geographic area. The motor 306 may be drivingly coupled to one or more wheels in the set of wheels 304, and used to drive the set of wheels 304 in an autonomous vehicle mode or in a semi-autonomous vehicle mode. The motor 306 may be any type of motor that may be used to drive the set of wheels 304, such as an electric motor, a gasoline-powered motor, a natural gas-powered motor, or any other type of similar motor. In some implementations, a set of treads 320 may be used to travel over a physical terrain. In such implementations, the set of treads 320 may provide improved stability when traveling over uneven terrain as compared to the set of wheels 304.

In some implementations, in the autonomous vehicle mode, the self-propelled kiosk 300 may be provided with destination information (e.g., destination location and/or route information), and the self-propelled kiosk 300 may navigate to the destination without any control or supervision by a human. In such an implementation, the self-propelled kiosk 300 may use one or more sensors to collect information about the surroundings of the self-propelled kiosk 300. Based upon the collected information, one or more control systems on the self-propelled kiosk 300 may determine what actions the self-propelled kiosk 300 should take in response in order to continue traveling towards the destination location. In some implementations, in the semi-autonomous vehicle mode, the self-propelled kiosk 300 may be subject to at least some control and/or supervision by a human. In such an implementation, for example, the self-propelled kiosk 300 may use one or more sensors to collect information about the surroundings of the self-propelled kiosk 300. A human controller may have the ability to review the collected information and control the navigation of the self-propelled kiosk 300 based upon this collected information. In some implementations, the human controller may intervene to control the self-propelled kiosk 300 in limited situations, such as, for example, when a control system on the self-propelled kiosk 300 cannot identify a next action to take in a given situation.

The cleaning subsystem 308 may include one or more brushes 322, a plenum 324, and a low-pressure source 326, and a debris collection compartment 328. The brushes 322 and the plenum 324 may be located along a bottom-facing side 330 (FIG. 3B) of the self-propelled kiosk 300, and may be oriented to face towards the ground or other surface on which the self-propelled kiosk 300 rests. In some implementations, the brushes 322 may have an annular shape or a circular shape with an outside diameter 331 and a height 332. The height 332 of the brushes 322 may be equal to or larger than a distance separating the bottom-facing side 330 of the self-propelled kiosk 300 from the ground or surface on which the self-propelled kiosk 300 rests. In this situation, at least a portion of the brushes 322 may make contact with the surface on which the self-propelled kiosk 300 rests to facilitate the collection of debris from the surface. In some implementations, at least some of the brushes 322 may be drivingly coupled to a motor that may move the brushes 322 to improve the collection of debris. In implementations in which the brushes 322 have a circular profile, the motor may rotate the brushes 322 about an axis of rotation 333 that extends outward from a center of the brushes 322. In such an implementation, the brushes 322 may be rotated to sweep debris towards a collection component (e.g., the plenum 324, discussed below) located on the bottom facing side 330 of the self-propelled kiosk 300. For example, in implementations involving brushes 322 with a circular shape, the portion of the brush 322 facing the direction of movement of the self-propelled kiosk 300 may be rotated towards collection component to thereby facilitate the collection of debris.

The cleaning subsystem 308 may include a plenum 324 and an associated low pressure source 326. The plenum 324 may have an open end 334 and extend outward from the bottom-facing side 330 of the self-propelled kiosk 300 such that the open end 334 is directed towards the surface that supports the self-propelled kiosk 300. In some implementations, the open end 334 of the plenum 324 may have a rectangular profile with a length and a width, and the plenum 324 may have a height 336. Such height 336 may be less than the distance from the bottom-facing side 330 of the self-propelled kiosk 300 and the surface on which the self-propelled kiosk 300. The plenum 324 may be in fluid communication with the low pressure source 326, such as a pump. The low pressure source 326 may create a low pressure that is less than an atmospheric pressure of the ambient environment surrounding the self-propelled kiosk 300. The low pressure created by the low pressure source 326 may produce a suction effect at the open end 334 to thereby draw debris into the open end 334 of the plenum 324.

The plenum 324 may be in fluid communication with a debris collection compartment 328 such that a fluid pathway extends from the open end 334 of the plenum 324 to the debris collection compartment 328. The debris that enters the open end 334 of the plenum 324 may travel through the fluid pathway to the debris collection compartment 328. The debris collection compartment 328 may include an interior cavity that may store the debris collected by the cleaning subsystem 308. In some implementations, the debris collection compartment 328 may be selectively removable from the self-propelled kiosk 300 such that the debris contained within the debris collection compartment 328 may be emptied.

The on-board self-propelled vehicle control system 310 may take the form of any current or future developed processor-enabled device capable of executing one or more instruction sets. The on-board self-propelled vehicle control system 310 may include one or more processing units to execute one or more processor-readable instructions, instruction sets, or instruction blocks. The on-board self-propelled vehicle control system 310 may include a system memory to store one or more processor-readable instructions, instruction sets, or instruction blocks to be executed by the processor. Such processor-readable instructions, instruction sets, or instruction blocks may be used to generate one or more control signals that may be used to control the various components of the self-propelled kiosk 300, such as the motor 306 and/or the cleaning subsystem 308. In some implementations, the processor-readable instructions, instruction sets, or instruction blocks may control the operation of self-propelled kiosk 300 in one or both of the autonomous vehicle mode and the semi-autonomous vehicle mode. In some implementation, some or all of the processor-readable instructions, instruction sets, or instruction blocks may be executed by an off-board processor-enabled device. In such an implementation, the resulting control signals may be transmitted to the vending kiosk via a communication network.

Figure 4A:
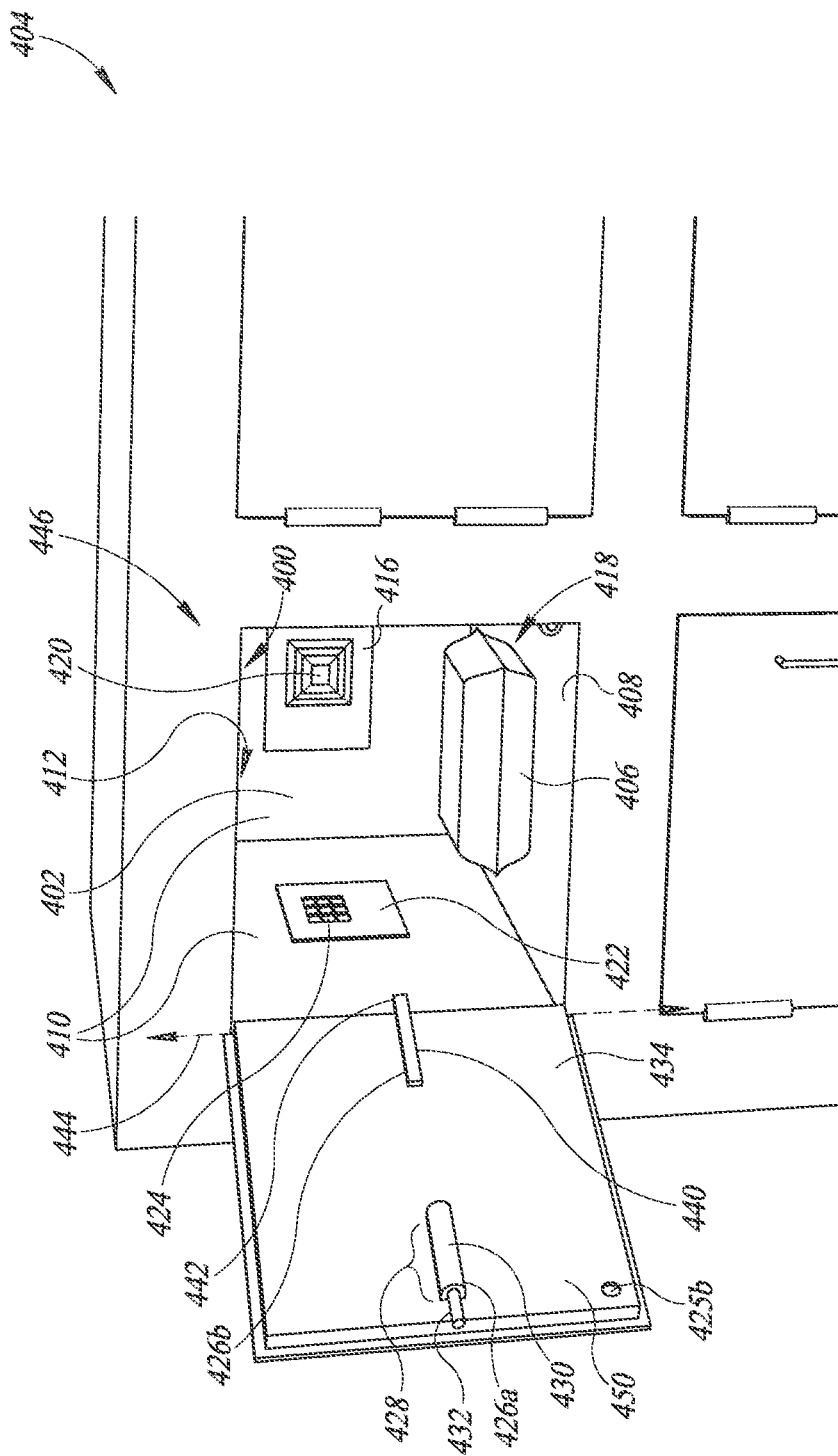
FIG. 4A front, top, right isometric view of an interior of a food preparation unit in a vending kiosk, according to at least one illustrated implementation.
Figure 4B:
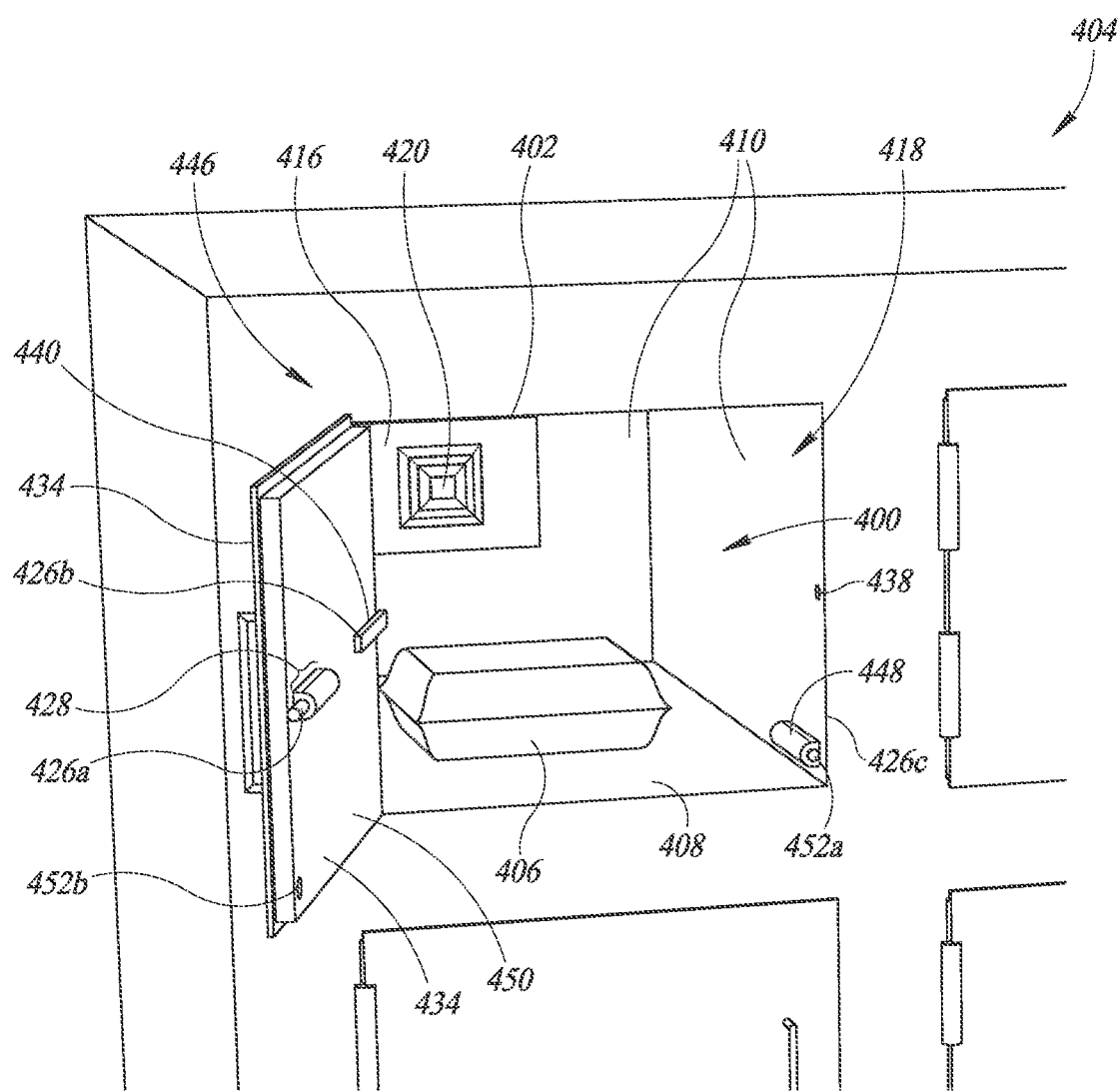
FIG. 4B is a front, top, left isometric view of the interior of the food preparation unit in the vending kiosk shown in FIG. 4A, according to at least one illustrated implementation.

FIGS. 4A and 4B show different isometric views of an interior 400 of one food preparation unit 402 in a vending kiosk 404, according to at least one illustrated implementation. A container 406, such as a container that may hold one or more food items, is supported in the food preparation unit 402, for instance resting one a bottom surface 408 of the food preparation unit 402. The interior 400 of the food preparation unit 402 may include one or more side walls 410 and an upper surface 412. The bottom surface 408, the one or more side walls 410, and the upper surface 412 may comprise the interior surfaces of the food preparation unit 402.

The food preparation unit 402 may include a heater 416 that may be used to increase the temperature of the interior 400 of the food preparation unit 402 to a heated state. The heater 416 may include one or more of an electrically resistive heating element, a natural gas burner, a propane burner, and/or an inductive heating element. In some implementations, the heater 416 may be positioned, for example, along a side wall 410 that is opposite the opening 418 to the food preparation unit 402. In such an implementation, the heater 416 may include a heater opening 420 through which heat may be introduced to the interior 400 of the food preparation unit 402. Alternatively, one or more walls of the compartments may include thermally radiant elements (e.g., electrically resistive conduits carrying heated fluid). In some implementations, a fan may be used to direct heated air into the interior 400 of the food preparation unit 402 through the heater opening 420 or to otherwise circulate heated air throughout the food preparation unit 402.

In some implementations, each food preparation unit 402 in the vending kiosk 404 may include a separate heater 416, such that the vending kiosk 404 includes a plurality of heaters 416. In such implementations, at least one of the plurality of heaters 416 may include an electrically resistive heating element. In some implementations, the heated state provided by the heater 416 may include a cooking state in which the heater 416 may raise the temperature in the food preparation unit 402 to at least 325° F. to cook an item of food stored in the compartment. In some implementations, the heated state provided by the heater 416 may include a heating state in which the heater 416 may be operable to raise the temperature in the food preparation unit 402 to between 140° F. and 250° F. to warm an already cooked item of food stored in the interior 400 of the food preparation unit 402. In some implementations, the heater 416 may be operable transition between the cooking state and the warming state based upon one or more signals, such as signals that may be transmitted by a processor-enabled device. In such implementations, for example, the heater 416 may transition from the cooking state to the warming state in response to a food item being fully cooked, such that the fully cooked food item may be maintained at a warm, elevated temperature until the food item is retrieved.

In some implementations, the food preparation unit 402 may include a cooler 422 that may be used to decrease the temperature of the interior 400 of the food preparation unit 402. The cooler 422 may include one or more of a refrigerant carrying coil and compressor, a Peltier device, or thermoelectric cooler. In some implementations, the cooler 422 may be positioned, for example, along one of the side walls 410 of the food preparation unit 402. In such an implementation, the cooler 422 may include a cooler opening 424 through which cooled, refrigerated air may be introduced to the interior 400 of the food preparation unit 402 to thereby lower the temperature of the interior 400 of the food preparation unit 402 in a refrigerated state. In some implementations, a fan may be used to direct the refrigerated air into the interior 400 of the food preparation unit 402. One or more Peltier devices can advantageously be used for both cooling and heating.

In some implementations, each food preparation unit 402 in the vending kiosk 404 may include a separate cooler 422, such that the vending kiosk 404 includes a plurality of coolers 422. In such implementations, at least one of the plurality of coolers 422 may include a refrigerant carrying coil. In some implementations, the refrigerated state provided by the cooler 422 may lower the temperature within the interior 400 of the food preparation unit 402 to at or below 41° F. to cool an item of food stored in the compartment. In some implementations, one food preparation unit 402 may include a heater 416 and a cooler 422 that may be operable to transition between the refrigerated state, the warming state, and the cooking state. In such implementations, for example, the cooler 422 may maintain a food item at a lower temperature (e.g., at or below 41° F.) until an order for the food item is received, and/or a signal to begin cooking the food item is received. At that point, the cooler 422 may stop providing refrigerated air to the interior 400 of the food preparation unit 402. At or about the same time, the heater 416 may transition to the cooking state to cook the food item held within the interior 400 of the compartment until the food item is cooked. When the food item is cooked, the heater 416 may transition from the cooking state to the warming state to keep the food item warm until the food item is retrieved from the food preparation unit 402.

The food preparation unit 402 may optionally include a stone floor or cast iron floor. In some implementations, the food preparation unit 402 includes electrically radiant elements. In some implementations, the food preparation unit 402 may include one or more Peltier thermoelectric heater/coolers. In some implementations, the food preparation unit 402 takes the form of air impingement ovens, including one or more blowers that blow extremely hot air, and optionally a rack with a manifold. In some implementations, the food preparation unit 402 may include a thermally insulative barrier, preferably a Yttrium, Indium, Manganese, and Oxygen (YInMn) barrier.

In some implementations, a processor enabled device or component (e.g., the control system 218 (see FIG. 2)) may be used to implement a temperature control schedule to be used to control the temperature state within one or more of the food preparation units 402 in the vending kiosk 404. Such temperature states may specify, for example, that the heater 416 heat the food preparation unit 402 to a cooking state to cook a food item, and then transition to a warming state to keep the cooked food item warm. In some implementations, the temperature control schedule may specify that the compartment be kept in a refrigerated state by the cooler 422 for a first time period, and then specify that the compartment be kept in a cooking state by the heater 416 for a second time period in order to completely cook the food item. In some implementations, the temperature control schedule may be based at least in part on an estimated pick-up time at which an end user will be arriving to pick-up the food item being cooked. As such, the temperature control schedule may be set to minimize the amount of time that elapses after the food item is completely cooked and the expected time at which the end user will arrive to retrieve the item. In some implementations, the temperature control schedule may be modified based upon an updated expected arrival and pick-up time for the end user. In some implementations, the temperature control schedule may be used to transition the food preparation unit 402 between one or more of the refrigerated state, the cooking state, and the warming state.

In some implementations, the vending kiosk 404 may include one or more actuators, such as a locking actuator 426a, a door-rotating actuator 426b, and a magnetic actuator 426c (collectively, "actuators 426"). Such actuators 426 may be comprised of one or more of a solenoid, a piston and cylinder (e.g., hydraulic, pneumatic), a pair of magnets including at least one electromagnet, or a pair of an electromagnet and a ferrous metal, for example. In some implementations, one or more of the locking actuator 426a, the door-rotating actuator 426b, and/or a magnetic actuator 426c may be included in the same structure and/or be implemented by the same actuator.

In some implementations, the locking actuator 426a may include a latch component 428 that may be comprised of a housing 430 and a selectively extendable latch 432 that may be used to lock and unlock the doors 434. In some implementations, the selectively extendable latch 432 may be selectively contained within the housing 430 in a retracted state and selectively extended from one end of the housing 430 in an extended state. In some implementations, the selectively extendable latch 432 may be selectively extended from the housing 430 when a door 434 is in the closed configuration (e.g., closed configuration 318) to thereby secure the door 434 in a locked state in the closed configuration. In some implementations, the selectively extendable latch 432 may engage with an associated strike plate 438 that is installed along a portion of the side wall 410 of the corresponding food preparation unit 402 when the selectively extendable latch 432 is in the extended state and the door 434 is in the locked state in the closed configuration (e.g., closed configuration 318).

In some implementations, the selectively extendable latch 432 may transition between the extended state and the retracted state responsive to an actuator signal that may be received, for example, by the latch component 428 from a processor-enabled device or component. In some implementations, for example, the selectively extendable latch 432 may transition to the retracted state when such an actuator signal is received. In such implementations, the selectively extendable latch 432 may default to the extended state in the absence of such an actuator signal. In some implementations, the selectively extendable latch 432 may include a beveled edge that faces the opening 418 of the food preparation unit 402. Such a beveled edge may facilitate the selectively extendable latch 432 retracting into the housing 430 sufficiently for the door 434 to transition to the closed configuration, at which point the selectively extendable latch 432 may transition to the extended state and engage with the strike plate 438 when the selectively extendable latch 432 and the strike plate 438 align.

In some implementations, the door-rotating actuator 426b may be physically coupled to the door 434 and/or to the food preparation unit 402 via a first door-rotating actuator portion 440 and to a portion of the food preparation unit 402 via a second door-rotating actuator portion 442. In such a configuration, the first door-rotating actuator portion 440 may be used to apply a rotational force to the door 434 to physically move the door 434 by rotating the door 434 about the axis of rotation 444, thereby transitioning the door 434 between an open configuration 446 and a closed configuration (e.g., closed configuration 318). In some implementations, the door-rotating actuator 426b may be responsive to an actuator signal received, for example, from a processor enabled device or component to physically move the door 434 to the open configuration 446 by applying an outward rotational force to the door 434. In the absence of such an actuator signal, the first door-rotating actuator portion 440 may apply an inward rotational force to the door 434 to thereby transition the door 434 to the closed configuration (e.g., closed configuration 318).

The magnetic actuator 426c may be used to apply a linear force on the door 434 to transition the door 434 between the open configuration 446 and the closed configuration. In some implementations, the magnetic actuator 426c may include a housing 448 mounted along a side wall 410 of the food preparation unit 402 and/or the interior surface 450 of the door 434, and a pair of magnets, a first magnet 452a mounted along the door 434 (e.g., in the housing 448) and a second magnet 452b mounted along the interior surface 450 of the door 434. The first magnet 452a and the second magnet 452b may be aligned when the door 434 is in the closed configuration (e.g., closed configuration 318). In some implementations, the first magnet 452a and the second magnet 452b may be of the same polarity such that the pair of magnets provides an outward rotational force on the door 434, thereby biasing the door 434 to the open configuration 446. In some implementations, the first magnet 452a and the second magnet 452b may be of opposite polarities such that the pair of magnets provides an inward rotational force on the door 434, thereby biasing the door 434 to the closed configuration (e.g., closed configuration 318). In some implementations, at least one of the first magnet 452a and the second magnet 452b may be an electromagnet that may be selectively activated, such as, for example, by an actuator signal received from a processor controlled device or component. In such an implementation, the pair of magnets may provide a rotational force when receiving such an actuator signal. In some implementations, the first magnet 452a and the second magnet 452b may be of opposite polarities such that the attractional force between the magnets may keep the door 434 in a closed and locked position. In such an implementation, an electromagnet may be employed, along with a circuit that controls a magnetic attraction (e.g., ON/OFF; North/South) of the electromagnet. The electromagnet may be paired with, for example a permanent magnet or a piece of ferrous metal, or another electromagnet.

In some implementations, the magnetic actuator 426c may include a housing and a selectively extendable arm (not shown) in which the selectively extendable arm is selectively contained within the housing in a retracted state, and selectively extended from the housing in an extended state. In such an implementation, for example, the selectively extendable arm may be responsive to selectively extend and/or retract based upon an actuator signal received from a processor-enabled device and/or component. For example, in some implementations, when the actuator signal is received, the selectively extendable arm may transition to the extended state, thereby providing an outward rotational force on the door 434 when the door 434 is in the closed configuration (e.g., closed configuration 318). Such an outward rotational force may be sufficient to physically move the door 434 away from the closed configuration (e.g., closed configuration 318). In some implementations, such movement may serve as a visual indication to a consumer of the food preparation unit 402 that holds the item associated with the consumer.

In some implementations, a processor-enabled device or component (e.g., the control system 218) may be used to control the operation of one or more of the heater 416, the cooler 422, the locking actuator 426a, the door-rotating actuator 426b, and/or the magnetic actuator 426c. The processor-enabled device may include one or more processing units to execute one or more processor-readable instructions, instruction sets, or instruction blocks. The processor-enabled device may include a system memory to store one or more processor-readable instructions, instruction sets, or instruction blocks to be executed by the processor. Such processor-readable instructions, instruction sets, or instruction blocks may be used to generate one or more control signals that may be used to control the various components of the vending kiosk 404, such as the actuators 426. In some implementations, the processor-readable instructions, instruction sets, or instruction blocks may control the operation of various subsystems or components on the vending kiosk, such as heater 416, and/or the cooler 422. In some implementation, some or all of the processor-readable instructions, instruction sets, or instruction blocks may be executed by an off-board processor-enabled device. In such an implementation, the resulting control signals may be transmitted to the vending kiosk via a communication network.

Figure 5:
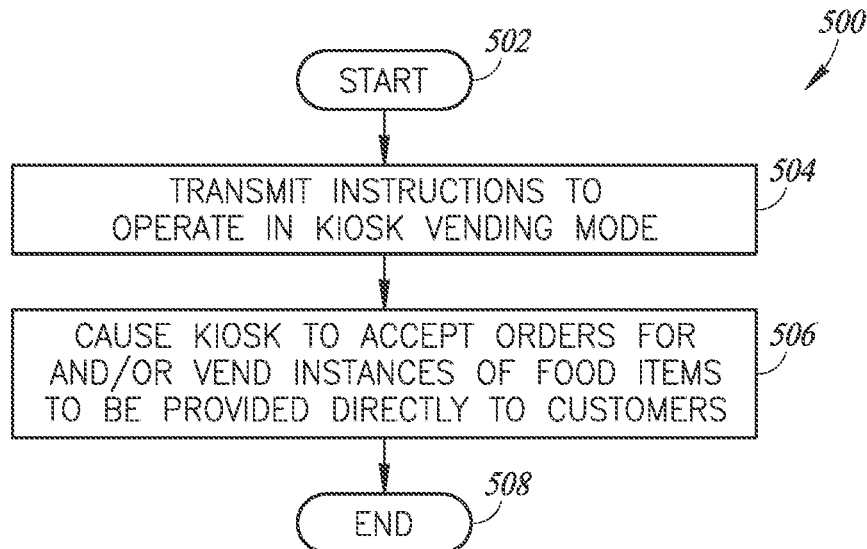
FIG. 5 is a logic flow diagram of a method of operation of a multi-modal food preparation system in a kiosk vending mode, according to one illustrated implementation.

FIG. 5 shows a method 500 that may be used to transmit information to a kiosk 102 to operate in a constellation mode 120 in a multi-modal food preparation system 100, according to one illustrated implementation. The method 500 can, for example, be executed by one or more processor-based devices, for instance the control system 218 and/or the remote order processing system 208, and starts at 502.

At 504, a processor-based device, for example, the remote order processing system 208, may transmit instructions to the kiosk 102 to operate in kiosk vending mode 110. The kiosk 102 may be located at a vending location 118, and may remain, stationary, at the vending location 118 while it operates in the kiosk vending mode 110. The kiosk 102 may include one or more food preparation units 104 that may each be used to prepare and/or vend one or more instances of food items 106 as a combined cooking and vending vehicle 102a. In some implementations, the food preparation unit 104 may include one or more heaters that may be used to selectively heat the food preparation unit 104. Such a heater may be used to cook or to maintain the warmth of the food item 106 contained or stored within the food preparation unit 104.

At 506, the instructions transmitted at 504 may cause the kiosk to accept orders for instances of food items, and/or to vend instances of food items that are provided directly to customers. In some implementations, such orders may be received from a wireless communication network, for example, via a wireless communication system 108. In some implementations, the kiosk 102 may receive orders transmitted from one or more customer processor-based communications devices 112 (e.g., a smart phone 112a or a tablet 112b) directly to the kiosk 102. In some implementations, the kiosk 102 may receive orders entered into a point-of-sale system 113 that may be incorporated into or communicatively coupled to the kiosk 102.

In response to receiving each order, the kiosk 102 may selectively warm or heat one or more of the food preparation units 104 via the associated heaters. The warming of one of the food preparation units 104 may be used to maintain a temperature of an instance of a food item 106 held within the food preparation unit 104. The heating of one of the food preparation units 104 may be used to cook an instance of a food item 106 held within the food preparation unit 104.

In some instances, the kiosk 102 may vend one or more food items to customers by providing each customer with access to the appropriate food preparation unit 104 when the customer arrives at the vending location 118. In some implementations, the access may be provided, for example, by the customer entering an order and/or identification code into a user interface that may be incorporated into the kiosk 102. In some instances, the consumer may access the appropriate food preparation unit 104 upon arriving at the vending location 118, for example, by entering an order and/or identification code into a user interface that may be accessible via the mobile device (e.g., the smartphone 112a) associated with the consumer. In some implementations, the customer may enter the order and/or identification code into the user input device 222 that may be accessible on a vending kiosk 202 and/or purchasing kiosk 204, which may be located at the vending location 118. In some instances, the kiosk 102 may detect the presence of a device (e.g., the smartphone 112a) associated with the consumer at the vending location 118 and provide access to the appropriate food preparation unit 104 in response.

At 508, the method 500 terminates, for example until invoked again. Alternatively, the method 500 may repeat continuously or repeatedly, or may execute as multiple instances of a multi-threaded process.

Figure 6:
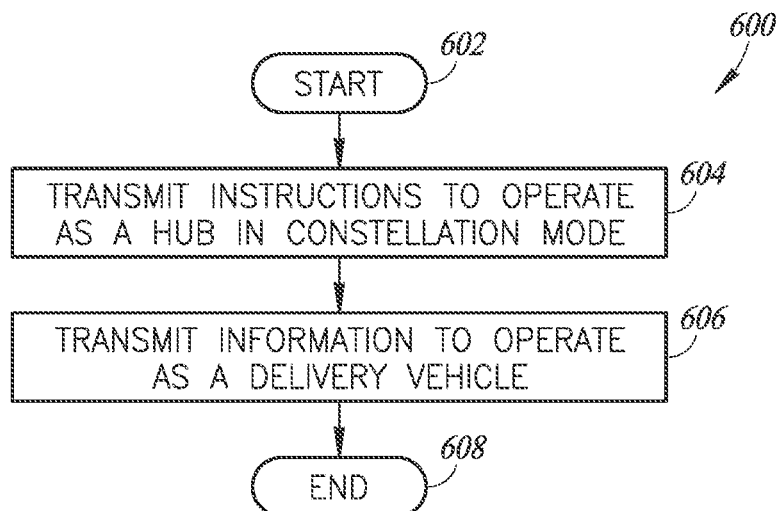
FIG. 6 is a logic flow diagram of a method of operation of a multi-modal food preparation system in a constellation mode, according to one illustrated implementation.

FIG. 6 shows a method 600 of operating a multi-modal food preparation system 100 in a constellation mode 120, according to one illustrated implementation. The method 600 can, for example, be executed by one or more processor-based devices, for instance the control system 218 and/or the remote order processing system 208, and starts at 602.

At 604, a processor-enabled device, such as, for example, the remote order processing system 208, may transmit instructions to a kiosk 102 to operate as a hub 136 in a constellation mode 120. Such instructions may include providing information regarding a location 134 at which the kiosk 102 is to serve as a hub 136. In some implementations, the instructions may include a description of the geographic area 138 for which the kiosk 102 is to serve as a hub 136. In some implementations, such instructions may include information regarding one or more delivery vehicles 140 that may provide deliveries from the kiosk 102 to delivery destinations 142 within the geographic area 138. Such vehicle information may include, for example, type of vehicle, location, information regarding the current driver of the delivery vehicle 140, amount of time on-shift, amount of time remaining in shift, carrying capacity of the delivery vehicle 140, and other such similar information.

In response to receiving the transmitted instructions, the kiosk 102 may begin to prepare one or more food items 106 that may be delivered to customers in the geographic area 138 surrounding the location 134. Such preparation may include, for example, heating the one or more food items in the respective food preparation unit 104. In some implementations, the food preparation unit 104 may warm the one or food items once the one or more food items are prepared to maintain the temperature of the one or more prepared food items at a desired temperature.

At 606, a processor-enabled device, such as, for example, the remote order processing system 208 and/or the control system 218 on the kiosk 102, may transmit information to one or more delivery vehicles 140. In some implementations, such information may include instructions to retrieve one or more food items 106 from the kiosk 102, and/or instructions to deliver the retrieved food items 106 to one or more delivery destinations 142. In response to receiving such information, the delivery vehicle 140 may be dispatched to the kiosk 102 operating as a hub 115. In some implementations, the dispatch of the delivery vehicle to the kiosk 102 operating as a hub 115 may be based on one or more criteria, such as, for example, the readiness of an order to be delivered by the delivery vehicle 140, an estimated travel time from the kiosk 102 operating as a hub 115 to a delivery destination 142 using a single destination delivery route, an estimated travel time from the kiosk 102 operating as a hub 115 to a delivery destination 142 located on a multiple destination delivery route, and a delivery time period for delivering an order to an associated delivery destination 142, in which the delivery time period may provide a threshold time by which delivery of the order is to be completed. In some implementations, the instructions transmitted to the delivery vehicle 140 may include, for example, destination information for the delivery destinations 142 associated with each of the respective orders of food items to be delivered. In some implementations, the instructions transmitted to the delivery vehicle 140 may include route information to the location 134 of the kiosk 102 and/or route information from the location 134 of the kiosk 102 to the delivery destination 142 associated with an order for an instance of a food item.

At 608, the method 600 terminates, for example until invoked again. Alternatively, the method 600 may repeat continuously or repeatedly, or may execute as multiple instances of a multi-threaded process.

Figure 7:
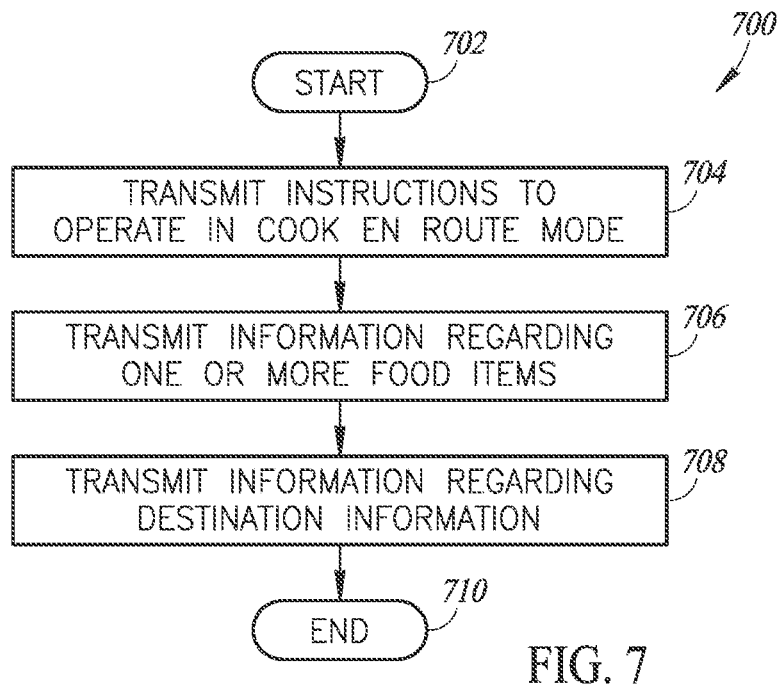
FIG. 7 is a logic flow diagram of a method of operation of a multi-modal food preparation system in a cook en route mode, according to at least one illustrated implementation.

FIG. 7 shows a method 700 of operating a multi-modal food preparation system 100 in a cook en route mode 130, according to at least one illustrated implementation. The method 700 can, for example, be executed by one or more processor-based devices, for instance the control system 218 and/or the remote order processing system 208, and starts at 702.

At 704, a processor-enabled device, such as, for example, the remote order processing system 208, may transmit instructions to a kiosk 102 to operate in a cook en route mode 130. Such instructions may cause the kiosk 102 to enter a mode of operation in which the kiosk 102 is operable to prepare and/or cook food items for delivery as the kiosk 102 travels between different delivery destinations 142. In such a mode, the kiosk 102 may serve as a cooking and delivery vehicle.

At 706, a processor-enabled device, such as, for example, the remote order processing system 208, may transmit information to the kiosk 102 regarding one or more food items to prepare and/or deliver. In some implementations, such information may include preparation and/or cooking instructions to prepare and/or cook food items to be delivered by the kiosk 102. In some implementations, the kiosk 102 may selectively warm or heat one or more of the food preparation units 104 via the associated heaters to warm and/or prepare an instance of a food item ordered by the consumer in response to receiving the information in 706. The warming of one of the food preparation units 104 may be used to maintain a temperature of an instance of a food item 106 held within the food preparation unit 104. The heating of one of the food preparation units 104 may be used to cook an instance of a food item 106 held within the food preparation unit 104. In such instances, after the instance of the food item 106 is cooked, the associated food preparation unit 104 may change selectively warm the cooked food item 106 to maintain the temperature of the cooked food item 106 unit is retrieved by a consumer. The process for cooking a food item ordered by a consumer may be based, at least in part, on an estimate of travel time for the kiosk 102 to travel to the consumer.

At 708, a processor-enabled device, such as, for example, the remote order processing system 208, may transmit information to the kiosk 102 regarding a destination location to deliver the prepared food item. As such, the information transmitted to the kiosk 102 may include, for example, destination information for the delivery destinations 142 associated with each of the respective orders of food items to be delivered. In some implementations, the instructions transmitted to the kiosk may include route information to the delivery destination 142 associated with an order for an instance of a food item. In some implementations, such route information may include a single-delivery route and/or a multiple-delivery route for the kiosk 102 to traverse in order to deliver one or more instances of food items to single delivery destination 142 and/or to multiple delivery destinations 142, respectively. In some implementations, the information in 708 regarding the delivery destinations 142 may be included in the same transmission and/or set of transmission that included the information in 706 regarding one or more food items to prepare and/or deliver.

At 710, the method 700 terminates, for example until invoked again. Alternatively, the method 700 may repeat continuously or repeatedly, or may execute as multiple instances of a multi-threaded process.

Figure 8:
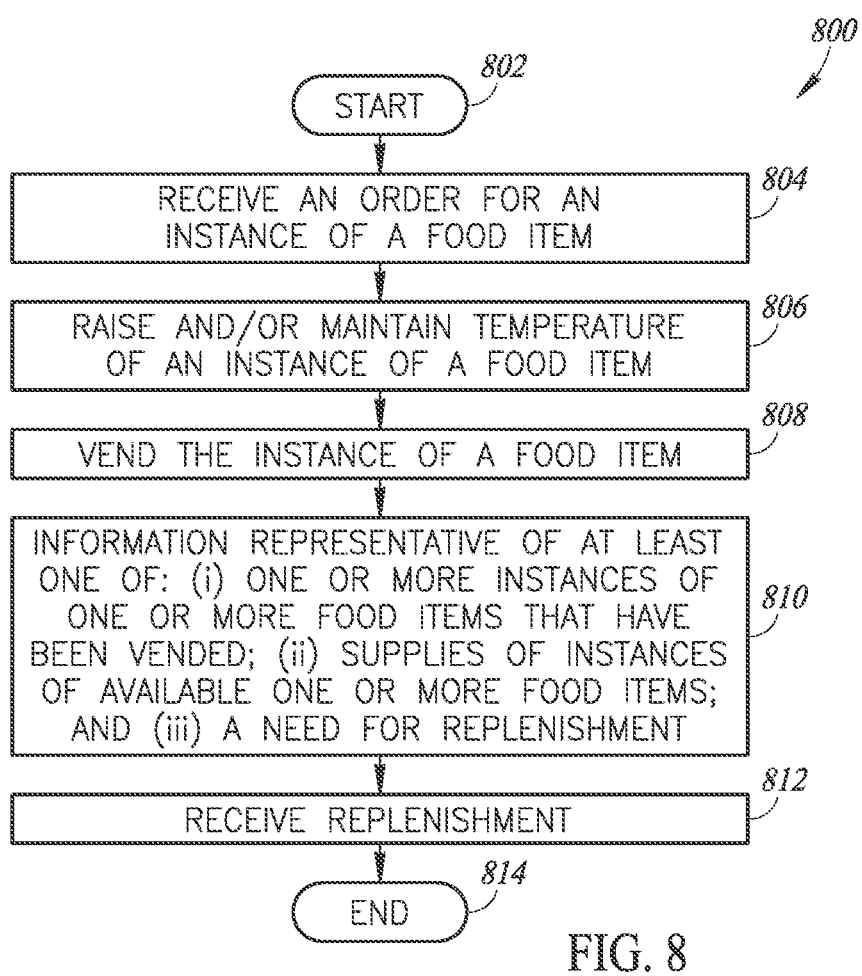
FIG. 8 is a logic flow diagram of a method of operation of a multi-modal food preparation system in which a kiosk prepares and/or vends instances of food items and is replenished with one or more supplies, according to at least one illustrated implementation.

FIG. 8 shows a method 800 of operating a multi-modal food preparation system 100 in which a kiosk 102 prepares and/or vends instances of food items and is replenished with one or more supplies, according to at least one illustrated implementation. The method 800 can, for example, be executed by one or more processor-based devices, for instance the control system 218 and/or the remote order processing system 208, and starts at 802.

At 804, a processor-enabled device, such as, for example, the control system 218 and/or the remote order processing system 208, may receive an order for an instance of a food item contained within one of the food preparation units 104 in a kiosk 102. Such a kiosk 102 may be operating in any one of the kiosk vending mode 110, the constellation mode, and/or cook en route mode 130. In some implementations, the processor-enabled device may receive orders transmitted from one or more customer processor-based communications devices 112 (e.g., a smart phone 112a or a tablet 112b) directly to the processor-enabled device (e.g., the remote order processing unit 114, and/or the control system 218). In some implementations, the processor-enabled device may receive orders entered into a point-of-sale system 113 that may be incorporated into or communicatively coupled to the kiosk 102. In some implementations, a remote order processing unit 114 may receive orders for instances of food items from one or more consumers and transmit such orders via the wireless communications network (e.g., wireless communications network 116) to the kiosk 102 via the wireless communication system 108.

At 806, a processor-enabled device, such as, for example, the control system 218 and/or the remote order processing system 208, may selectively raise and/or maintain a temperature within the food preparation unit 104 to heat and/or maintain the temperature of a food item contained within the food preparation unit 104. The warming of one of the food preparation units 104 may be used to maintain a temperature of an instance of a food item 106 held within the food preparation unit 104. The heating of one of the food preparation units 104 may be used to cook an instance of a food item 106 held within the food preparation unit 104. In such instances, after the instance of the food item 106 is cooked, the associated food preparation unit 104 may change selectively warm the cooked food item 106 to maintain the temperature of the cooked food item 106 unit is retrieved by a consumer.

At 808, the kiosk 102 and/or delivery vehicle 140 may vend the selected food item from the food preparation unit 104. In some implementations, the kiosk 102 may provide each customer with access to the appropriate food preparation unit 104 when the customer arrives at the vending location 118 and/or when the kiosk 102 and/or the delivery vehicle 140 arrives at a delivery destination 142. In some implementations, the access may be provided, for example, by the customer entering an order and/or identification code into a user interface that may be incorporated into the kiosk 102 and/or the delivery vehicle 140. In some instances, for example, the consumer may access the appropriate food preparation unit 104 upon arriving at the vending location 118 by entering an order and/or identification code into a user interface that may be accessible via the mobile device (e.g., the smartphone 112a) associated with the consumer. In some implementations, the customer may enter the order and/or identification code into the user input device 222 that may be accessible on a vending kiosk 202 and/or purchasing kiosk 204, which may be located at the vending location 118. In some instances, the kiosk 102 may detect the presence of a device (e.g., the smartphone 112a) associated with the consumer at the vending location 118 and provide access to the appropriate food preparation unit 104 in response.

At 810, the kiosk 102 may transmit information via a wireless communication system 108 to an off-site processor-enabled device, such as, for example, the replenishment server 126. Such information may include, for example, such as, for example, the amount of supplies (e.g., instances of food items 106) currently available at the kiosk 102, the number of instances of food items 106 the kiosk has vended, the rate at which the kiosk 102 is using the supplies and/or vending instances of food items 106, the rate at which the kiosk 102 is expected to use the supplies in the future, pending orders to be fulfilled by the kiosk 102, and/or a signal received from the kiosk 102 indicating a need for replenishment of one or more supplies.

At 812, the kiosk may be replenished, such as, for example, by the vehicle 124. In some instances, in response to receiving such instructions, the vehicle 124 may be dispatched to the vending location 118 to replenish the kiosk 102. Once the vehicle 124 reaches the vending location 118, the kiosk 102 may receive replenishment from the vehicle 124 based at least in part of the information received by the replenishment server 126. In some instances, in response to receiving such instructions, the kiosk 102 may be dispatched to receive replenishment at the replenishment location 144.

At 814, the method 800 terminates, for example until invoked again. Alternatively, the method 800 may repeat continuously or repeatedly, or may execute as multiple instances of a multi-threaded process.

Figure 9:
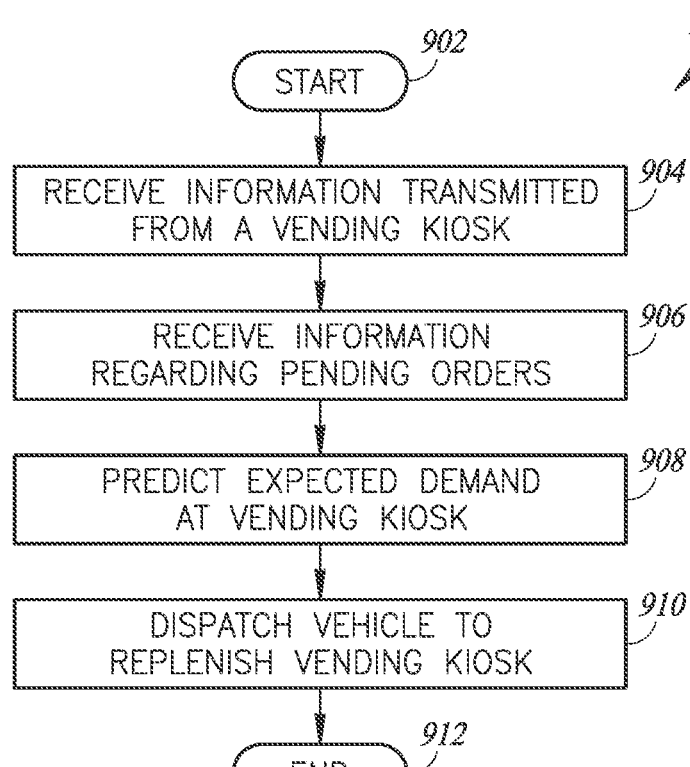
FIG. 9 is a logic flow diagram of a method of operation of a multi-modal food preparation system in which a kiosk is replenished with one or more supplies, according to at least one illustrated implementation.

FIG. 9 shows a method 900 of operating a multi-modal food preparation system 100 in which the kiosk 102 is replenished with one or more supplies, according to at least one illustrated implementation. The method 900 can, for example, be executed by one or more processor-based devices, for instance the remote order processing system 208 and/or the replenishment server 126, and starts at 902.

At 904, a processor-enabled device, such as, for example, the remote order processing system 208 and/or the replenishment server 126, may receive information transmitted from the kiosk 102. Such information may include, for example, such as, for example, the amount of supplies (e.g., instances of food items 106) currently available at the kiosk 102, the number of instances of food items 106 the kiosk has vended, the rate at which the kiosk 102 is using the supplies and/or vending instances of food items 106, the rate at which the kiosk 102 is expected to use the supplies in the future, and/or a signal received from the kiosk 102 indicating a need for replenishment of one or more supplies.

At 906, a processor-enabled device, such as, for example, the remote order processing system 208 and/or the replenishment server 126, may receive information regarding pending orders to be processed by the kiosk 102. Such information may be received, for example, from the kiosk 102 and/or from the remote order processing system 208. The pending order information may include, for example, the number of pending orders for the kiosk 102, the number of each type of food item 106 that is currently part of a pending order for the kiosk, the amount of time for the kiosk 102 to prepare and fulfill each pending order, the quantity of each supply that will be needed to prepare and fulfill each pending order, an estimated time by which each pending order and/or the set of pending orders will be completed, and/or an each pending order will be delivered.

At 908, a processor-enabled device, such as, for example, the remote order processing system 208 and/or the replenishment server 126, may predict future demand at the kiosk 102. For example, in some implementations, the processor-enabled device may include a neural network 128 or other learning machine that may be used to predict future demand at the kiosk 102. Such a neural network 128 may receive some or all of the information listed above as inputs to determine future demand. In some implementations, the neural network 128 may use training data in making such a calculation. Such training data may represent actual demand for instances of the food item 106 from the kiosk 102 that may have been experienced at previous times at the same or similar locations. As such, the neural network 128 may be able to take into account information regarding the sales of instances of food items 106 during specific days of the week, at a specific time and/or time range, during a special event, date, or holiday, and/or during one or more types of weather. The neural network 128 may use this training data to predict the demand for the instances of food items 106 in the future.

At 910, a processor-enabled device, such as, for example, the remote order processing system 208 and/or the replenishment server 126, may dispatch a vehicle 124 to replenish the kiosk 102 with one or more supplies and/or food items.

At 912, the method 900 terminates, for example until invoked again. Alternatively, the method 900 may repeat continuously or repeatedly, or may execute as multiple instances of a multi-threaded process.

Figure 10:
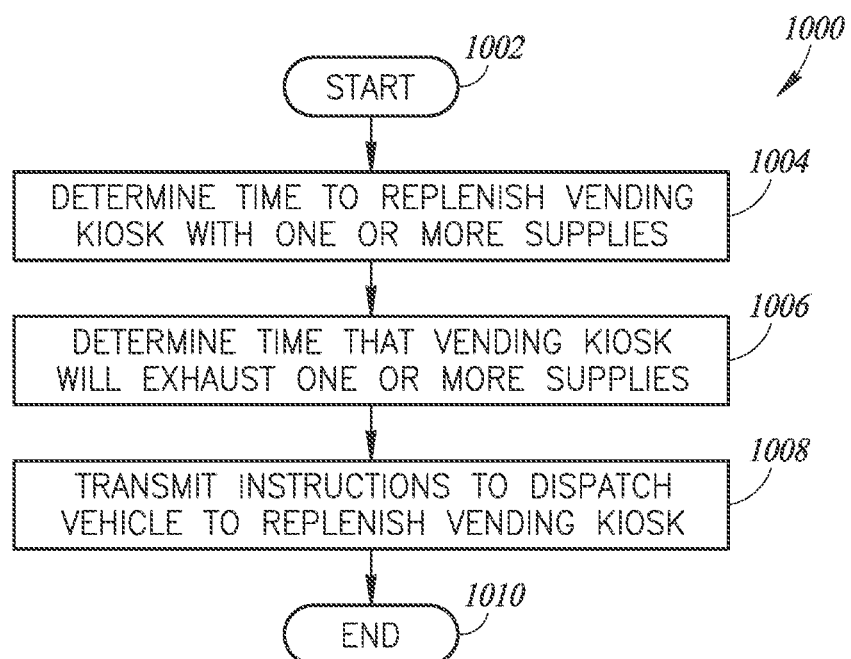
FIG. 10 is a logic flow diagram of a method of operation of a multi-modal food preparation system in which instructions are transmitted to a vehicle to replenish a vending kiosk, according to at least one illustrated implementation.

FIG. 10 shows a method 1000 of operating a multi-modal food preparation system 100 in which instructions are transmitted to a vehicle 124 to replenish a vending kiosk 102, according to at least one illustrated implementation. The method 1000 can, for example, be executed by one or more processor-based devices, for instance the control system 218, the remote order processing system 208, and/or the replenishment server 126, and starts at 1002.

At 1004, a processor-enabled device, such as, for example, the control system 218, the remote order processing system 208, and/or the replenishment server 126, may determine an amount of time to replenish the kiosk 102 with one or more supplies and/or food items. Such a determination of an estimated time to replenish one or more supplies and/or food items at the kiosk 102 may be based, at least in part, on the time to transfer the one or supplies and/or the instances of food items 106 from the vehicle 124 to the kiosk 102, and/or on the amount of time for the vehicle 124 to travel to the location of the kiosk 102.

At 1006, a processor-enabled device, such as, for example, the control system 218, the remote order processing system 208, and/or the replenishment server 126, may determine the amount of time before the kiosk 102 exhausts one or more supplies and/or food items. Such a determination may be based one or more factors, such as, for example, the amount of supplies (e.g., instances of food items 106) currently available at the kiosk 102, the number of instances of food items 106 the kiosk has vended, the rate at which the kiosk 102 is using the supplies and/or vending instances of food items 106, the rate at which the kiosk 102 is expected to use the supplies in the future, pending orders to be fulfilled by the kiosk 102, and/or a signal received from the kiosk 102 indicating a need for replenishment of one or more supplies. In some implementations, the determination of when the kiosk 102 may exhaust one or more supplied and/or food items may take into account information regarding the sales of instances of food items 106 during specific days of the week, at a specific time and/or time range, during a special event, date, or holiday, and/or during one or more types of weather.

At 1008, a processor-enabled device, such as, for example, the control system 218, the remote order processing system 208, and/or the replenishment server 126, may transmit instructions to the vehicle 124 to dispatch the vehicle 124 to replenish the kiosk 102. Such instructions may include, for example, the type of supplies to be replenished, the amount of each supply to be replenished, and a route that the vehicle 124 should take to the kiosk 102. In some implementations, the instructions may be transmitted to the vehicle 124 from one or more sources, such as, for example, the control system 218, the remote order processing system 208, and/or the replenishment server 126, or some other remote server, via a wireless communications network 116. Once the vehicle 124 reaches the vending location 118, the kiosk 102 may receive replenishment from the vehicle 124 for the one or more supplies and/or food items.

At 1010, the method 1000 terminates, for example until invoked again. Alternatively, the method 1000 may repeat continuously or repeatedly, or may execute as multiple instances of a multi-threaded process.

Figure 11:
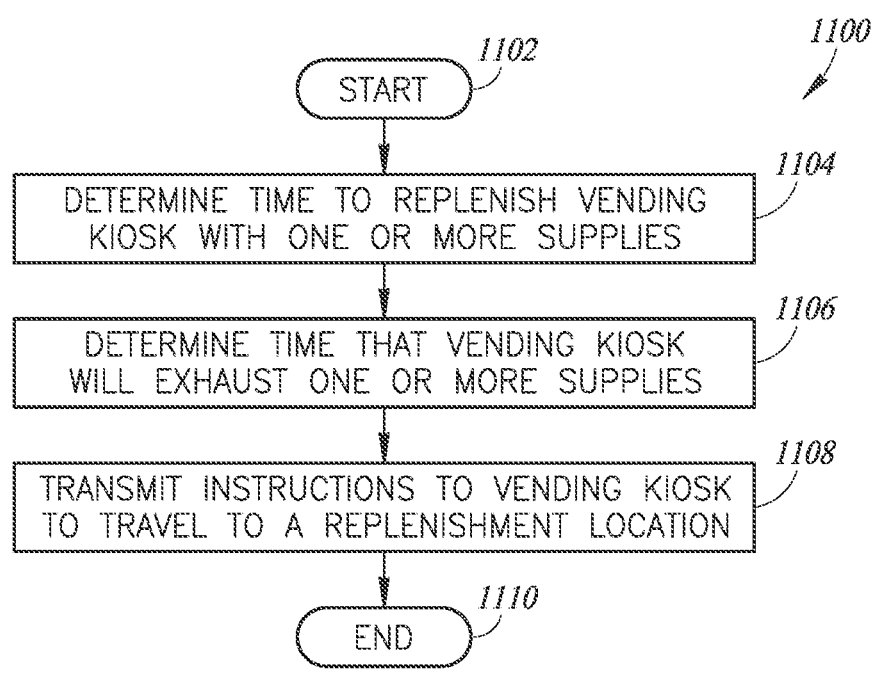
FIG. 11 is a logic flow diagram of a method of operation of a multi-modal food preparation system in which instructions are transmitted to a vending kiosk to travel to a replenishment location, according to at least one illustrated implementation.

FIG. 11 shows a method 1100 of operating a multi-modal food preparation system 100 in which instructions are transmitted to a kiosk 102 to travel to a replenishment location 144, according to at least one illustrated implementation. The method 1100 can, for example, be executed by one or more processor-based devices, for instance the control system 218, the remote order processing system 208, and/or the replenishment server 126, and starts at 1102.

At 1104, a processor-enabled device, such as, for example, the control system 218, the remote order processing system 208, and/or the replenishment server 126, may determine an amount of time to replenish the kiosk 102 with one or more supplies and/or food items. Such a determination of an estimated time to replenish one or more supplies and/or food items at the kiosk 102 may be based, at least in part, on the time to transfer the one or supplies and/or the instances of food items 106 from the vehicle 124 to the kiosk 102, and/or on the amount of time for the vehicle 124 to travel to the location of the kiosk 102.

At 1106, a processor-enabled device, such as, for example, the control system 218, the remote order processing system 208, and/or the replenishment server 126, may determine the amount of time before the kiosk 102 exhausts one or more supplies and/or food items. Such a determination may be based one or more factors, such as, for example, the amount of supplies (e.g., instances of food items 106) currently available at the kiosk 102, the number of instances of food items 106 the kiosk has vended, the rate at which the kiosk 102 is using the supplies and/or vending instances of food items 106, the rate at which the kiosk 102 is expected to use the supplies in the future, pending orders to be fulfilled by the kiosk 102, and/or a signal received from the kiosk 102 indicating a need for replenishment of one or more supplies. In some implementations, the determination of when the kiosk 102 may exhaust one or more supplied and/or food items may take into account information regarding the sales of instances of food items 106 during specific days of the week, at a specific time and/or time range, during a special event, date, or holiday, and/or during one or more types of weather.

At 1108, a processor-enabled device, such as, for example, the control system 218, the remote order processing system 208, and/or the replenishment server 126, may generate instructions to the kiosk 102 to cause the kiosk 102 to travel to the replenishment location 144. A building (e.g., a warehouse) or a vehicle (e.g., a delivery vehicle) may be at the replenishment location 144 and may hold one or more supplies that may be used to replenish the kiosk 102. The instructions received by the kiosk 102 may include, for example, the type of supplies to be replenished, the amount of each supply to be replenished, and a route that the kiosk 102 should take. In some implementations, the instructions may be transmitted to the kiosk 102 from one or more sources, such as, for example, the remote order processing system 208, the replenishment server 126, and/or some other remote server, via a wireless communications network 116. In response to receiving such instructions, the kiosk 102 may proceed along a replenishment route (e.g., the second replenishment route 132b) as indicated by the instructions to travel to the replenishment location 144. In some implementations, the replenishment route may be determined by the remote order processing system 208, replenishment server 126, and/or by a third-party server, and transmitted to the kiosk 102.

At 1110, the method 1100 terminates, for example until invoked again. Alternatively, the method 1100 may repeat continuously or repeatedly, or may execute as multiple instances of a multi-threaded process.

Figure 12:
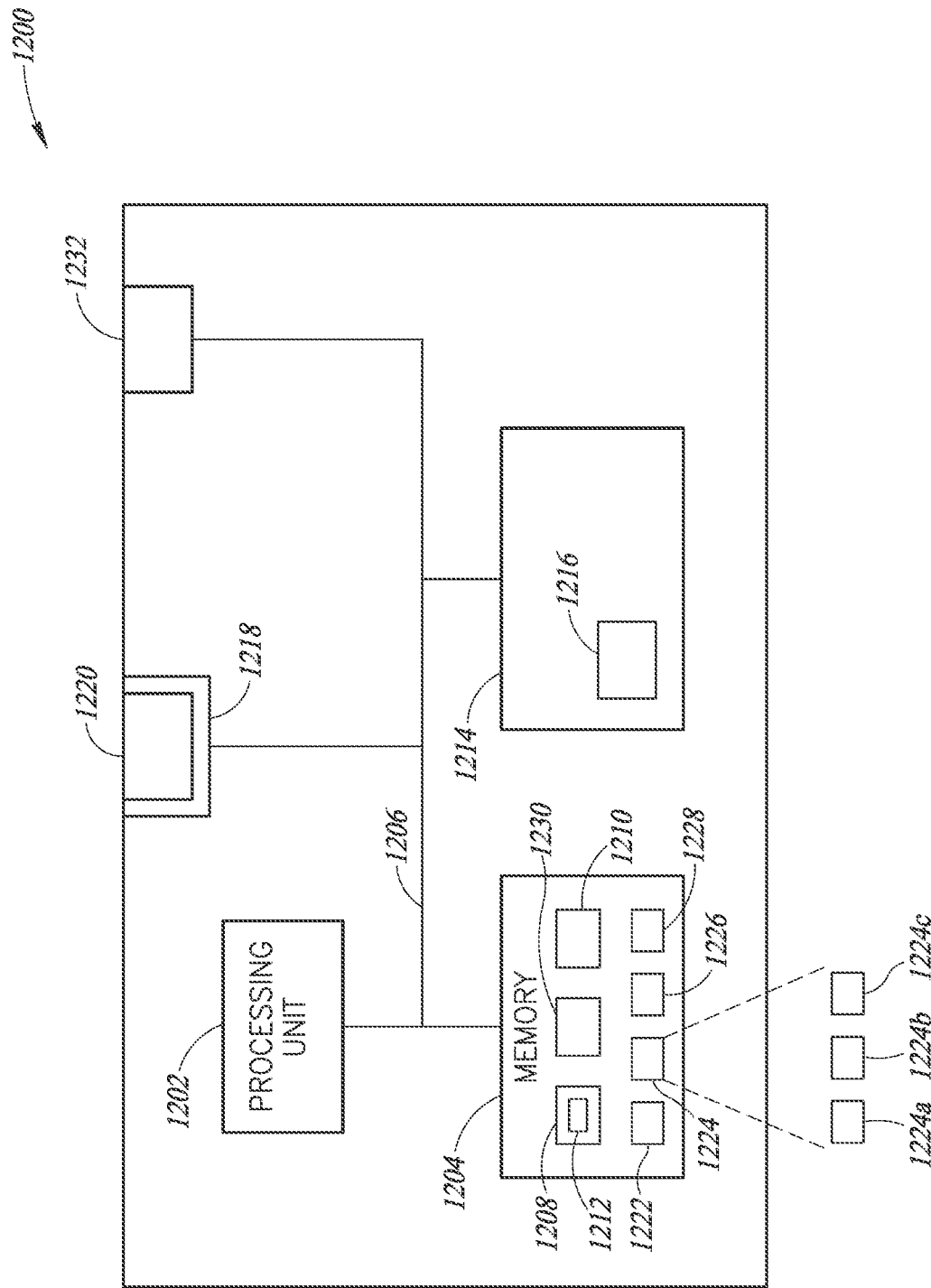
FIG. 12 is a schematic block diagram of a control system, according to at least one illustrated implementation.

FIG. 12 shows a schematic, block diagram of a processor-enabled device 1200, such as the control system 218, the remote order processing system 208, and/or the replenishment server 126. The processor-enabled device 1200 may take the form of any current or future developed computing system capable of executing one or more instruction sets. The processor-enabled device 1200 includes a processing unit 1202, a system memory 1204, and a system bus 1206 that communicably couples various system components including the system memory 1204 to the processing unit 1202. The processor-enabled device 1200 will at times be referred to in the singular herein, but this is not intended to limit the embodiments to a single system, since in certain embodiments, there will be more than one system or other networked computing device involved. Non-limiting examples of commercially available systems include, but are not limited to, an Atom, Pentium, or 80x86 architecture microprocessor as offered by Intel Corporation, a Snapdragon processor as offered by Qualcomm, Inc., a PowerPC microprocessor as offered by IBM, a Sparc microprocessor as offered by Sun Microsystems, Inc., a PA-RISC series microprocessor as offered by Hewlett-Packard Company, an A6 or A8 series processor as offered by Apple Inc., or a 68xxx series microprocessor as offered by Motorola Corporation.

The processing unit 1202 may be any logic processing unit, such as one or more central processing units (CPUs), microprocessors, digital signal processors (DSPs), application-specific integrated circuits (ASICs), field programmable gate arrays (FPGAs), programmable logic controllers (PLCs), etc. Unless described otherwise, the construction and operation of the various blocks shown in FIG. 12 are of conventional design. As a result, such blocks need not be described in further detail herein, as they will be understood by those skilled in the relevant art.

The system bus 1206 can employ any known bus structures or architectures, including a memory bus with memory controller, a peripheral bus, and a local bus. The system memory 1204 includes read-only memory ("ROM") 1208 and random access memory ("RAM") 1210. A basic input/output system ("BIOS") 1212, which can form part of the ROM 1208, contains basic routines that help transfer information between elements within the processor-enabled device 1200, such as during start-up. Some embodiments may employ separate buses for data, instructions and power.

The processor-enabled device 1200 also includes one or more internal nontransitory storage systems 1214. Such internal nontransitory storage systems 1214 may include, but are not limited to, any current or future developed persistent storage device 1216. Such persistent storage devices 1216 may include, without limitation, magnetic storage devices such as hard disc drives, electromagnetic storage devices such as memristors, molecular storage devices, quantum storage devices, electrostatic storage devices such as solid state drives, and the like.

The processor-enabled device 1200 may also include one or more optional removable nontransitory storage systems 1218. Such removable nontransitory storage systems 1218 may include, but are not limited to, any current or future developed removable persistent storage device 1220. Such removable persistent storage devices 1220 may include, without limitation, magnetic storage devices, electromagnetic storage devices such as memristors, molecular storage devices, quantum storage devices, and electrostatic storage devices such as secure digital ("SD") drives, USB drives, memory sticks, or the like.

The one or more internal nontransitory storage systems 1214 and the one or more optional removable nontransitory storage systems 1218 communicate with the processing unit 1202 via the system bus 1206. The one or more internal nontransitory storage systems 1214 and the one or more optional removable nontransitory storage systems 1218 may include interfaces or device controllers (not shown) communicably coupled between nontransitory storage system and the system bus 1206, as is known by those skilled in the relevant art. The nontransitory storage systems 1214, 1218, and their associated storage devices 1216, 1220 provide nonvolatile storage of computer-readable instructions, data structures, program modules and other data for the processor-enabled device 1200. Those skilled in the relevant art will appreciate that other types of storage devices may be employed to store digital data accessible by a computer, such as magnetic cassettes, flash memory cards, RAMs, ROMs, smart cards, etc.

Program modules can be stored in the system memory 1204, such as an operating system 1222, one or more application programs 1224, other programs or modules 1226, drivers 1228 and program data 1230.

The application programs 1224 may include, for example, one or more machine executable instruction sets (i.e., mode module 1224a) capable of providing instructions to one or more kiosks 102 to transition between the kiosk vending mode 110, the constellation mode 120, and/or the cook en route mode 130. The application programs 1224 may further include one or more machine executable instructions sets (i.e., cooking module 1224b) capable of outputting queuing and cooking instructions to the kiosks 102 and/or delivery vehicles 140. In some implementations, the application programs 1224 may include one or more machine executable instruction sets (i.e., replenishment module 1224c) capable of determining a time and/or time range during which one or more supplies and/or food items in a kiosk 102 may be replenished by a vehicle 124 and/or by traveling to a replenishment location 144.

In some embodiments, the processor-enabled device 1200 operates in an environment using one or more of the network interfaces 1232 to optionally communicably couple to one or more remote computers, servers, display devices, such as the remote order processing system 208, the replenishment server 126, and/or other devices via one or more communications channels, for example, one or more networks such as the communications network 234. These logical connections may facilitate any known method of permitting computers to communicate, such as through one or more LANs and/or WANs. Such networking environments are well known in wired and wireless enterprise-wide computer networks, intranets, extranets, and the Internet.

Figure 13A:
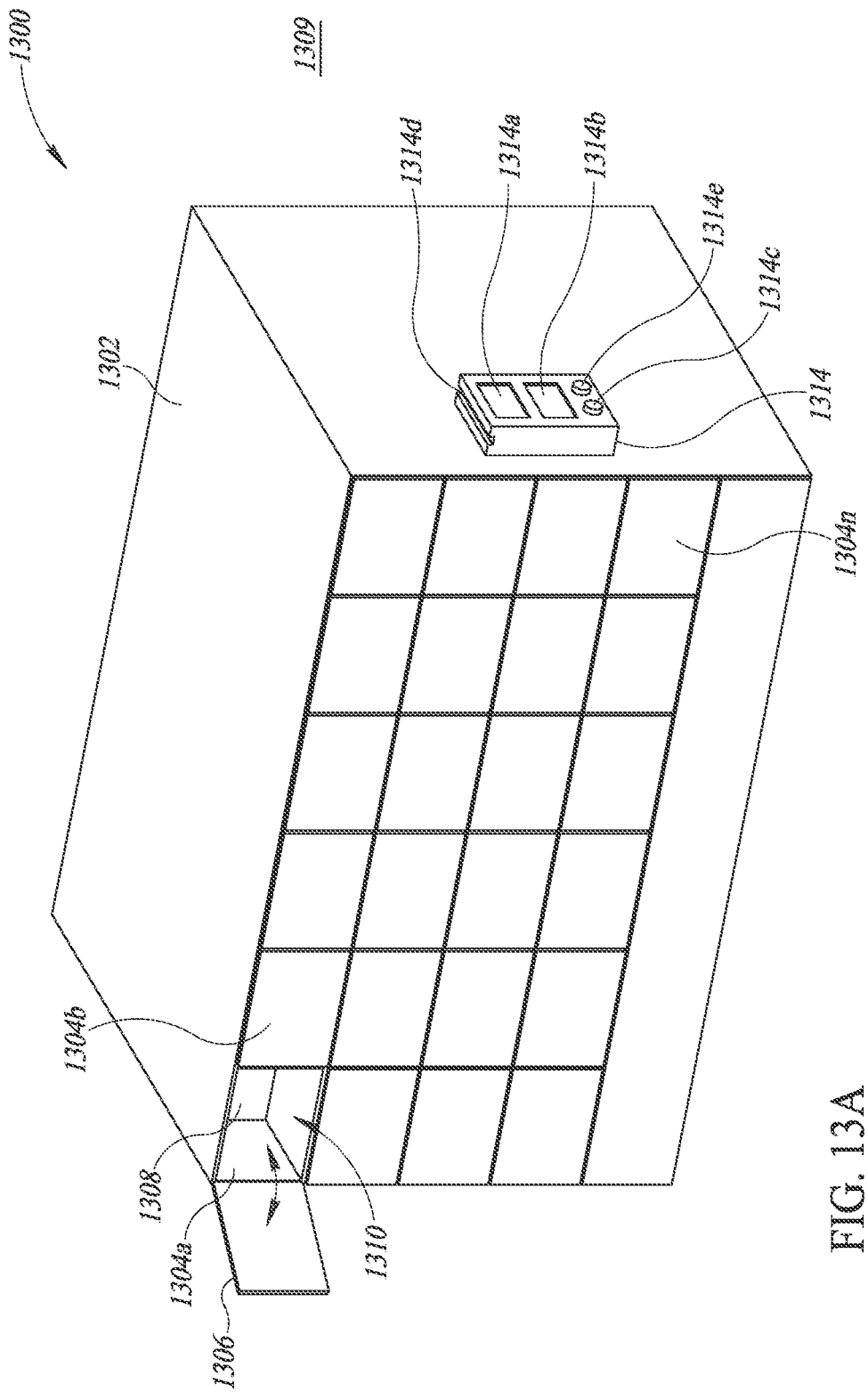
FIG. 13A is a front, top, right isometric view of a vending kiosk according to at least one illustrated embodiment, which includes a plurality of vending compartments, one or more cooking units, and a refrigerated supply area.
Figure 13B:
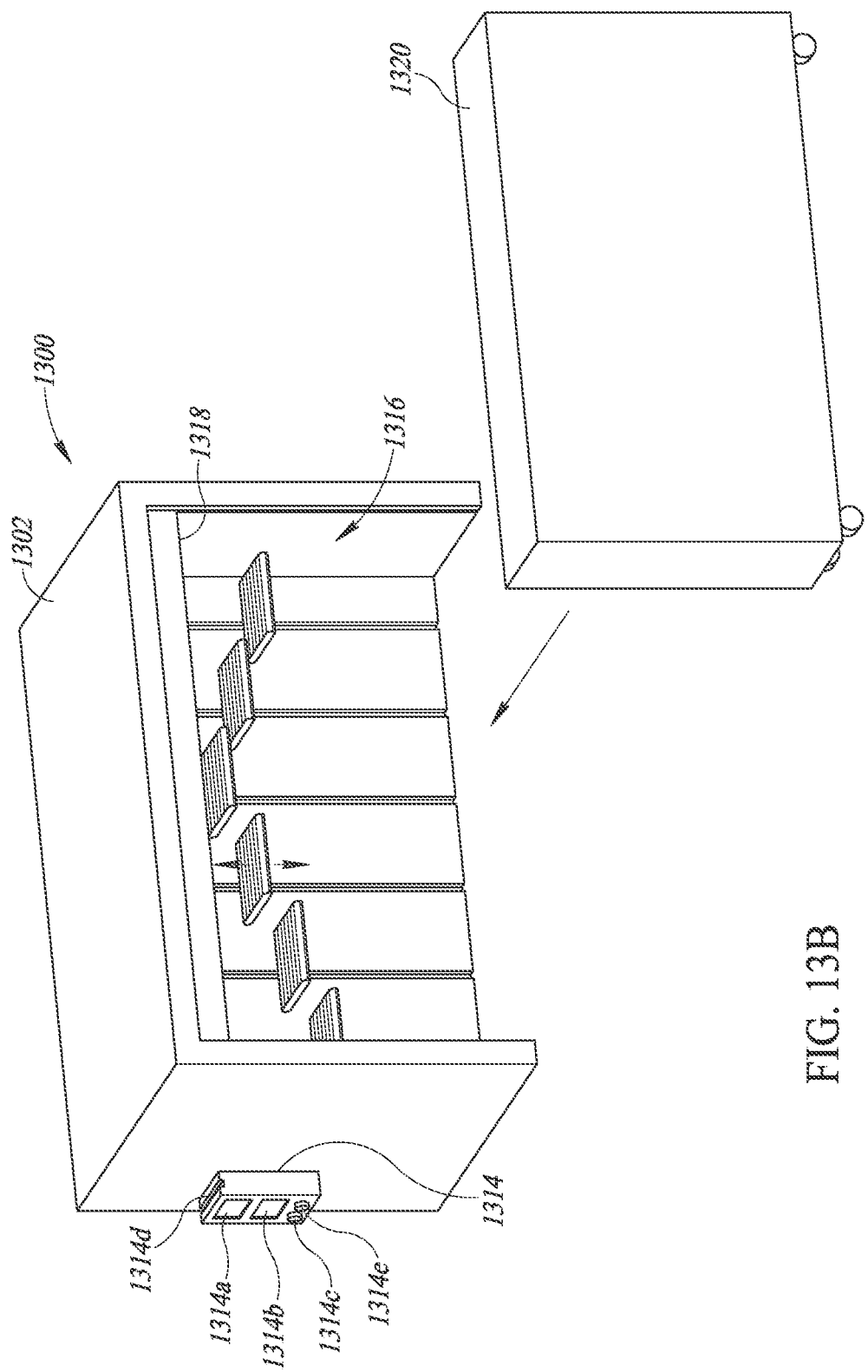
FIG. 13B is a rear, top, right isometric view of the vending kiosk of FIG. 13, better illustrating the refrigerated supply area and input transport elevators, as well as an optional supply rack which can be removably docked in the refrigerated supply area.
Figure 13C:
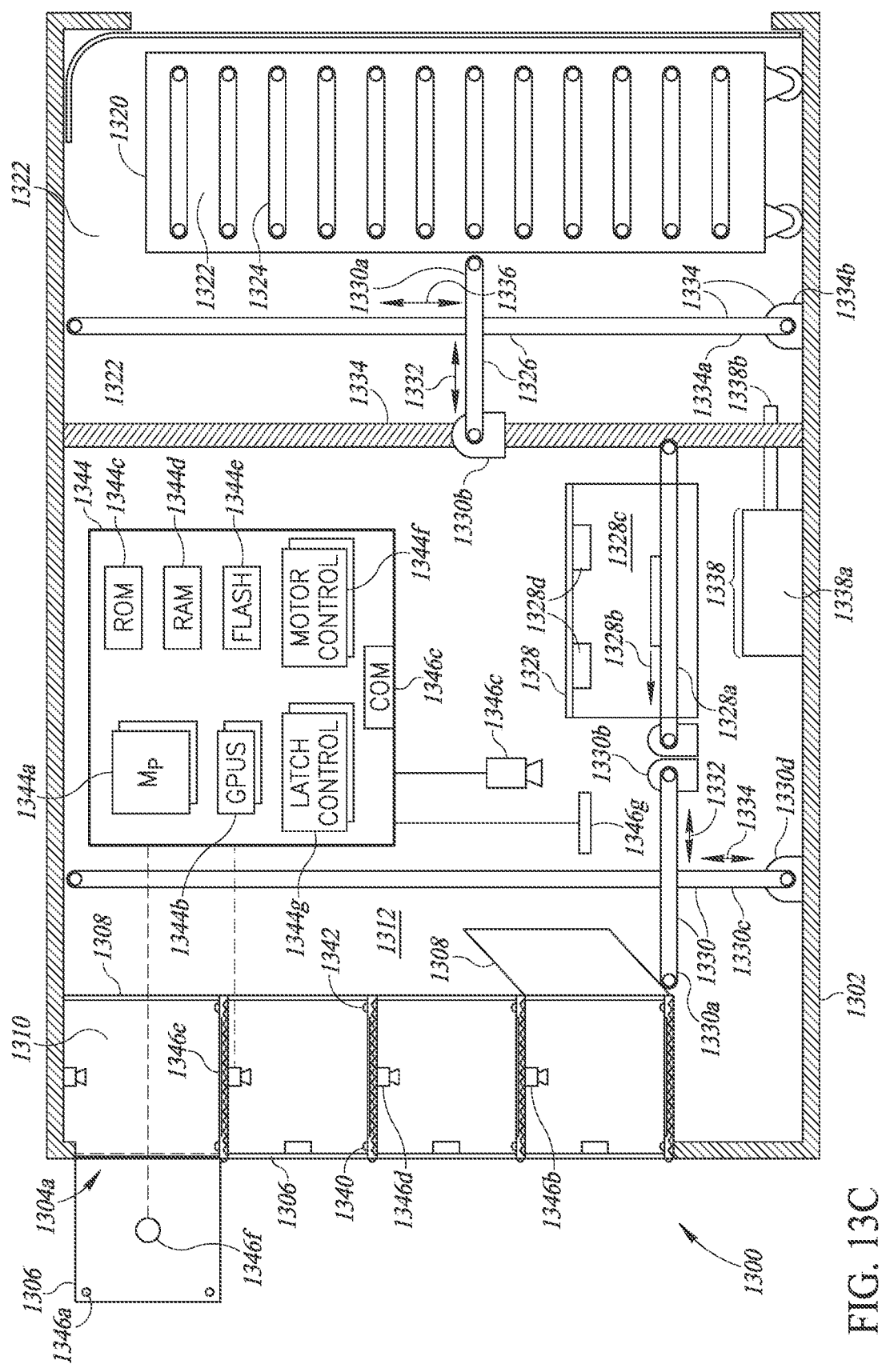
FIG. 13C is a cross-sectional view of the vending kiosk of FIG. 13, better illustrating the one or more cooking units (e.g., ovens), input transport elevators, and output input transport elevators.

FIGS. 13A-13C show a vending kiosk 1300, according to at least one illustrated embodiment.

The vending kiosk 1300 includes a housing 1302 and a plurality of vending compartments 1304a, 1304b-1304n (twenty-four shown, three called out, collectively 1304). The vending kiosk 1300 may be fixed at a location, for instance physically secured to the ground or a building or other structure, or secured by weight. Alternatively, the vending kiosk 1300 may be mobile, having one or more wheels, tracks, treads, etc., and propulsion source (e.g., electric motor, internal combustion engine), for example as in the previously described implementations.

Each of the vending compartments 1304 has an associated front or customer-facing door 1306 and a back or service door 1308. The front or customer-facing door 1306 is readily accessible by a customer from an exterior of the vending kiosk 1300. The back or service door 1308 does not need to be, and typically is not, readily accessible by a customer from an exterior 1309 of the vending kiosk 1300, although it may be possible for the customer to touch the back or service door 1308 once the customer gains access to an interior 1310 (only one shown in FIG. 13A) of the respective compartment. The front or customer-facing doors 1306 are operable to selectively provide and deny access to an interior 1310 of the vending compartments 1304 from the exterior 1309 of the vending kiosk 1300. The rear or service doors 1306 are operable to selectively provide and deny access to an interior 1310 of the vending compartments 1304 from an exterior thereof, and typically from an interior 1312 (FIG. 13C) of the vending kiosk 1300.

As best illustrated in FIG. 13B, the vending kiosk 1300 includes a customer or user interface 1314, typically accessible from the exterior 1309 of the vending kiosk 1300. The customer or user interface 1314 provides input and, or output to customers or other users. The customer or user interface 1314 may include any one or more of a display 1314a, keypad or keyboard 1314b, near field communications radio and antenna 1314c, magnetic stripe reader or chip reader 1314d, camera 1314e, bill validator, coin slot, etc. Such allows the vending kiosk 1300 to recognize a customer or other user or otherwise implement a transaction. For example, the near field communications radio and antenna 1314c may detect and recognize an electronic device (e.g., smartphone) associated with a customer who previously placed an order, and who has arrived at the vending kiosk 1300 to pick up the order. Also for example, the near field communications radio and antenna 1314c may interact with an electronic device (e.g., smartphone) to receive an order and then to complete a purchase transaction with a customer who is currently at the vending kiosk 1300 to place the order. Also for example, the display 1314a (e.g., via a graphical user interface) and, or keypad or keyboard 1314b may be used to receive an order, or to receive information that identifies a customer who has arrived at the vending kiosk 1300 to pick up a previously placed order. The customer may, for instance, enter an identifier or PIN. Also for example, the camera 1314e may capture one or more images to implement a purchase transaction or identify a customer who has arrived at the vending kiosk 1300 to pick up a previously placed order. The camera may, for instance, capture an image of a machine-readable symbol (e.g., two-dimensional symbol, barcode symbol) displayed via a display of an electronic device (e.g., smartphone) associated with the customer who placed the order. The camera may, also for instance, capture an image of a face or iris of the customer who placed the order, and perform facial or iris recognition for a customer who has arrived at the vending kiosk 1300 to pick up. Other forms of biometric authentication can be employed via various sensors, for instance finger-print recognition. Also for example, the magnetic stripe reader or chip reader 1314d may read information from a financial medium (e.g., credit card, debit card, gift card) to implement a purchase transaction. Also for example, the bill or currency validator or coin slot (not shown) may be used to implement a purchase transaction.

As best illustrated in FIG. 13B, the vending kiosk 1300 includes an access (e.g., supply doorway 1316 and supply door 1318) that provide access to load items (e.g., prepared food items, ingredients, other items) into the vending kiosk 1300. The supply door 1318 may, for example take the form of a rollup door, as illustrated, or may take any other form of door, for instance a door that pivots on hinges, or a door that slides. A rollup door advantageously reduces the overall footprint required for the vending kiosk 1300 and servicing of the same.

As best illustrated in FIG. 13B, a supply rack 1320 may be used to load items (e.g., prepared food items, ingredients, other items) into the vending kiosk 1300. For example, the supply doorway 1316 may be sized to receive all or a portion of the supply rack 1320 therethrough, for instance to position the supply rack 1320 in a refrigerated supply area 1322 (FIG. 3C) of the vending kiosk 1300.

As best illustrated in FIG. 13C, the supply rack 1320 may include one or more, compartments or trays 1322 (only one called out), each of which can hold one or more prepared food items, ingredients, other items. The compartments or trays 1322 may, or may not, have respective doorways and, or doors, which are operable to selectively provide and deny access to an interior of the compartment or trays 1322 from an exterior thereof. The supply rack 1320 may, in at least some implementations, itself provide a refrigerated interior environment, for example having one or more compressors or air conditioners, and walls, floor and ceiling of the supply rack may be thermally insulated. In at least some implementations, the supply rack 1320 may at least in all or in part, rely on an air condition environment of the vending kiosk 1300 to cool the contents of the supply rack 1320.

In some implementations, the supply rack 1320 includes one or more mechanisms selectively operable to at least partially eject the contents of the compartment or trays. For example, each compartment or tray may include a conveyor (e.g., conveyor belt) 1324 (only one called out), peel, paddle, or pusher bar, and an actuator (e.g., electric motor or solenoid) drivingly coupled with, or without a transmission, to cause movement of the conveyor (e.g., conveyor belt) 1324, peel, paddle, or pusher bar.

As best illustrated in FIGS. 13B and 13C, the vending kiosk 1300 may include one or more input transport elevators 1326 that are operable to transport the contents (e.g., prepared food items, ingredients, other items) from the compartments or trays 1322 of the supply rack 1320 to one or more cooking units (e.g., ovens) 1328 (FIG. 13C). The input transport elevators 1326 may include one or more conveyors 1330 (e.g., conveyor belt 1330a and electric motor 1330b drivingly coupled to the conveyor belt 1330a), peels, trays, etc., operable to transfer the contents of the compartments or trays 1322 of the supply rack 1320 to the cooking unit(s) (e.g., oven(s)) 1328, for example along a first axis (e.g., horizontal axis) 1332. The input transport elevators 1326 may include one or more conveyors 1334 are positionable to closely locate or position a first end thereof proximate or adjacent the compartment or trays 1322 of the supply rack 1320 or proximate or adjacent conveyors or ejection mechanisms 1324 of the supply rack 1320. The actual spacing may depend on the type (e.g., dough, crust, rigid, flaccid) and, or state (e.g., raw, cooked, gelled) of the object to be transferred, as well as a size (e.g., length) and, or weight) of the object to be transferred. The input transport elevators 1326 may include one or more rails and, or, transmissions (e.g., chain drive, belt drive) 1334a and motors 1334b coupled to move the conveyor(s) 1330a along a second axis (e.g., vertical axis) 1336, different from the first axis 1332. Alternatively or additionally, the vending kiosk 1300 or the supply rack 1320 may include one or more robotic appendages and actuators (e.g., electric motor or solenoid) operable to transport the contents (e.g., prepared food items, ingredients, other items) from the compartments or trays 1322 of the supply rack 1320 to one or more cooking units (e.g., ovens) 1328.

As best illustrated in FIG. 13C the vending kiosk 1300 includes the one or more cooking units 1328, for instance one or more ovens. The cooking unit(s) 1328 may take any of a variety of forms. As used herein the term "cooking units" 1328 includes any device for the partial or complete cooking of one or more food products. Additionally, while the term "oven" may be used interchangeably with the term "cooking unit" herein, such usage should not limit the applicability of the systems and methods described herein to only foods which can be prepared in an oven. For example, one or more burners, either gas or electric or inductive, a hot skillet surface or griddle, a deep fryer, a microwave oven, rice cooker, sous vide cooker, and/or toaster can be considered a "cooking unit" that is included within the scope of the systems, methods, and apparatuses described herein. Some implementations may employ other types of food preparation units in addition to, or in place of cooking units, for example other types of equipment used to prepare food items, such as equipment related to cooled or chilled foods, such as may be used to prepare smoothies, frozen yogurt, ice cream, and beverages (e.g., fountain beverages). Further, the food preparation unit may be able to control more than temperature. For example, some food preparation units may control pressure and/or humidity. Further, some food preparation units may control airflow therein, thus able to operate in a convective cooking mode if desired, for instance to decrease cooking time.

In the illustrated implementation, the cooking units 1328 are conveyor ovens with a conveyor 1328a that provides a transport path 1328b through a cooking chamber 1328c. The cooking unit 1328 is open at opposed ends of the transport path 1328b. The cooking units 1328 includes one or more heating elements 1328d, which can take any of a large variety of forms, and can be located in any of a large variety of locations.

The one or more conveyors 1320a of the input transport elevators 1326 are positionable to closely locate or position a second end thereof proximate or adjacent the cooking units 1328 or proximate or adjacent conveyors or ingress mechanisms 1328a of the cooking units 1328. The actual spacing may depend on the type (e.g., dough, crust, rigid, flaccid) and, or state (e.g., raw, cooked, gelled) of the object to be transferred, as well as a size (e.g., length) and, or weight) of the object to be transferred.

As best illustrated in FIG. 13C, the vending kiosk 1300 may include one or more output transport elevators 1330 that are operable to transport the contents (e.g., prepared food items, ingredients, other items) from the one or more cooking units (e.g., ovens) 1328 to the compartments 1304 of the vending kiosk 1300. The output transport elevators 1330 may include one or more conveyors (e.g., conveyor belt 1330a and electric motor 1330b drivingly coupled to the conveyor belt 1330a), peels, trays, etc., operable to transfer the contents of the cooking unit(s) (e.g., oven(s)) 1328 to the compartments 1304 of the vending kiosk 1300, for example along a first axis (e.g., horizontal axis) 1332. The output transport elevators 1330 may include one or more rails and, or, transmissions (e.g., chain drive, belt drive) 1330c and motors 1330d coupled to move the conveyor(s) 1330a along a second axis (e.g., vertical axis) 1334, different from the first axis 1332. The output transport elevators 1330 may include one or more conveyors 1330a that are positionable to closely locate or position a first end thereof proximate or adjacent the cooking units 1328 or proximate or adjacent conveyors or ingress mechanisms 1328a of the cooking units 1328. The actual spacing may depend on the type (e.g., dough, crust, rigid, flaccid) and, or state (e.g., raw, cooked, gelled) of the object to be transferred, as well as a size (e.g., length) and, or weight) of the object to be transferred. The one or more conveyors 1330a of the output transport elevators 1330 are positionable to closely locate or position a second end thereof proximate or adjacent the compartments 1304 of the vending kiosk 1300 or adjacent conveyors or ingress mechanisms, if any, of the compartments 1304 of the vending kiosk 1300. The actual spacing may depend on the type (e.g., dough, crust, rigid, flaccid) and, or state (e.g., raw, cooked, gelled) of the object to be transferred, as well as a size (e.g., length) and, or weight of the object to be transferred. Alternatively or additionally, the vending kiosk 1300 or the supply rack 1320 may include one or more robotic appendages and actuators (e.g., electric motor or solenoid) operable to transport the contents (e.g., prepared food items, ingredients, other items) from the one or more cooking units (e.g., ovens) 1328 to the compartments 1304 of the vending kiosk 1300. While not shown, the vending kiosk 1300 can include one or more exhaust ducts, and optionally fans, operable to exhaust smoke and, or, waste heat generated by the cooking units 1328 from the vending kiosk 1300.

The vending kiosk 1300 may include thermal insulation 1336, for example separating the cooking units from the air conditioned area. The thermal insulation 1336 may surround a portion or all of the air conditioned area 1322. Thermal insulation 1336 may additionally, or alternatively surround all or a portion of the cooking units 1328. Thermal insulation 1336 may additionally, or alternatively surround all or a portion of the compartments 1304 of the vending kiosk 1300. The thermal insulation 1336 may take a variety of forms including, for example, fiberglass batten, vacuum.

The vending kiosk 1300 may include a refrigeration system 1338, for example one or more compressors, reservoirs, condensation coil (collectively 1338a) and, or heat exchanger. The refrigeration system may include one or more ducts 1338b coupled to dispense cooled or refrigerated air into the air conditioned or refrigerated area 1322. The refrigeration system 1338 may include one or more ducts (not shown) coupled to dispense warm or waste air into the exterior 1309 (FIG. 13A) from the vending kiosk 1300.

The implementation illustrated and described with respect to FIGS. 13A-13C advantageously isolates the compartments 1304 of the vending kiosk 1300 from the cooking units 1328. Such can be a significant improvement in safety, preventing customers from accidently coming into contact with hot surfaces of a cooking unit (e.g., oven) 1328. Additionally, one or more surfaces of the compartments 1304 of the vending kiosk 1300 may be thermally insulated from the cooking unit(s) 1328 to ensure that the portions of the compartments 1304 that a customer or other user might touch will be sufficiently cool as to avoid damage to the skin or even avoid damage to garments worn by the customer or other user.

The vending kiosk can include of a first set of latches or locks 1340 (only one latch or lock called out) that selectively latch/unlatch or lock/unlock the front or customer-facing door 1306 and a second set of latches or locks 1342 (only one latch or lock called out) that selectively latch/unlatch or lock/unlock the back or service door 1308. The latches or locks 1340, 1342 may, for example, take the form of pins, hooks, rods, magnets, and complimentary apertures and actuators (e.g., solenoids, r electric motors, electromagnets, relays) coupled to drive the pins, hooks, rods, or magnets.

The vending kiosk 1300 can include one or more hardware processor-based control systems 1344 (e.g., circuitry, integrated circuit) of the vending kiosk 1300, which can execute logic or processor-executable instructions. The processor-based control system 1344 can include one or more processors, for example one or more of: one or more microprocessors 1344a with one or more cores, one or more microcontrollers, one or more application specific integrated circuits (ASICs), one or more field programmable gate arrays (FPGAs), one or more graphic processor units 1344b, etc. The processor-based control system 1344 can include one or more computer- or processor-readable media (e.g., volatile memory, non-volatile memory, spinning media such as magnetic hard disks, optical disks), for example one or more of: one or more read only memories (ROM) 1344c, one or more random access memories (RAM) 1344d, one or more Flash memories 1344e, etc. The processor-based control system 1344 can include one or more motor controllers 1344f, operable to convert instructions from the processors 1344a, 1344b into signals to drive one or more motors or solenoids. The processor-based control system 1344 can include one or more motor controllers 1344g, operable to convert instructions from the processors 1344a, 1344b into signals to drive one or more latches or locks (e.g., solenoids). The processor-based control system 1344 can include one or more communications interfaces 1344h, for example one or more radios and associated antennas, and, or hardwired communications ports, to provide communications between the vending kiosk 1300 and devices external therefrom.

In particular, the vending kiosk 1300 is operable to ensure that the front or customer-facing door 1306 and any given vending compartment 1304 is only unlatched or unlocked or opened when the back or service door 1308 or the same respective vending compartment 1304 is latched, locked, or closed. This can ensure that a customer or other user cannot reach into the area in which the cooking units 1328 (e.g., ovens), or even into the area in which the output elevator 1330 is positioned, from an exterior 1309 (FIG. 13A) of the vending kiosk 1300. The vending kiosk 1300, for example the hardware processor-based control system 1344 (e.g., circuitry, integrated circuit) of the vending kiosk 1300 can execute logic that checks a state (e.g., represented via a flag stored in a memory or register) of a latch or lock 1342 for the back or service door 1308 of a given vending compartment 1304, and only unlatches, unlocks, or opens the latch or lock 1340 of the front or customer-facing door 1306 of the given vending compartment 1304 if the state of the back or service door 1308 or associated latch or lock 1342 for the given vending compartment 1304 is latched, locked or closed.

Alternatively or additionally, the vending kiosk 1300 can include one or more sensors that detect various conditions or states or positions of the front or customer-facing doors 1306, back or service doors 1308, and, or latches or locks 1340 associated with the front or customer-facing doors 1306 and, or latches or locks 1342 associated with the back or service doors 1308, or even with the interiors of the compartments. For example, one or more sensors can detect whether a door, latch or lock is locked, latched, closed, or alternatively unlatched, unlocked or open. For example, one or more sensors can detect whether a given compartment is empty or full, or unoccupied or occupied. Also for example, one or more sensors can detect whether a body part is in the compartment, touching a wall or door, or is proximate the door. Suitable sensors include contact switches 1346a (only two shown, only one called out), image sensors (e.g., digital cameras) 1346b, 1346c, passive infrared motion sensors 1346d (only one called out), Reed switches, weight sensors or load cells 1346e (only one called out), metal detectors 1346g, and, or, temperature sensors or thermocouples 1346f (only one called out).

The vending kiosk 1300, for example a hardware processor (e.g., circuitry, integrated circuit) of the vending kiosk 1300, can execute logic that unlatches, unlocks, or opens the front or customer-facing door 1306 of a given vending compartment 1304 if all of a set of conditions are met. For example, a baseline condition may be that the back or service door 1308 is latched, locked or closed. An additional condition may be that the vending compartment 1304 contains a food item. An additional condition, in addition to one or more of the above, may be that a customer or transaction has been recognized, for example via input of a code or personal identification number (PIN) which is verified, receipt or detection of biometric data (e.g., fingerprint, iris scan, facial scan) which is verified, a pairing with an electronic device or recognition thereof (e.g., exchange of a one-time use token). An additional condition, in addition to one or more of the above, may be that the food item in a given vending compartment 1304 is sufficiently cool for the customer to handle such without causing bodily harm. An additional condition, in addition to one or more of the above, may be that the front or customer-facing door 1306 and, or interior surfaces of the given vending compartment 1304 are sufficiently cool for the customer to come into contact with such without resulting in bodily harm. An additional condition, in addition to one or more of the above, may be that there is sufficient clearance for the front or customer-facing door 1306 to open. An additional condition, in addition to one or more of the above, may be that there is sufficient clearance for the back or service door 1308 to open.

Figure 14:
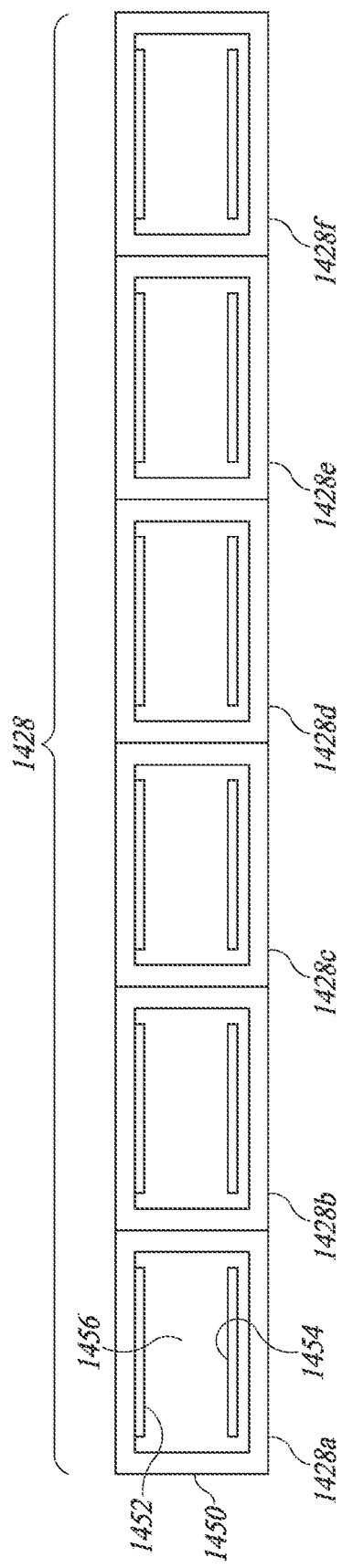
FIG. 14 is a front elevational view of a set or gang of cooking units in the form of ovens according to at least one illustrated implementation, the ovens suitable for use in the vending kiosk of FIGS. 13A-13C.

FIG. 14 shows a set or gang 1428 of cooking units (e.g., ovens) 1428a-1428f according to at least one illustrated embodiment. The cooking units (e.g., ovens) 1428a-1428f are suitable for use in the vending kiosk 1300 of FIGS. 13A-13C.

Each cooking unit 1428a-1428f may include a housing 1450 (one called out), and a heating element 1452 (one called out). The heating element 1452 can take any of a large variety of forms, for instance resistance heating elements driven via electrical current, gas heating elements, inductive heating elements, etc. In the illustrated implementation, the cooking units 1428a-1428f are conveyor ovens with a conveyor 1454 (only one called out) that provides a transport path through a cooking chamber 1456 (only one called out). The conveyor oven is open at opposed ends of the transport path. While shown ganged together, the cooking units (only one called out) can in some implementations be separate from each other, and even spaced apart from each other.

Figure 15:
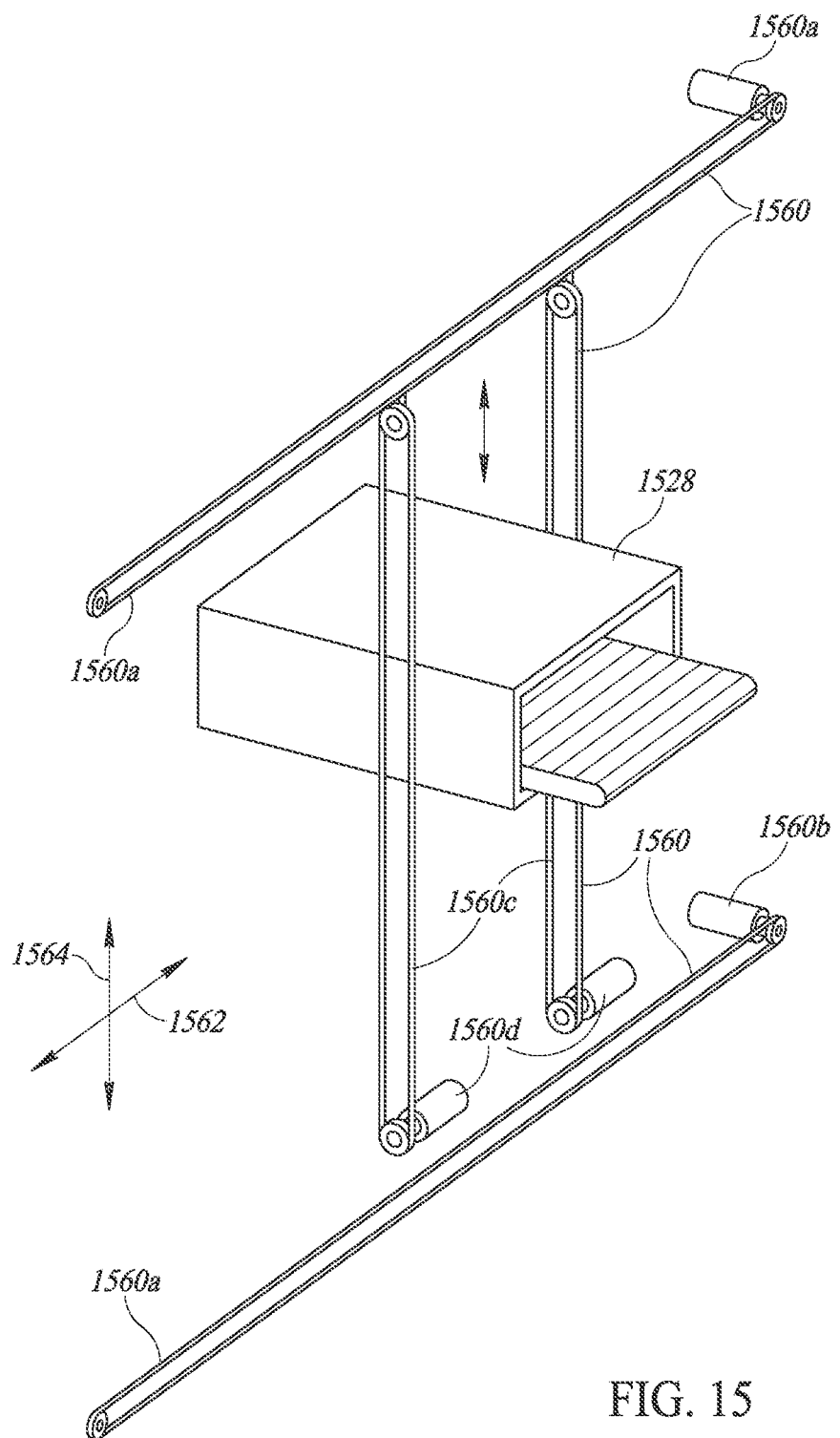
FIG. 15 is a front, top, left isometric view of a cooking unit in the form of an oven and a transmission, where the oven is translatable along two different axes according to at least one illustrated implementation, the ovens suitable for use in the vending kiosk of FIGS. 13A-13C.

FIG. 15 shows a cooking unit (e.g., an oven) 1528 and transmission 1560, where the cooking unit 1528 is translatable along two different axes 1562, 1564 according to at least one illustrated embodiment. The cooking units (e.g., ovens) 1528 are suitable for use in the vending kiosk 1300 of FIGS. 13A-13C.

The transmission 1560 may include a first transmission operable to move the cooking unit along a first axis (e.g., horizontal axis). The first transmission may include one or more supports, drive belts, chains, pulleys, cables, rods, rails, wheels, gears (collectively 1560a), actuators 1560b (e.g., electric motor, electric stepper motor, solenoid). The transmission 1560 may include a second transmission operable to move the cooking unit 1528 along a second axis (e.g., vertical axis) 1562, different from the first axis 1562. The second transmission may include one or more supports, drive belts, chains, pulleys, cables, rods, rails, wheels, gears (collectively 1560c), actuators 1560d (e.g., electric motor, electric stepper motor, solenoid). The second transmission may be coupled to move the first transmission, and hence the cooking unit 1528 that is also moved by the first transmission. While illustrated as a single cooling unit 1528, the transmission can move one, two or even more cooking units as a set, group, or gang of cooking units 1428 (FIG. 14).

Figure 16A:
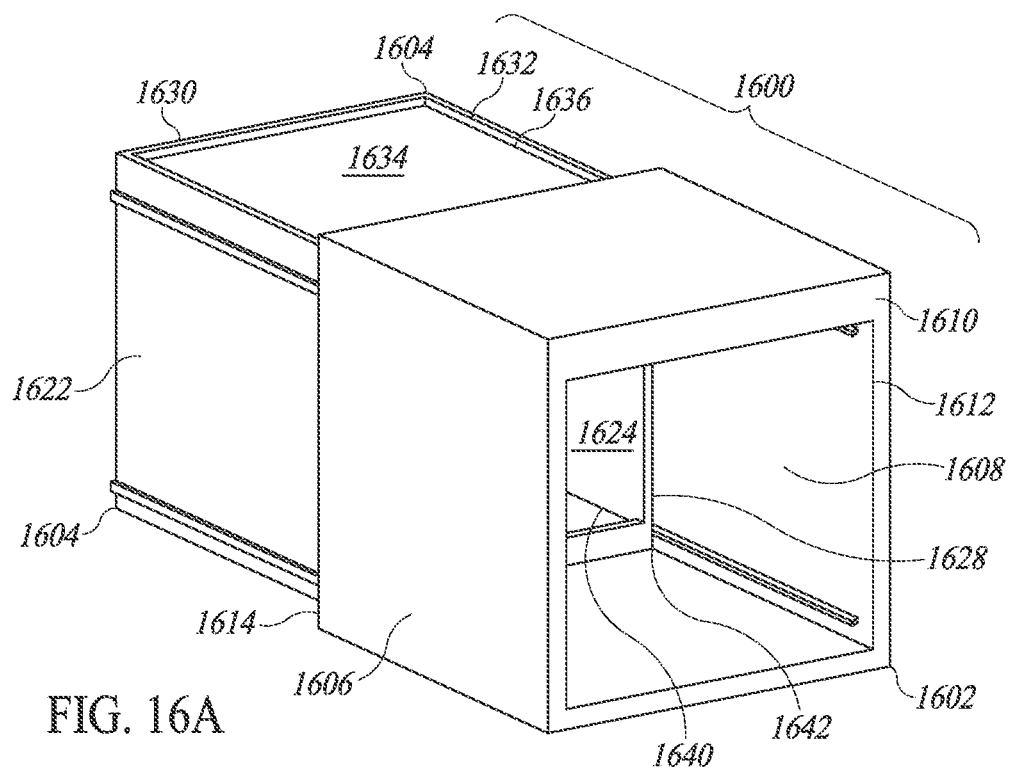
FIG. 16A-16D are a front, top, left isometric view of a vending compartment at four successive periods of time or instances, according to at least one illustrated implementation.
Figure 16B:
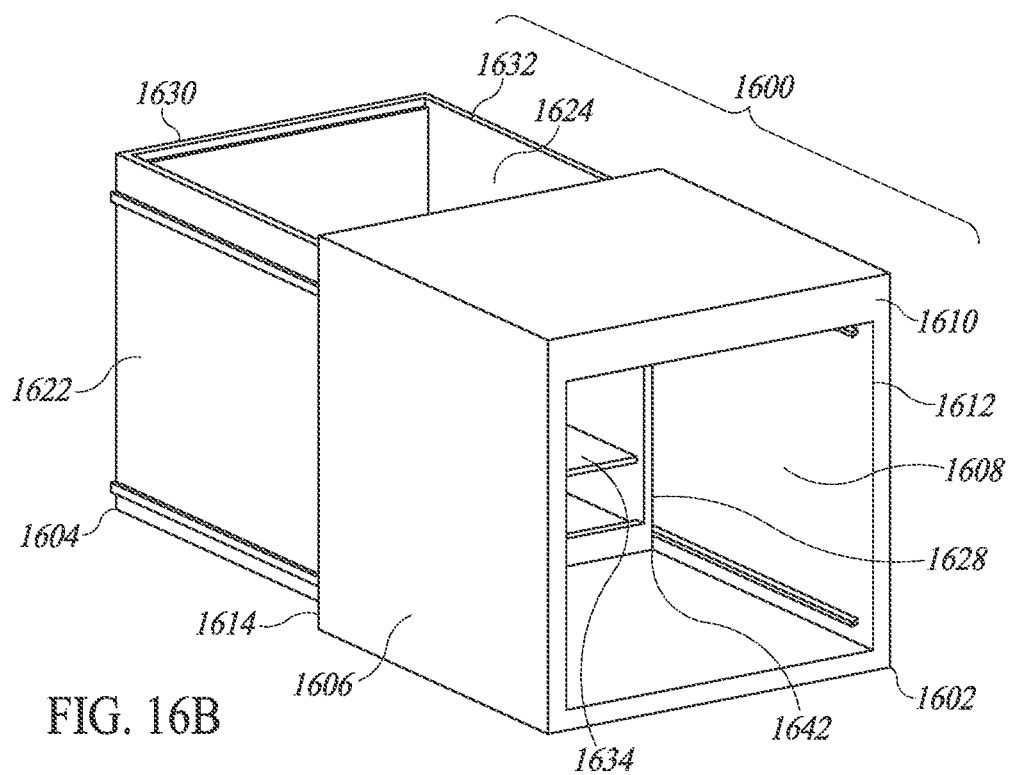

FIGS. 16A-16B show a vending compartment 1600 at four successive periods of time or instances, according to at least one illustrated implementation. The vending compartment 1600 is suitable for use in the vending kiosks of various implementations described herein. For example, the vending compartment 1600 can be used with any implementation of FIGS. 1A-1C, 2, 3A, 4A, 4B. Also for example, the vending compartment 1600 can be used with any implementation of FIGS. 13A-13C, and may allow the omission of one or more elevators (e.g., output transport elevators 1330) or other conveyors. Any vending kiosk can include one or more of the vending compartment 1600, for instance organized or structured in a two-dimensional array.

Each vending compartment 1600 includes a first receptacle 1602 and a second receptacle 1604.

The first receptacle 1602 comprises at least one wall 1606 that at least partially delimits an interior 1608 of the first receptacle 1602. A front 1610 of the first receptacle 1602 has a front opening 1612 that provides access into the interior 1608 of the first receptacle 1602 from the front 1610 of the first receptacle 1602. The first receptacle 1602 has a rear 1614 with at least a rear opening 1616 (FIG. 18) that provides access into the interior 1608 of the first receptacle 1602 from the rear 1614 of the first receptacle 1602.

The second receptacle 1604 comprises at least one wall 1622 that at least partially delimits an interior 1624 of the second receptacle 1604. The second receptacle 1604 has a front 1626 with a front opening 1628 that provides access into the interior 1624 of the second receptacle 1604 from the front 1628 of the second receptacle 1604. The second receptacle 1604 has a top 1630 with a top opening 1632 that provides access into the interior 1624 of the second receptacle 1604 from the top 1630 of the second receptacle 1604.

Figure 16C:
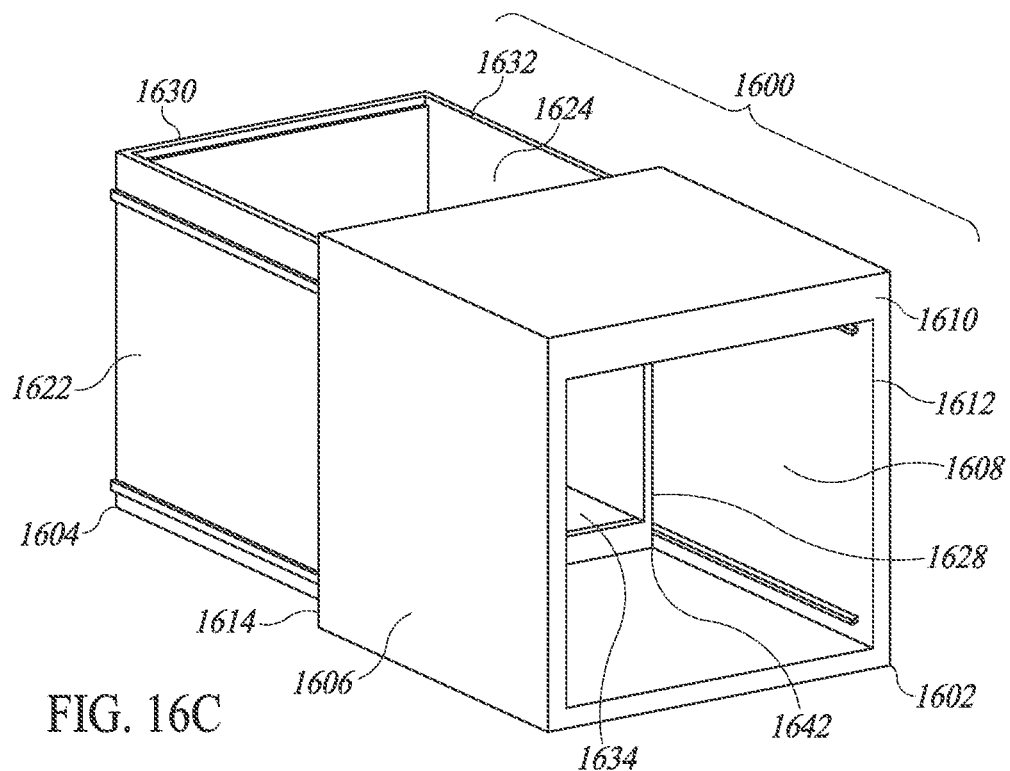
Figure 16D:
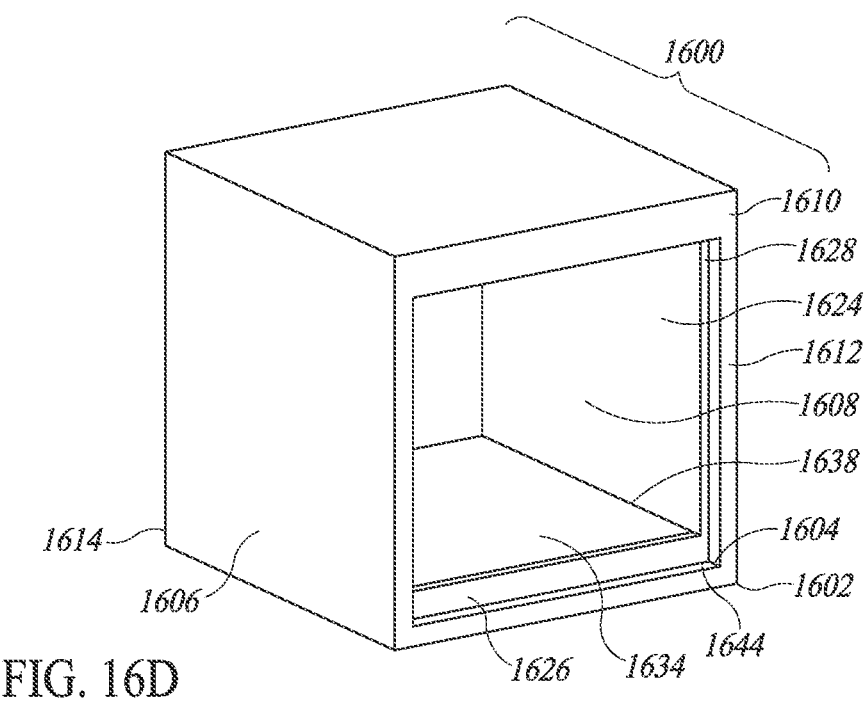

The second receptacle 1604 has a moveable tray 1634 that is moveable with respect to the at least one wall 1622 of the second receptacle 1604 between a raised position 1636 (FIG. 16A) and a lowered position 1638 (FIGS. 16C and 16D). In raised position 1636 (FIG. 16A) the tray 1634 is at least proximate the top 1630 of the second receptacle 1604, allowing an item (e.g., food item, prepared food item) to be transferred to the tray 1634. In the lowered position 1638 (FIGS. 16C and 16D) the tray 1634 is at least proximate a bottom 1640 (FIG. 16A) of the second receptacle 1604, which vertically positions the item (e.g., food item, prepared food item) to be movable into the interior 1608 of the first receptacle 1604.

As illustrated by the sequence, the second receptacle 1604 is moveable with respect to the first receptacle 1602 between a withdrawn position 1642 (FIGS. 16A-16C) and an inserted position 1644 (FIG. 16D). In the inserted position 1644 (FIG. 16D), the second receptacle 1604 predominately extends into the interior 1698 of the first receptacle 1602 with the front opening 1628 of the second receptacle 1604 at least proximate the front opening 1612 of the first receptacle 1602, positioning the item (e.g., food item, prepared food item) on the tray 1634 to be retrievable from the interior 1608 of the first receptacle 1602 by a customer or other user. In the withdrawn position 1642 (FIG. 16A) the second receptacle 1604 is predominately withdrawn from the interior 1608 of the first receptacle 1602 with the front opening 1628 of the second receptacle 1604 spaced inwardly away from the front opening 1612 of the first receptacle 1602 as compared to the inserted position 1644.

Figure 17:
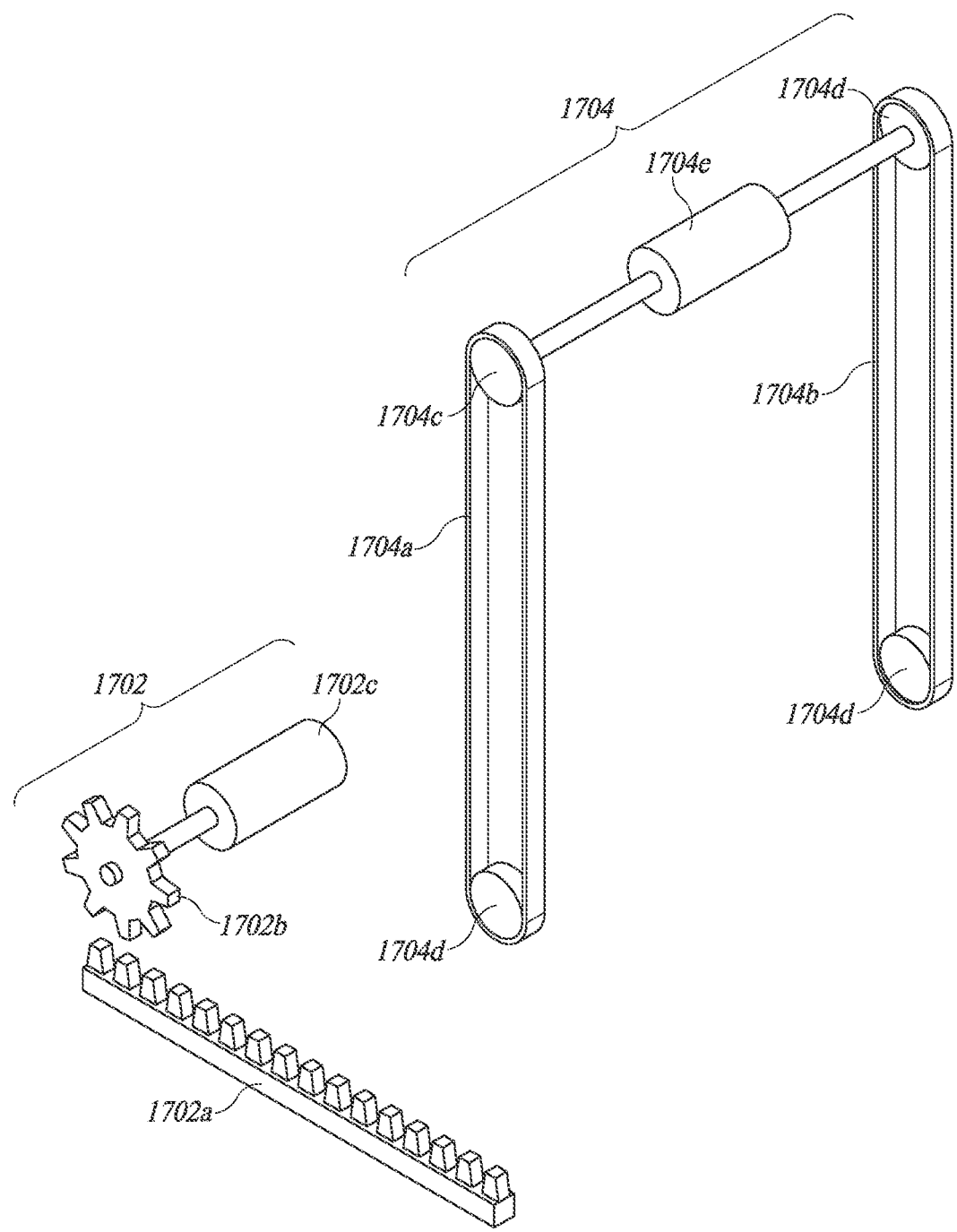
FIG. 17 is a front, top, left isometric view of a vertical transmission and a horizontal transmission, operable to move components of a vending compartment along at least two axes, for instance at four successive periods of time or instances illustrated in FIGS. 16A-16D, according to at least one illustrated implementation.

FIG. 17 illustrates that each vending compartment 1600 any include, or may be coupled to, at least one horizontal transmission 1702 operable to move the second receptacles 1604 (FIGS. 16A-16D) between the inserted and the withdrawn positions 1644, 1642. The horizontal transmission 1702 may include a rack 1702a and pinion 1702b, gears, rails, wheels, bearings, drive belt, toothed drive belt, cable, and an actuator (e.g., electric motor, stepper motor 1702c, solenoid, pneumatic or hydraulic piston and cylinder along with reservoir of fluid and valves).

FIG. 17 also illustrates that each vending compartment 1600 may include, or may be coupled to, at least one vertical transmission 1704 operable to move the trays 1634 (FIGS. 16A-16D) between the raised and the lowered positions 1636, 1638. The vertical transmission 1704 may include a rack and pinion, gears, rails, wheels, bearings, drive belt 1704a, 1704b, toothed drive belt, cable, pulleys 1704c, 1704d and an actuator (e.g., electric motor 1704e, stepper motor, solenoid, pneumatic or hydraulic piston and cylinder along with reservoir of fluid and valves).

Figure 18:
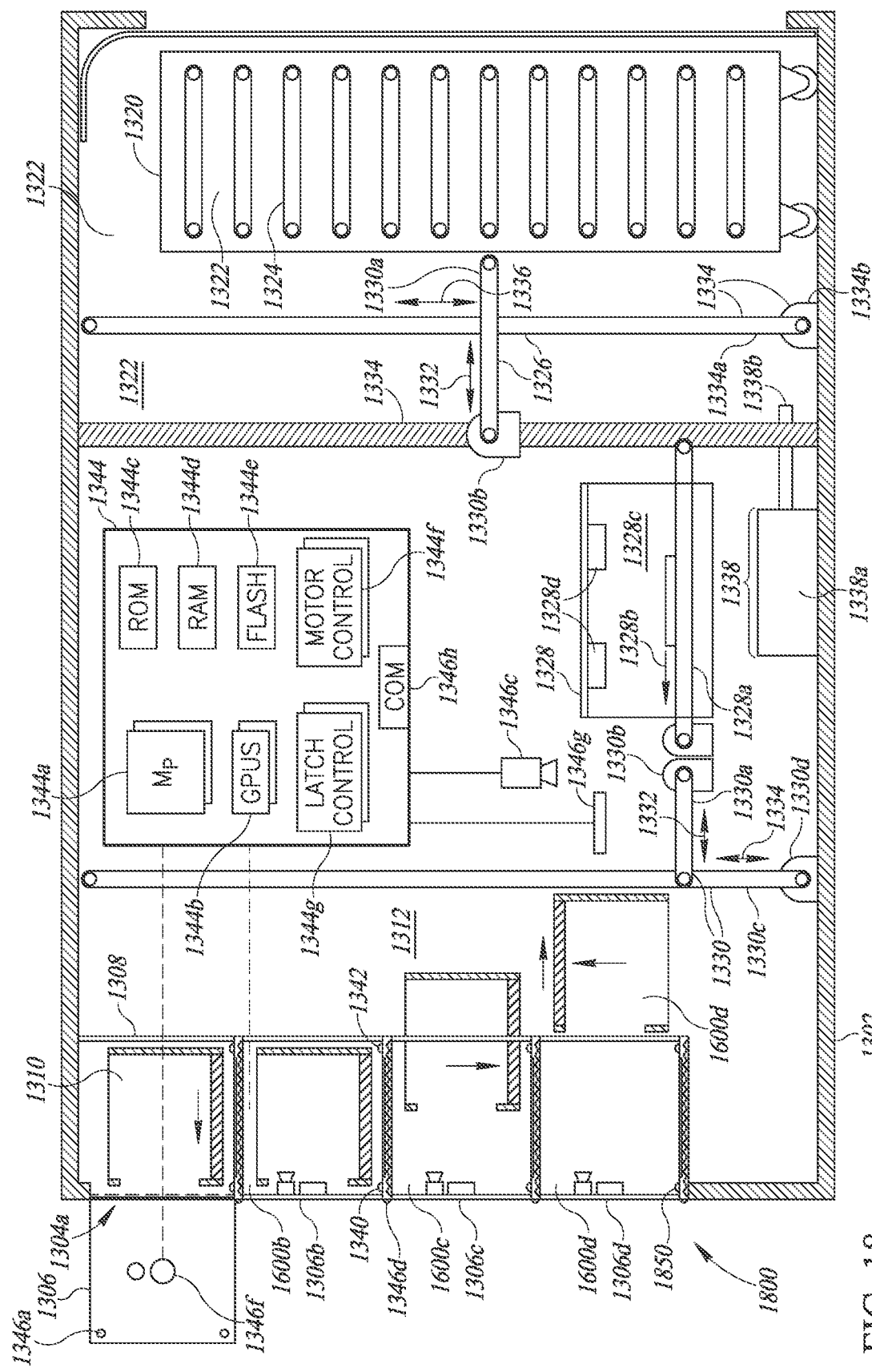
FIG. 18 is a cross-sectional view of the vending kiosk employing the vending compartments illustrated in FIGS. 16A-16D, and better illustrating the cooking units (e.g., ovens), input transport elevators, and output input transport elevators, according to at least one illustrated implementation.

FIG. 18 shows a vending kiosk 1800 that includes a plurality of vending compartments 1600a-1600d (only four shown, collectively 1600), according to at least one illustrated implementation. Many of the components are similar, or even identical, to components and structures discussed with reference to FIGS. 13A-13B. Similar or identical elements are identified in FIG. 18 with the same reference numbers as in FIG. 13A. Only some of the significant differences are given are discussed below and new reference numbers.

The vending kiosk 1800 includes a plurality of customer-facing doors 1306a-1396d (only four shown, collectively 1306), each of the customer-facing doors 1306 movable between a first position (see customer-facing doors 1306b-1306d) which prevents access to the interior of the first and the second receptacles 1602, 1604 of a respective one of the vending compartments 1600 from an exterior of the vending kiosk 1800 and a second position (see customer-facing door 1306a) which allows access to the interior 1608, 1624 of the first and the second receptacles 1602, 1604, respectively, of the respective one of the vending compartments 1600 from the exterior of the vending kiosk 1800 (FIG. 18).

In some implementations, a first plurality of latches 428, 432 (FIGS. 4A, 4B), 1340 (FIG. 13C) are operable to alternatively latch and unlatch respective ones of the customer-facing doors 1306. Once unlatched, the customer-facing doors 1306 may be manually opened by a customer. Alternatively, the customer-facing doors 1306 may be spring-loaded and open automatically in response to unlatching. In some implementations, a first plurality of motors or solenoids 1850 (one called out in FIG. 18) operable to open, close, or alternatively open and close respective ones of the customer-facing doors 1306. For example, an actuator (e.g., stepper motor or solenoid) 1850 may be coupled directly, or indirectly (e.g., gears, cables, belts), to open and close the customer-facing doors 1306. The stepper motor or solenoid 1850 may resist manual opening (e.g., via inertia, one-way clutch, relay), essentially locking the customer-facing doors 1306 when closed.

The at least one processor-based control system 1344 is communicatively coupled to control the customer-facing doors 1306 and/or control the horizontal and vertical 1702, 1704, for example by controlling the latches 428, 432 (FIGS. 4A, 4B), 1340 (FIG. 13C), the motors or solenoids 1850 in response to any one, more or a combination of conditions or states as set out below.

For example, the at least one processor-based control system 1344 unlatches or opens the customer-facing door 1306 of the respective vending compartment only if the respective second receptacle 1604 is in the inserted position.

Additionally or alternatively, the at least one processor-based control system 1344 controls the horizontal transmission 1702 (FIG. 17) to move the second receptacle 1604 from the withdrawn 1642 to the inserted position 1644 only if the tray 1634 is in the lowered position 1638. Additionally or alternatively, the at least one processor-based control system 1344 controls the vertical transmission 1704 (FIG. 17) to move the tray 1634 from the raised position 1636 to the lowered position 1642 if the tray holds an item. For instance, the at least one processor-based control system 1344 may use information or data from one or more sensors to determine whether there is an item present on the tray 1634, and, or whether the item, if present, has one or more characteristics consistent with, and not inconsistent with, a type of item that is expected to be in the tray 1634. For instance, a weight sensor or load cell can provide information that represents a weight of the tray 1634, and a tare weight can be used to determine i) whether an item is carried by the tray 1634 and, or ii) a weight of that item. The at least one processor-based control system 1344 can compare the weight of the tray 1634 or a difference between total weight and a tare weight with an expected weight, determining whether the item is present and is within a range of an expected weight (e.g., weight of a fully loaded pizza). For instance, an image sensor (e.g., digital camera) can provide information that represents surface of the tray 1634 and any objects carried thereby, and can be used by the at least one processor-based control system 1344 to determine i) whether an item is carried by the tray 1634 and, or whether an item carried by the tray 1634 resembles a physical appearance of an expected item. Such can even be used to maintain quality control, for example assessing a distribution of toppings on a pizza, or a level of cooking. Alternatively, a PIR motion detector or a height detector can be used to assess the contents of an interior of the vending compartment. Even a simple electronic eye (e.g., LED and photodiode pair) can be employed to determine whether the vending compartment is full or empty.

Additionally or alternatively, the at least one processor-based control system 1344 controls the vertical transmission 1704 (FIG. 17) to move the tray 1634 (FIGS. 16A-16D) from the lowered position 1638 to raised position 1636 after an item has been removed from the respective vending compartment 1600. For instance, the at least one processor-based control system 1344 controls the vertical transmission to move the tray 1634 from the lowered position 1638 to raised position 1636 in response to a respective customer-facing door 1306 closing after an item has been removed from the respective vending compartment 1600.

Additionally or alternatively, the at least one processor-based control system 1344 unlatches or opens the customer-facing door 1306 of the respective vending compartment 1600 only if a customer or a transaction has been recognized. For instance, the at least one processor-based control system 1344 sends signals that unlatches or opens the customer-facing door 1306 of the respective vending compartment only if an input code is verified. Also for instance, the at least one processor-based control system 1344 unlatches or opens the customer-facing door 1306 of the respective vending compartment 1600 only if detected biometric data has been verified. Also for instance, the at least one processor-based control system 1344 unlatches or opens the customer-facing door 1306 of the respective vending compartment 1600 only if a pairing with an electronic device or recognition thereof occurs.

Additionally or alternatively, the at least one processor-based control system 1344 unlatches or opens the customer-facing door 1306 of the respective vending compartment 1600 only if the respective vending compartment 1600 is at or below a defined temperature that is sufficiently cool for the customer to handle such without causing bodily harm. Additionally or alternatively, the at least one processor-based control system 1344 unlatches or opens the customer-facing door 1306 of the respective vending compartment 1600 only if a food item in the respective vending compartment 1600 is at or below a defined temperature that is sufficiently cool for the customer to handle such without causing bodily harm. Additionally or alternatively, the at least one processor-based control system 1344 unlatches or opens the customer-facing door 1306 of the respective vending compartment 1600 only if all of the interior surfaces of the respective vending compartment 1600 is at or below a defined temperature that is sufficiently cool for the customer to handle such without causing bodily harm.

Additionally or alternatively, the at least one processor-based control system 1344 unlatches or opens the customer-facing door 1306 of the respective vending compartment 1600 only if there is a sufficient clearance for the customer-facing door to open.

The vending kiosk 1800 may include any one, two, more, or all of the sensors illustrated in FIGS. 13A-13C and described with respect thereto.

Various embodiments of the devices and/or processes via the use of block diagrams, schematics, and examples have been set forth herein. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

When logic is implemented as software and stored in memory, one skilled in the art will appreciate that logic or information, can be stored on any computer readable medium for use by or in connection with any computer and/or processor related system or method. In the context of this document, a memory is a computer readable medium that is an electronic, magnetic, optical, or other another physical device or means that contains or stores a computer and/or processor program. Logic and/or the information can be embodied in any computer readable medium for use by or in connection with an instruction execution system, apparatus, or device, such as a computer-based system, processor-containing system, or other system that can fetch the instructions from the instruction execution system, apparatus, or device and execute the instructions associated with logic and/or information. In the context of this specification, a "computer readable medium" can be any means that can store, communicate, propagate, or transport the program associated with logic and/or information for use by or in connection with the instruction execution system, apparatus, and/or device. The computer readable medium can be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette (magnetic, compact flash card, secure digital, or the like), a random access memory (RAM), a read-only memory (ROM), an erasable programmable read-only memory (EPROM, EEPROM, or Flash memory), an optical fiber, and a portable compact disc read-only memory (CDROM). Note that the computer-readable medium could even be paper or another suitable medium upon which the program associated with logic and/or information is printed, as the program can be electronically captured, via for instance optical scanning of the paper or other medium, then compiled, interpreted or otherwise processed in a suitable manner if necessary, and then stored in memory.

In addition, those skilled in the art will appreciate that certain mechanisms of taught herein are capable of being distributed as a program product in a variety of forms, and that an illustrative embodiment applies equally regardless of the particular type of signal bearing media used to actually carry out the distribution. Examples of signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

The various embodiments described above can be combined to provide further embodiments. U.S. Provisional Patent Application No. 62/620,931, filed Jan. 23, 2018, titled, "Vending-Kiosk Based Systems and Methods to Vend and/or Prepare Items, For Instance Prepared Foods"; U.S. Provisional Patent Application No. 62/682,038, filed Jun. 7, 2018, titled, "Vending-Kiosk Based Systems and Methods to Vend and/or Prepare Items, For Instance Prepared Foods"; U.S. Provisional Patent Application No. 62/685,067, filed Jun. 14, 2018, titled "VENDING-KIOSK BASED SYSTEMS AND METHODS TO VEND AND/OR PREPARE ITEMS, FOR INSTANCE PREPARED FOODS"; U.S. Pat. No. 9,292,889, issued Mar. 22, 2016, titled "Systems and Methods of Preparing Food Products"; U.S. patent application Ser. No. 62/311,787; U.S. patent application Ser. No. 15/040,866, filed Feb. 10, 2016, titled, "Systems and Methods of Preparing Food Products"; PCT Application No. PCT/US2014/042879, filed Jun. 18, 2014, titled, "Systems and Methods of Preparing Food Products"; U.S. patent application Ser. No. 15/465,228, filed Mar. 21, 2017, titled, "Container for Transport and Storage of Food Products"; U.S. Provisional Patent Application No. 62/311,787, filed Mar. 22, 2016, titled, "Container for Transport and Storage of Food Products"; PCT Application No. PCT/US2017/023408, filed Mar. 21, 2017, titled, "Container for Transport and Storage of Food Products"; U.S. patent application Ser. No. 15/481,240, filed Apr. 6, 2017, titled, "On-Demand Robotic Food Assembly and Related Systems, Devices, and Methods"; U.S. Provisional Patent Application No. 62/320,282, filed Apr. 8, 2016, titled, "On-Demand Robotic Food Assembly and Related Systems, Devices, and Methods"; PCT Application No. PCT/US17/26408, filed Apr. 6, 2017, titled, "On-Demand Robotic Food Assembly and Related Systems, Devices, and Methods"; U.S. Provisional Patent Application No. 62/394,063, filed Sep. 13, 2016, titled, "Cutter with Radially Disposed Blades"; U.S. patent application Ser. No. 15/845,916, filed Dec. 18, 2017, titled, "Container for Transport and Storage of Food Products; U.S. patent application Ser. No. 15/701,099, filed Sep. 11, 2017, titled, "Systems and Method Related to a Food-Item Cutter and Associated Cover"; U.S. Patent Application Ser. No. 62/532,914, filed Jul. 14, 2017, titled, "Systems and Method Related to a Food-Item Cutter and Associated Cover"; U.S. patent application Ser. No. 15/341,977, filed Nov. 2, 2016, titled, "Lazy Susan Menu Graphical User Interface"; U.S. Patent Application Ser. No. 62/532,885, filed Jul. 14, 2017, titled, "Multi-Modal Vehicle Implemented Food Preparation, Cooking, and Distribution Systems and Methods"; U.S. Patent Application Ser. No. 62/531,131, filed Jul. 11, 2017, titled, "Configurable Food Delivery Vehicle and Related Methods and Articles"; U.S. Patent Application Ser. No. 62/531,136, filed Jul. 11, 2017, titled "Configurable Food Delivery Vehicle and Related Methods and Articles; U.S. Patent Application Ser. No. 62/556,901, filed Sep. 11, 2017, titled, "Configurable Oven Rack System"; U.S. Patent Application Ser. No. 62/595,229, filed Dec. 6, 2017, titled, "Configurable Oven Rack System"; U.S. Patent Application Ser. No. 62/529,933, filed Jul. 7, 2017, titled, "Container For Transport and Storage of Food Products"; U.S. Patent Application Ser. No. 62/522,583, filed Jun. 20, 2017, titled, "Vehicle with Context Sensitive Information Presentation"; U.S. Patent Application Ser. No. 62/550,438, filed Aug. 25, 2017, titled, "Systems and Methods for Identifying Components on a Communications Bus"; U.S. Patent Application Ser. No. 62/569,404, filed Oct. 6, 2017, titled, "Self-Propelled Food Preparation Appliances and On-Demand Robotic Food Assembly with Self-Propelled Food Preparation Appliances"; U.S. Patent Application Ser. No. 62/615,087, filed Jan. 9, 2018, titled, "Systems and Method Related to a Food-Item Cutter with Metal Wipers and an Associated Cover"; U.S. Patent Application Ser. No. 62/574,088, filed Oct. 18, 2017, titled, "On-Demand Robotic Food Assembly Equipment, and Related Systems and Methods"; U.S. Patent Application Ser. No. 62/613,272, filed Jan. 3, 2018, titled, "Multi-Modal Distribution Systems and Methods Using Vending Kiosks and Autonomous Delivery Vehicles"; U.S. patent application Ser. No. 15/568,120, filed Oct. 20, 2017, titled, "Vehicle Having a Device for Processing Food"; U.S. patent application Ser. No. 29/574,802, filed Aug. 18, 2016, titled, "Food Container", U.S. patent application Ser. No. 29/618,670, filed Sep. 22, 2017, titled "Food Container"; U.S. patent application Ser. No. 29/574,805, filed Aug. 18, 2016, titled, "Food Container Cover"; U.S. patent application Ser. No. 29/574,808, filed Aug. 18, 2016, titled, "Food Container Base"; U.S. patent application Ser. No. 29/558,872, filed Mar. 22, 2016, titled, "Food Container Base"; U.S. patent application Ser. No. 29/558,873, filed Mar. 22, 2016, titled, "Food Container Cover"; and U.S. patent application Ser. No. 29/558,874, filed Mar. 22, 2016, titled, "Food Container" are each incorporated herein by reference, in their entirety.

From the foregoing it will be appreciated that, although specific embodiments have been described herein for purposes of illustration, various modifications may be made without deviating from the spirit and scope of the teachings. Accordingly, the claims are not limited by the disclosed embodiments.

The invention claimed is:

1. A vending kiosk, comprising: at least one cooking unit; a plurality of vending compartments, each of the vending compartments respectively comprising:

a first receptacle, the first receptacle comprising at least one wall that at least partially delimits an interior of the first receptacle, a front with a front opening that provides access into the interior of the first receptacle from the front of the first receptacle, and a rear with at least a rear opening that provides access into the interior of the first receptacle from the rear of the first receptacle; and a second receptacle, the second receptacle comprising at least one wall that at least partially delimits an interior of the second receptacle, a front with a front opening that provides access into the interior of the second receptacle from the front of the second receptacle, a top with a top opening that provides access into the interior of the second receptacle from the top of the second receptacle, and a tray, the tray moveable with respect to the at least one wall of the second receptacle between a raised position in which the tray is at least proximate the top of the second receptacle and a lowered position in which the tray is at least proximate a bottom of the second receptacle, the second receptacle moveable with respect to the first receptacle between an inserted position and a withdrawn position, the inserted position in which the second receptacle predominately extends into the interior of the first receptacle with the front opening of the second receptacle at least proximate the front opening of the first receptacle and the withdrawn position in which the second receptacle is predominately withdrawn from the interior of the first receptacle with the front opening of the second receptacle moved away from the front opening of the first receptacle as compared to the inserted position;

at least one horizontal transmission operable to move the second receptacles between the inserted and the withdrawn positions;

at least one vertical transmission operable to move the trays between the raised and the lowered positions;

a plurality of customer-facing doors, each of the customer-facing doors movable between a first position which prevents access to the interior of the first and the second receptacles of a respective one of the vending compartments from an exterior of the vending kiosk and a second position which allows access to the interior of the first and the second receptacles of the respective one of the vending compartments from the exterior of the vending kiosk; and at least one processor-based control system, the at least one processor-based control system communicatively coupled to control the at least one horizontal transmission, the at least one vertical transmission, and the customer-facing doors.

2. The vending kiosk of claim 1, further comprising:
a first plurality of latches operable to alternatively latch and unlatch respective ones of the customer-facing door; and
the at least one processor-based control system is communicatively coupled to control the customer-facing doors by control of the latches of the first plurality of latches.

3. The vending kiosk of claim 1, further comprising:
a first plurality of motors or solenoids operable to alternatively open and close respective ones of the customer-facing door; and
the at least one processor-based control system is communicatively coupled to control the customer-facing doors by control of the motors or solenoids of the first plurality of motors or solenoids.

4. The vending kiosk of claim 1 wherein, for each of the vending compartments, the at least one processor-based control system unlatches or opens the customer-facing door of the respective vending compartment only if the respective second receptacle is in the inserted position.

5. The vending kiosk of claim 1 wherein, for each of the vending compartments, the at least one processor-based control system controls the horizontal transmission to move the second receptacle from the withdrawn to the inserted position only if the tray is in the lowered position.

6. The vending kiosk of claim 1 wherein, for each of the vending compartments, the at least one processor-based control system controls the vertical transmission to move the tray from the raised position to the lowered position if the tray holds an item.

7. The vending kiosk of claim 1 wherein, for each of the vending compartments, the at least one processor-based control system controls the vertical transmission to move the tray from the lowered position to raised position after an item has been removed from the respective vending compartment.

8. The vending kiosk of claim 1 wherein, for each of the vending compartments, the at least one processor-based control system controls the vertical transmission to move the tray from the lowered position to raised position in response to a respective customer-facing door closing after an item has been removed from the respective vending compartment.

9. The vending kiosk of claim 1 wherein, for each of the vending compartments, the at least one processor-based control system unlatches or opens the customer-facing door of the respective vending compartment only if a customer or a transaction has been recognized.

10. The vending kiosk of claim 1 wherein, for each of the vending compartments, the at least one processor-based control system unlatches or opens the customer-facing door of the respective vending compartment only if an input code is verified.

11. The vending kiosk of claim 1 wherein, for each of the vending compartments, the at least one processor-based control system unlatches or opens the customer-facing door of the respective vending compartment only if detected biometric data has been verified.

12. The vending kiosk of claim 1 wherein, for each of the vending compartments, the at least one processor-based control system unlatches or opens the customer-facing door of the respective vending compartment only if a pairing with an electronic device or recognition thereof occurs.

13. The vending kiosk of claim 1 wherein, for each of the vending compartments, the at least one processor-based control system unlatches or opens the customer-facing door of the respective vending compartment only if the respective compartment is at or below a defined temperature that is sufficiently cool for the customer to handle such without causing bodily harm.

14. The vending kiosk of claim 1 wherein, for each of the vending compartments, the at least one processor-based control system unlatches or opens the customer-facing door of the respective vending compartment only if a food item in the respective compartment is at or below a defined temperature that is sufficiently cool for the customer to handle such without causing bodily harm.

15. The vending kiosk of claim 1 wherein, for each of the vending compartments, the at least one processor-based control system unlatches or opens the customer-facing door of the respective vending compartment only if all of the interior surfaces of the respective compartment is at or below a defined temperature that is sufficiently cool for the customer to handle such without causing bodily harm.

16. The vending kiosk of claim 1 wherein, for each of the vending compartments, the at least one processor-based control system unlatches or opens the customer-facing door of the respective vending compartment only if there is a sufficient clearance for the customer-facing door to open.

17. The vending kiosk of claim 1, further comprising:
a housing, wherein the at least one food cooking unit comprise a plurality of food cooking units housed in the housing.

18. The vending kiosk of claim 17, and further comprising:
a supply door sized and dimensioned to removably receive a supply rack in the housing.

19. The vending kiosk of claim 18 wherein the housing has at least one refrigerated portion and at least one compressor, and the supply door provides access to the refrigerated portion for the supply rack.

20. The vending kiosk of claim 19, further comprising:
an input transport mechanism operable to transfer food items from the supply rack to the food cooking units.

21. The vending kiosk of claim 19, further comprising:
a set of thermal insulation that thermally insulates the refrigerated portion from the at least one cooking unit.

22. The vending kiosk of claim 1, further comprising:
a number of image sensors positioned to capture images of each food item in at least one position along a path between the at least one cooking unit and a respective one of the vending compartments, inclusive of the interior of the vending compartments, and wherein the at least one processor-based control system receives image data that represents images of the food items.

23. The vending kiosk of claim 22 wherein the at least one processor-based control system determines whether there are any foreign objects on or in the food items based on the received image data.

24. The vending kiosk of claim 22 wherein the at least one processor-based control system determines whether the food items are finished cooking based on the received image data.

25. The vending kiosk of claim 22 wherein the at least one processor-based control system determines whether the food items satisfy at least one quality control condition based on the received image data.

26. The vending kiosk of claim 1, further comprising:
a number of metal sensors positioned to sense each food item in at least one position along a path between the at least one cooking unit and a respective one of the vending compartments, inclusive of the interior of the vending compartments, and wherein the at least one processor-based control system receives data from the metal sensors and determines whether any of the food items contains metal.

27. The vending kiosk of claim 1, further comprising:
a number of temperature sensors positioned to sense a temperature of each food item in at least one position along a path between the at least one cooking unit and a respective one of the vending compartments, inclusive of the interior of the vending compartments, and wherein the at least one processor-based control system receives data from the temperature sensors and determines whether each of the food items is within a specified range of temperatures.

28. The vending kiosk of claim 1, further comprising:
a number of motion sensors positioned to sense motion proximate the customer-facing doors, and wherein the at least one processor-based control system receives data from the motion sensors and determines whether there is motion within a defined distance of the customer-facing doors.

* * * * *